US012639042B2

(12) United States Patent
Shau et al.

(10) Patent No.: US 12,639,042 B2
(45) Date of Patent: May 26, 2026

(54) INTEGRATED CIRCUITS FOR LARGE-SCALE TRANSISTOR TENSOR OPERATIONS

(71) Applicant: Teracore System, Inc., Cupertino, CA (US)

(72) Inventors: Jeng-Jye Shau, Palo Alto, CA (US); David Shau, Palo Alto, CA (US)

(73) Assignee: Teracore Systems, Inc., Cupertino, CA (US)

( * ) Notice: Subject to any disclaimer, the term of this patent is extended or adjusted under 35 U.S.C. 154(b) by 0 days.

(21) Appl. No.: 18/793,880

(22) Filed: Sep. 10, 2024

(65) Prior Publication Data

US 2026/0072645 A1     Mar. 12, 2026

(51) Int. Cl.
G06F 7/60 (2006.01)

(52) U.S. Cl.
CPC .................................... G06F 7/605 (2013.01)

(58) Field of Classification Search
CPC ............... G06F 18/241; G06F 18/2155; G06F 2111/10; G06F 18/2178; G06F 18/22; G06F 3/017; G06F 30/23; G06F 1/3206; G06F 18/213; G06F 21/577; G06F 1/263; G06F 1/26; G06F 17/16; G06F 12/06; G06F 13/4063; G06F 16/9024; G06F 7/523; G06F 9/5027; H03K 19/017581; H03K 19/0944; G06N 3/08; G06N 3/045; G06N 3/0464; G06N 3/084; G06N 20/00; G06N 3/09; G06N 3/096; G06N 7/01; G06N 3/0895;

(Continued)

(56) References Cited

U.S. PATENT DOCUMENTS

2005/0063238 A1 *   3/2005   Nambu ............... G11C 11/4096
                                              365/222
2005/0195637 A1 *   9/2005   Martino ................. G11C 5/147
                                              365/149

(Continued)

*Primary Examiner* — John W Poos
(74) *Attorney, Agent, or Firm* — Venable LLP

(57) ABSTRACT

An integrated circuit includes a plurality of current-mode computation (CMC) branches, each including a plurality of CMC cells and a branch summation line. An individual CMC cell includes at least one computation transistor that produces a CMC output current that is a function of a channel current of the computation transistor. A branch summation line receives CMC cell output currents produced by a plurality of CMC cells, and produces a branch output current that is a current-mode summation of all received CMC cell output currents. A layer-one current summation circuit receives the branch output current produced by at least one branch summation line, and produces a layer-one current summation circuit output current that is a function of the received branch output currents. The layer-one current summation circuit may be field-programmable. In operation, the integrated circuit can perform transistor tensor operations by programming one or more layer-one current summation circuits to combine all branch output currents received by those layer-one current summation circuits. Using embodiments of the present invention, millions, billions, trillions or more of the CMC cells can be field-programmed to execute computations in parallel to support transistor tensor operations.

19 Claims, 24 Drawing Sheets

(58) Field of Classification Search

CPC ........ G06N 3/044; G06N 3/048; G06N 3/063;
G06N 3/047; G06N 3/082; G06N 3/098;
G06N 3/088; G06N 3/02; G06N 3/0475;
G06N 3/006; G06N 3/04; G06N 3/0455;
G06N 3/0499; G06N 3/094; G06N
3/0985; G06N 5/04; G06N 10/60; G06N
3/065; G06N 5/01; G06N 3/008; G06N
3/0442; G06N 3/091; G06N 3/092; G06N
5/02; G06N 5/043

See application file for complete search history.

(56) References Cited

U.S. PATENT DOCUMENTS

| | | | |
|---|---|---|---|
| 2021/0004208 A1* | 1/2021 | Lai | G06N 3/0464 |
| 2021/0232905 A1* | 7/2021 | Dalgaty | G11C 11/54 |
| 2022/0137924 A1* | 5/2022 | Wang | G06G 7/16 |
| | | | 708/200 |

* cited by examiner

FIG. 1(a) MOS Transistor
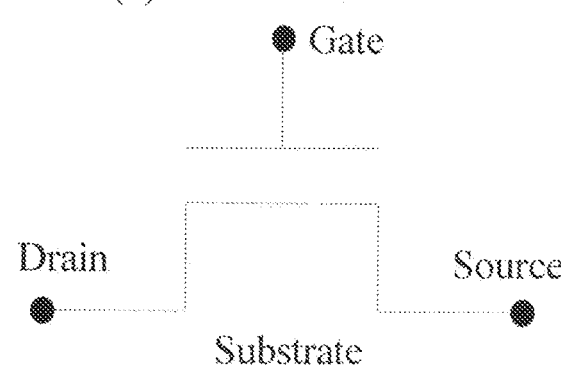
FIG. 1(b) Floating Gate Transistor
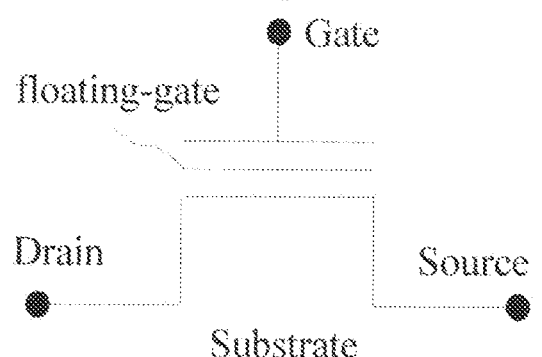
FIG. 1(c) I-V Relation
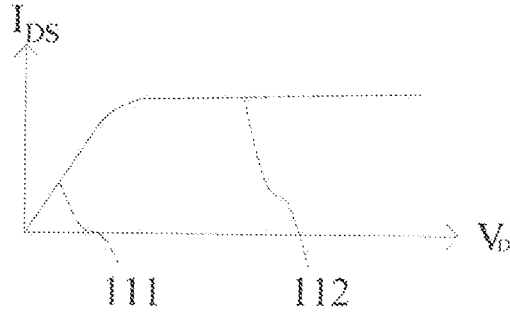
FIG. 1(d) I-V Relation
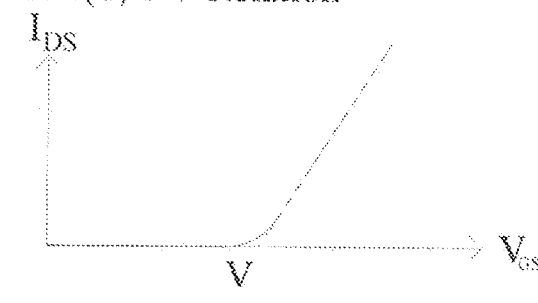
FIG. 1(e) I-V Relation
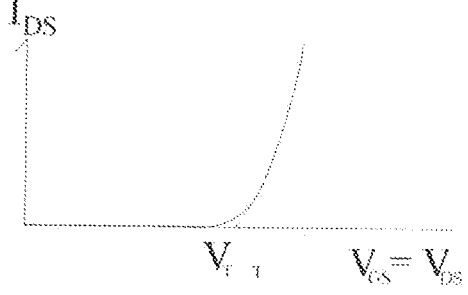
FIG. 1(f) Current Mode Summation
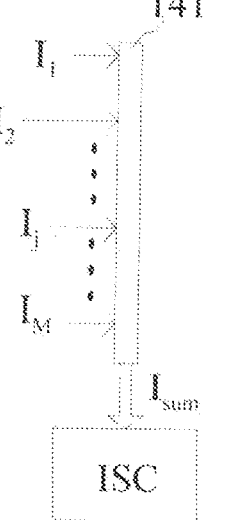

FIG. 3(e)
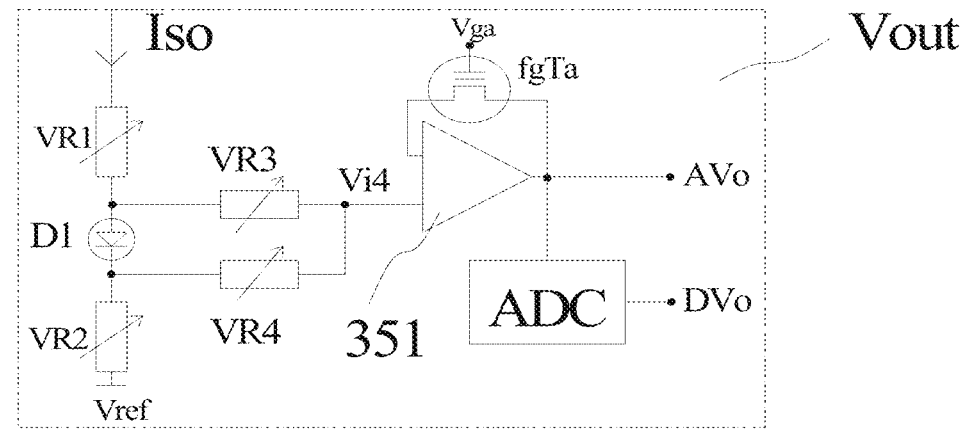
FIG. 3(f)
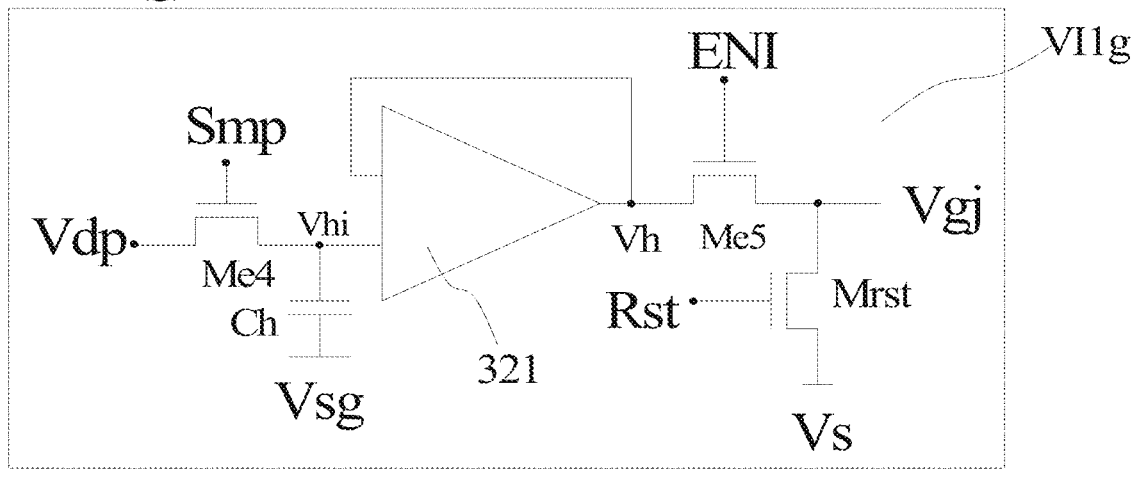
FIG. 3(g)

Figure 7A:
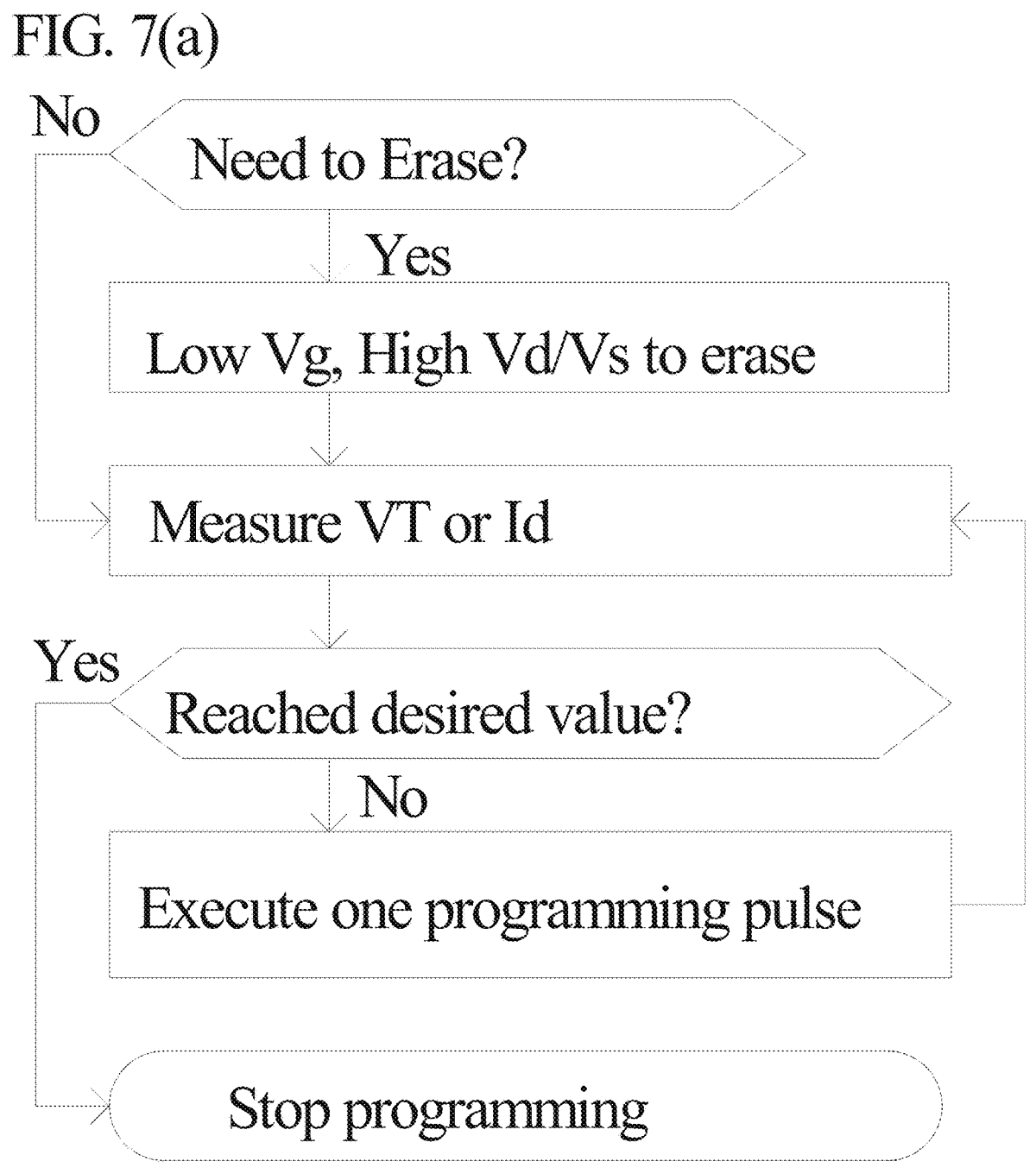

No ⟨ Need to Erase? ⟩

↓ Yes

Low Vg, High Vd/Vs to erase

↓

Measure VT or Id

↓

Yes ⟨ Reached desired value? ⟩

↓ No

Execute one programming pulse

Stop programming

FIG. 8(a)

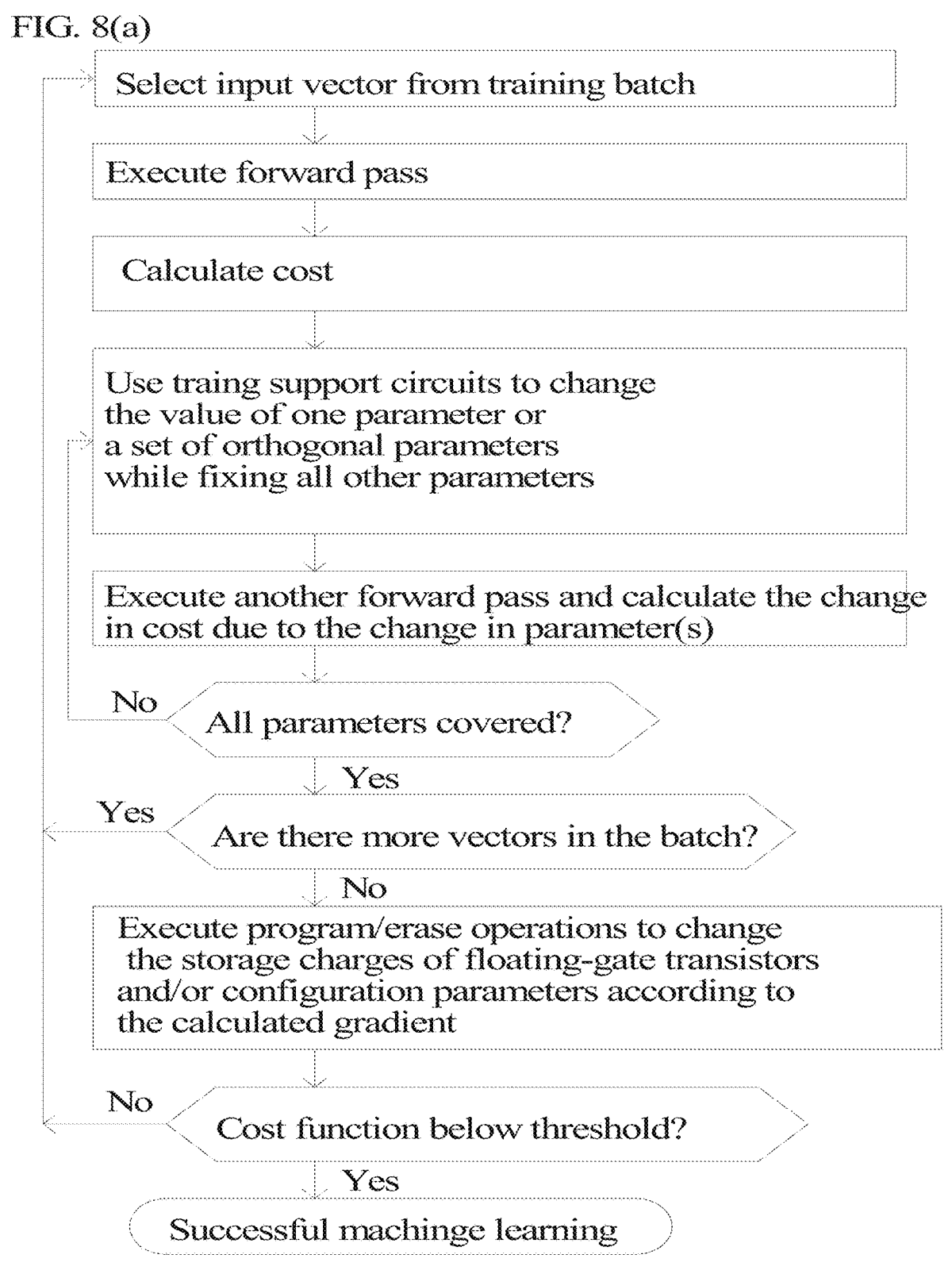

Select input vector from training batch

Execute forward pass

Calculate cost

Use traing support circuits to change
the value of one parameter or
a set of orthogonal parameters
while fixing all other parameters Execute another forward pass and calculate the change
in cost due to the change in parameter(s)

No — All parameters covered?

Yes

Yes — Are there more vectors in the batch?

No

Execute program/erase operations to change
the storage charges of floating-gate transistors
and/or configuration parameters according to
the calculated gradient No — Cost function below threshold?

Yes

Successful machinge learning

FIG. 8(b)

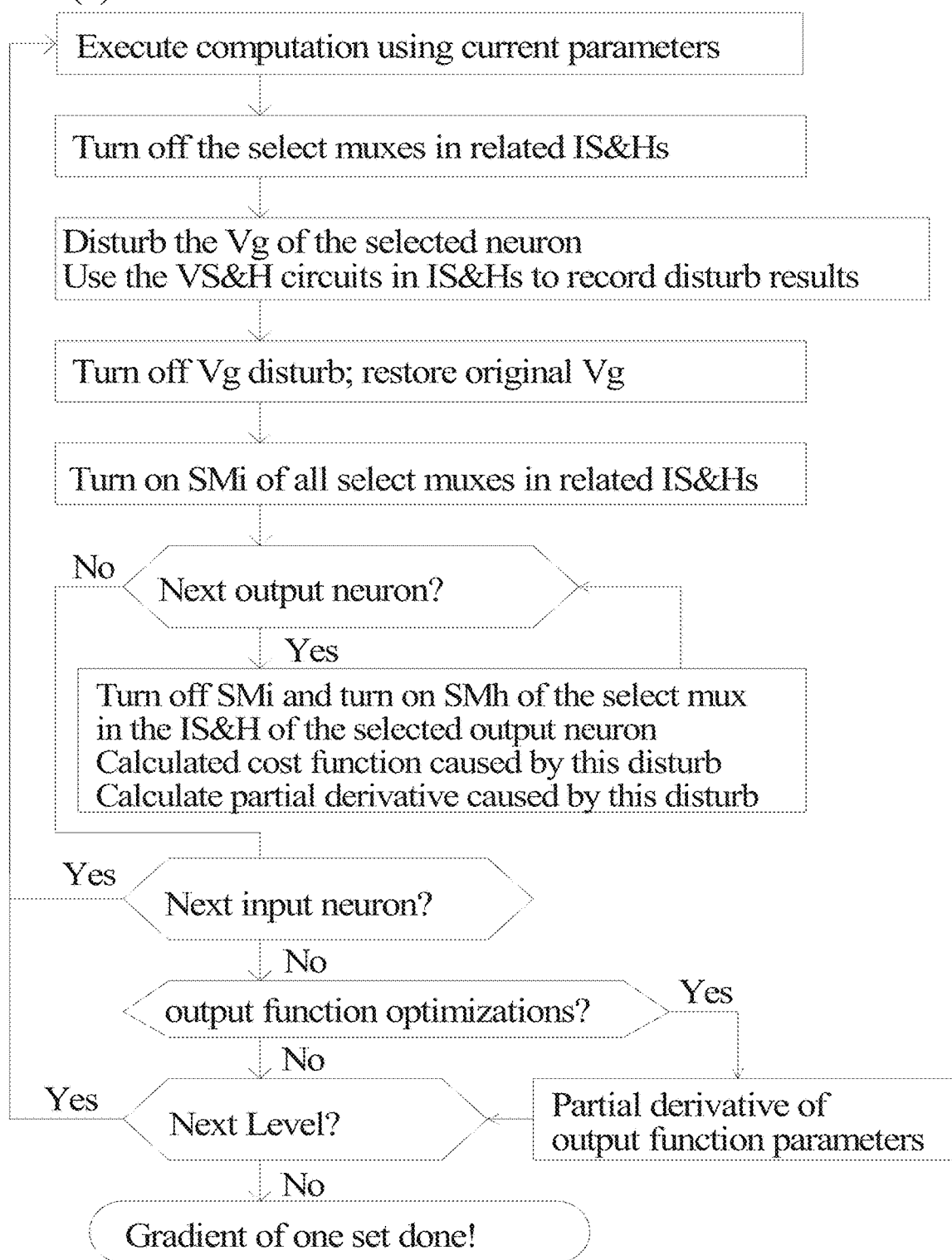

Execute computation using current parameters

Turn off the select muxes in related IS&Hs

Disturb the Vg of the selected neuron
Use the VS&H circuits in IS&Hs to record disturb results Turn off Vg disturb; restore original Vg Turn on SMi of all select muxes in related IS&Hs No — Next output neuron?

Yes

Turn off SMi and turn on SMh of the select mux
in the IS&H of the selected output neuron
Calculated cost function caused by this disturb
Calculate partial derivative caused by this disturb Yes — Next input neuron?

No output function optimizations? — Yes

No

Next Level? — Yes

Partial derivative of
output function parameters

No

Gradient of one set done!

Execute computation using current parameters

Disturb Vga and measure difference in cost function

Disturb VR1 and measure difference in cost function

Disturb VR2 and measure difference in cost function

Disturb VR3 and measure difference in cost function

Disturb VR4 and measure difference in cost function

Yes    Next output neuron?

No done!

INTEGRATED CIRCUITS FOR LARGE-SCALE TRANSISTOR TENSOR OPERATIONS

TECHNICAL FIELD

This application relates to integrated circuit (IC) devices built to support large-scale transistor tensor operations, and more particularly to integrated circuits using current mode computation cells and current mode summation circuits to execute large-scale transistor tensor operations.

BACKGROUND

A neural network is a group of interconnected units called neurons that send signals to one another. A neuron, in a general sense, is a unit that holds a number, and the "value" of a neuron is the number it holds. Neurons can be either biological cells or mathematical models. A large-scale neural network is defined as a neural network that comprises over a million synapses. A large-scale deep neural network is a large-scale neural network that has multiple "layers", where a layer is a group of neurons and synapses that transform a set of inputs into a set of outputs. It can also be defined more abstractly as a part of a sequence of neural network operations. The term "layer" and "level" is interchangeable—we will be using the term level when discussing sequence of neural network operations, while using "layer" for hardware structures. The process of transforming a set of inputs into a set of outputs using a neural network is called a "forward pass". In the field of machine learning or artificial intelligence (AI), a neural network is a type of "model", where a "model" is a function that attempts to approximate the relationship between a set of input variables and outputs. In biology, a synapse is a small gap at the end of a neuron that allows a signal to pass from one neuron to the next. In the field of neural networks, a synapse is the influence of a single input neuron on an output neuron; "synapse computation" is the computation that determines the amplitude of the influence. A "tensor" is an array of numbers that can have any number of dimensions, and the "rank" of a tensor is the number of indices required to uniquely specify an element of that tensor. An arbitrary element of a tensor T of rank n can be denoted as $(T_{i1, i2 \ldots iN})$. Synonyms of "rank" also include "order", "dimensionality", and "ndims". A rank 0 tensor can also be called a scalar; a rank 1 tensor can also be called a vector; a rank 2 tensor can also be called a matrix. Tensors in general can be described as having rank R, where R is the number of dimensions of said tensor. Note that there are a few overloaded terms: the dimensionality of a tensor for example is different from the dimensionality of a vector—the number of dimensions of a vector is the number of entries, components, or elements of said vector. Additionally, the term "rank" when describing a matrix may denote its column or row space. In other words, it denotes the number of linearly independent columns or rows of a matrix. In following discussions, the term "rank" will be used solely for describing the number of indices required to uniquely specific an element of a tensor. When speaking about vectors, the "size" of a vector is the number of components of that vector. In the art of integrated circuit design, a "cell" is a repeatedly used electric circuit element in an integrated circuit. A "synapse cell" is a repeatedly used electrical circuit element that executes synapse computations. A "memory cell" is a repeatedly used electrical circuit element that stores a datum. A "computation memory cell" is a repeatedly used electrical circuit element that is used both as a memory device that stores datum and as a computation circuit that executes computations. A "current-mode computation" (CMC) cell is a repeatedly used electrical circuit element that executes a computation and outputs an electrical current to represent its computation result. A current-mode computation memory cell is a CMC cell that is also a memory cell. A current-mode computation dynamic memory cell is a CMC memory cell that can store datum where such datum may degrade gradually due to non-ideal effects such as current leakage such that users need to rewrite its datum periodically in order to persist its datum value. A "digital neural network device" is a group of digital circuits that together execute neural network computations. A "binary adder" is a logic circuit that executes addition of two binary numbers. A "partial adder" is a logic circuit that executes addition of three binary numbers and results in two binary numbers. Partial adders are typically faster than binary adders because they do not need to wait for the determination of carry bits. A "binary multiplier" is a logic circuit that executes multiplication of two binary numbers, and is typically implemented by a group of partial adders and a binary adder. The term "field-programmable" refers to the programmability of hardware after it is manufactured. "Field-programmable hardware" or a "field-programmable device" therefore refers to hardware that is programmable by users after it is manufactured.

Mathematical symbols used in the following discussions are defined as follows: $(V_i^N)=(V_1, V_2, \ldots, V_i, \ldots, V_N)$ represents a vector with N components, and $V_i$ represents the i'th component of vector $(V_i^N)$, where the i in $V_i$ is an integer that is greater than or equal to 1 and less than or equal to the positive integer N. A vector is a rank one tensor, while a component of a vector is a rank zero tensor, which is also called a scalar. In neural network terminology, the vector $(V_i^N)$ is called a set of "activations" with N "neurons". A neuron is typically represented by an entry of a vector. The symbol $(V_i)$ represents a vector with arbitrary size. The symbol $(W_{i,j}^{N, M})$ represents a two-dimensional matrix with N columns and M rows, and $W_{i,j}$ represents the component at the i'th column and the j'th row of matrix $(W_{i,j}^{N, M})$, where i is an integer that is greater than or equal to 1 and is less than or equal to the positive integer N, j is an integer that is greater than or equal to 1 and is less than or equal to the positive integer M. The symbol $(W_{i,j})$ represents a matrix when the numbers of columns and rows are not specified. In later discussions, we will be using matrices, or rank two tensors, as examples. Most examples however can be generalized to tensors of arbitrary rank. The symbol $\Sigma_i^N(V_i^N)=(V_1+V_2+ \ldots +V_i+ \ldots +V_N)$ represents the summation of all N components of a vector $(V_i^N)$. The symbol $\Sigma_i(V_i)$ represents a summation of all components of a vector $(V_i)$ with arbitrary size. The vector function operation $\sigma[(V_i^N)]$ represents computations that apply the same function $(\sigma)$ to every component of a vector $(V_i^N)$, so that the resulting output vector $\sigma[(V_i^N)]=(\sigma(V_1), \sigma(V_2), \ldots \sigma(V_i), \ldots \sigma(V_N))$. The symbol $\sigma[(V_i)]$ represents a vector function operation on a vector $(V_i)$ of arbitrary size. The dot product of two vectors, $(A_i^N)*(B_i^N)$, is defined as: $(A_i^N)*(B_i^N)=\Sigma_i^N(A_i*B_i)=(A_1*B_1+A_2*B_2+ \ldots +A_i*B_i+ \ldots +A_N*B_N)$. Vector dot product also can be called a vector-vector product. Matrix-vector product $(W_{i,j}^{N, M})(V_j^M)$ represents multiplication and summation computations resulting in an output vector $(A_i^N)$ of N components where the i'th component of the output vector $A_i=\Sigma_j^M (W_{i,j}*V_j)=(W_{i,1}*V_1+W_{i,2}*V_2+ \ldots +W_{i,j}*V_j+ \ldots +W_{i, M}*V_M)$, which is the dot product between the i'th row of the matrix and the vector $(V_j^M)$. The symbol $(W_{i,j}) (V_j)$ represents the aforementioned matrix operation when the numbers of columns and rows of the matrix are not specified. In neural network terminology, each element $W_{i,j}$ in the matrix is called a "weight"; the matrix operation $(W_{i,j}^{N,\ M})$ $(V_j^M)$ is a series of multiple "weighted summations" over a set of input neurons $(V_j^M)$ that result in a set of outputs that are later transformed into the set of output neurons $(A_i^N)$; the term $W_{i,j} * V_j$ represents the influence of the j'th input neuron $V_j$ to the i'th output neuron $A_i$. This is also called the "synapse" between the j'th input $(V_j)$ neuron and the i'th output $(A_i)$ neuron. Matrix-matrix product $(W_{i,j}^{N,\ M})$ $(X_{m,n}^{M,\ N})$ represents multiplication and summation computations resulting in an output matrix $(A_{i,j}^{N,N})$ where the component at the i'th row and j'th column of the output matrix $A_{i,j}$ is the dot product between the i'th row of the matrix $(W_{i,j}^{N,\ M})$ and the j'th column of matrix $(X_{m,n}^{M,\ N})$. The symbol $(W_{i,j})$ $(X_{m,n})$ represents the aforementioned matrix-matrix operation when the numbers of columns and rows of the matrix are not specified. The matrix-vector product and the matrix-matrix product can be considered as simplified symbols used to represent a collection of vector-vector products. A matrix convolution is a type of matrix operation that uses a small matrix of weights, called a "convolution matrix" (also called a "kernel" or a "mask"), to modify an input matrix. This is done by sliding the filter over the input matrix, performing element-wise multiplication at each position, and summing the results to produce an output matrix. For a convolution matrix $(W^{NM})$, and input matrix $(X^{RS})$, the convolution matrix operation on the starting parameter $X_{m,n}$ of the input matrix is $\Sigma_i^N \Sigma_j^M (W_{i,j} * X_{m+i-1,n+j-1})$. We will call one instance of such summation computation in a convolution matrix operation as a "Hadamard product". Matrix convolutions are most often used in computer vision related tasks such as blurring, sharpening, embossing, and edge detection of an image but are also used in non-vision related tasks as well. Convolution operations also can be applied to rank three or higher rank tensors. For example, we can have a rank three convolution tensor $(W^{NMK})$ to operate on a rank three input tensor. The convolution matrix slides over the input matrix, performing element-wise multiplication with the part of the input it is on, then summing the results into an output matrix. For a convolution tensor $(W^{NMK})$, and input tensor $(X^{RSK})$, the Hadamard product on the starting parameter $X_{m,n,1}$ of the input tensor is $\Sigma_i^N \Sigma_j^M \Sigma_k^K (W_{i,j,k} * X_{m+i-1,n+j-1,k})$. A typical application of such rank three convolution operations is for image processing of a color image. A Hadamard product is also a summation of scalar products between two components of two tensors. Hardware that can execute vector-vector operations can typically support convolution operations.

The above symbols are sufficient to describe prior art digital neural network devices, but are not enough to describe embodiments of the present invention because of the differences between mathematical models and actual electronic devices. We define and use the term "transistor vector-vector operation" (TVV) to do so. A TVV operation of two input vectors $(W_i^N)$ and $(V_i^N)$ is defined as:

$$TVV\left(\left(W_i^N\right), \left(V_i^N\right)\right) =$$
$$\sigma\left(AGG(f_0, f_1(W_1, V_1), \ldots, f_i(W_i, V_1), \ldots, f_N(W_N, V_N))\right)$$

where $(W_i^N)$ and $(V_i^N)$ are input vectors of size N, $(f_1, \ldots, f_j, \ldots, f_N)$ are scalar functions that takes the components from the same position of both input vectors as inputs and provide one scalar output that can be supported by a computation transistor or a plurality of computation transistors, $f_0$ is called a "bias component" which is independent of the inputs, the aggregation function AGG takes in a vector input and outputs a scalar that represents the relationship of the elements of the vector, and o is a scalar output function that takes the AGG result as its input. A computation transistor is a transistor that executes scalar function operations using its current-voltage relations. Examples of input scalar functions are the current-versus-voltage (IV) relationship of an MOS transistor that takes the drain-to-source voltage and/or gate-to-source voltage and/or threshold voltage as inputs and provides channel current as output. Examples of the output function $\sigma$ are activation functions commonly found in deep learning such as a sigmoid or ReLU. Embodiments of the present invention is using a single computation transistor to do the jobs current art GPU or TPU are using thousands of transistors to do. The most common example of an aggregation function (AGG) is a summation such as $AGG(f_0, f_1(W_1, V_1), \ldots, f_i(W_i, V_i), \ldots, f_N (W_N, V_N))=f_0+f_1(W_1, V_1)+ \ldots +f_i(W_i, V_i)+ \ldots +f_N(W_N, V_N)$. We can however use aggregation functions other than summations. Current art GPU or TPU are using thousands of adders to execute the AGG function while embodiments of the present invention can use a few conductor lines to do the job at much faster speed while consuming much lower power. A vector dot product is a special case of a TVV operation where the aggregation function is a summation, all scalar functions are scalar products defined as $f_i(W_i, V_i)=W_i \times V_i$, bias $f_0$ is zero, and output function $\sigma$ is the identity function. The identity function is a function that always outputs the same value as its input value.

We can similarly define a "transistor matrix-vector operation" (TMV) between an input matrix $(W^{N,M})$ with N rows and M columns and an input vector $(V^M)$ of size M that results in an output vector $(A^N)$ of size N where its i'th component $A_i$ is TVV operation result of the i'th row of the input matrix $(W^{N,M})$ and the input vector $(V^M)$ as:

$$A_i = \sigma_i \left(AGG(f_{i,0}, f_{i,1}(W_{i,1}, V_1), \ldots, f_{i,j}(W_{i,j}, V_j), \ldots, f_{i,M} (W_{i,M}, V_M))\right)$$

where j is an integer greater or equal to 1 and less than or equal to M, $(f_{i,1}, \ldots, f_{i,j}, \ldots, f_{i,M})$ are scalar functions of the i'th row, $f_{i,0}$ is the bias component of the i'th row, $\sigma_i$ is an output function of the i'th row; $W_{i,j}$ is called a "parameter" at the i'th row and j'th column of matrix $(W^{N,M})$; $V_j$ is the value of the j'th component of the input vector $(V^M)$, and AGG is the "aggregation function" that describe the relationship between inputs and outputs. Matrix-vector multiplication is a special case of a TMV operation where the aggregation function is a summation, all scalar functions are multiplications defined as $f_{i,j}(a, b)=a \times b$, all bias components are zero, and all output functions are identity function.

We can similarly define a "transistor matrix-matrix operation" (TMM) between an input matrix $(W^{N,M})$ with N rows and M columns and another input matrix $(X^{M,N})$ with M rows and N columns that result in an output matrix $(A^{N,M})$, where its component at i'th row and j'th column, $A_{i,j}$, is the result of a TVV operation of the i'th row of the input matrix $(W^{N,M})$ and the j'th column of matrix $(X^{M,N})$. Matrix-matrix multiplication is a special case of a TMM operation where the aggregation function is a summation, all scalar functions $f_{i,j}(a, b)=a \times b$, all bias components are zero, and all output functions are the identity function.

Generalizing to tensors of arbitrary dimensions, we can use the concept of contractions to define "transistor tensor contraction". Contraction is a term in multilinear algebra when describing how to multiply two tensors. Let us use tensor-tensor multiplication or a tensor contraction to better describe this: given two tensors A and B, where A has dimensions (I1, I2 . . . Im, J1, J2 . . . Jn) and B has dimensions (J1, J2 . . . Jn, K1, K2 . . . Kp), multiplying A and B contracting over dimensions J1, J2 . . . Jn yields an output C. Each element of the resulting output tensor C which will have dimensions (I1, I2 . . . Im, K1, K2 . . . Kp) and is defined as $$\sigma_i(AGG(f_{i,0}, f_{i,1}(W_{i,1}, V_1), \ldots, f_{i,j}(W_{i,j}, V_j), \ldots, f_{i,M}(W_{i,M}, V_M)))$$

$$C_{i,1,i2\ldots im,k1,k2\ldots kn} = \sum_{j1,j2\ldots jn} A_{i1,i2\ldots im,j1,j2\ldots jn} B_{j1,j2\ldots jn,k1,k2\ldots kp}$$

where i1, i2 . . . im, k1, k2 . . . kp each define a specific index for each respective dimension I1, I2 . . . Im, K1, K2 . . . Kp. In order to perform this operation, one must identify matching dimensions, which in this case are J1, J2 . . . Jn. A tensor-tensor multiplication or tensor contraction can have multiple different outputs depending on which dimensions are contracted over, so part of defining it includes defining which matching dimensions are contracted over. It is to be understood as well that if two tensors do not have matching dimensions, they cannot be multiplied or contracted. Matrix-matrix multiplication is a special case of a tensor contraction: given two matrices A and B, where A has dimensions N by M and B has dimensions M by D, the output C can be defined as a tensor contraction between two 2D tensors over the dimension M. Note that the right-hand side of the equation is equivalent to a summation, or aggregation, of dot products. When iterating over the $j_n$ dimension for example, we can fix all dimensions of A except for the $j_n$ dimension and fix all dimensions of B except for it's $j_n$ dimension—now we have a dot product between two vectors. Therefore, when we define a "transistor tensor contraction" similar to how TMMs, TMVs were defined, we can see that a transistor tensor contraction is a result of many aggregations of TVV operations contracting over a set of shared dimensions.

We also can define "transistor convolution operation" in similar ways. For a convolution tensor $(W^{NMK})$ and input tensor $(X^{RSK})$, the transistor convolution operation on the starting parameter $X_{m,n,1}$ of the input tensor is $\sigma[\Sigma_i^N \Sigma_j^M \Sigma_k^K f_{i,j,k}(W_{i,j,k}, X_{m+i-1,n+j-1,k})]$, which will be referred to as a "transistor Hadamard operation" in the following discussions. A tensor convolution operation is a special case of a transistor tensor convolution operation where all scalar functions are multiplications defined as $f_{i,j,k}(a, b)=a\times b$ and the output functions are all identity functions.

Similarly, a "transistor tensor convolution operation" extends convolutions of matrices to convolutions of tensors. A convolution using a d×d kernel matrix over a n×n input matrix is a special case of a transistor tensor convolution operation. It is to be understood that the dimensions of the kernel tensor in a transistor tensor convolution operation must have matching or contracting dimensions with the input tensor that it convolves.

We now define "transistor tensor operations" to be the superset of transistor vector-vector operations, transistor matrix-vector operations, transistor matrix-matrix operations, transistor tensor contractions, and transistor tensor convolution operations. A transistor tensor operation can refer to any of these operations.

Using the notation defined above, one level of neural-network computation is typically a combination of calculations and transformations over the input that result in an output vector $$(A_i^N) = \sigma[(W_{i,j}^{N,M})(V_j^M) + (B_i^N)],$$

where $(V_j^M)$ is the input vector, each component $W_{i,j}$ of the matrix $(W_{i,j}^{N,M})$ is called a "weight", $(B_i^N)$ is a vector called "bias vector", $\sigma$ is a vector function such as but not limited to the sigmoid function or the "Rectified Linear activation function" (ReLU) function. The $\sigma$ output function is also commonly called an activation function. A deep neural-network typically consists of multiple layers, where the output vector of each layer is the input vector of the next layer until the final output vector $A^{(L)}$ is generated.

$$A^{(L)} = \sigma^{(L)}[W^{(L)}A^{(L-1)} + B^{(L)}];$$
$$A^{(L-1)} = \sigma^{(L-1)}[W^{(L-1)}A^{(L-2)} + B^{(L-1)}];$$
$$\ldots;$$
$$A^{(k)} = \sigma^{(k)}[W^{(k)}A^{(k-1)} + B^{(k)}];$$
$$\ldots;$$
$$A^{(1)} = \sigma^{(1)}[W^{(1)}A^{(0)} + B^{(1)}];$$

Here, integer k is greater than or equal to 1 and less than or equal to positive integer L; $A^{(0)}$ is the initial input vector; $A^{(L)}$ is the final output vector of this neural network with L levels. This final output vector can be further transformed to compute the final output prediction of the neural network. In classification applications, for example, the size of the final output vector may be equal to the number of classes in the application, where each index in the output vector maps to a particular class. A SoftMax function is applied over the output vector, and the greatest element in the vector is selected as the final classification.

The configurations of neural networks are typically defined by software, which call software modules to define the number of levels, the number of neurons at each level, the types of operators used, the activation functions used, and other customizable operators. This configuration can be referred to as the "architecture" of a model or neural network. Software provides excellent flexibility in configuring neural networks and designing custom architectures. Note that the example in paragraph 8 represents the most classic neural network architecture known as the multi-layered perceptron (MLP). Other architectures may use more operations other than matrix-vector operations. For example, tensor convolutions may be used to transform the input when the input is a rank 3 or greater tensor instead of a vector. Inputs from one level may be concatenated with other outputs from previous levels. While the specific operations in a level can be anything, a level in general transforms an input tensor into an output tensor.

Neural networks are only valuable if trained properly. Training can be defined as the process of finding a set of model parameters that can adequately approximate the relationship between a set of input variables and outputs. This is typically achieved by the following procedures: (1) Gathering a large dataset. Each sample in the dataset can be denoted as (X, y), where X is a tensor of inputs and y is the "label", which can be defined as the actual output or result given the input X; (2) Defining a "loss function" that adequately quantifies the difference between the model's predictions and the labels. The loss of an epoch is a function of the model's outputs and the labels. A typical example of a loss function is mean squared error: $L=\Sigma_i \, (\hat{y}_i-y_i)^2$, where $y_i$ is the label of the ith sample and $\hat{y}_i$ represents the model's output prediction; and (3) Finding a set of model parameters that minimize the loss function over multiple passes through the dataset. A single pass through the dataset is known as an "epoch". This is typically achieved through an algorithm known as "gradient descent". After each forward pass, the derivative of the loss function is taken with respect to each weight, or parameter, in the model. Weights are then updated by adding a proportion of the negative of the gradient to them, and the process is repeated until the model achieves sufficient performance.

Training neural networks is extremely computationally expensive as a single forward pass can involve billions of operations. This has led to optimizations of the process—the most notable being the use of back-propagation to more efficiently calculate gradients, as well as techniques like mini-batching and stochastic gradient descent that decrease the number of computations needed (which theoretically sacrifices some amount of model performance) before updating model parameters. While backpropagation is used in nearly all cases of training to update parameters, since backpropagation relies on the chain rule in calculus and therefore the differentiability of the model, a major restriction it imposes is that the derivative of every operation in the neural network must have a closed form solution and must be well-defined. This includes the loss function and all activation functions used. While one can still obtain the derivative of the loss with respect to each weight $\delta L/\delta W_{i,j}$ for non-differentiable operations, this process would involve changing the value of the weight $W_{i,j}$ slightly, then measuring the corresponding change of the loss L. The derivative can then be computed by dividing the change in loss over the change in weight. Measuring the change of the loss L however requires an entire forward pass while fixing all other parameters. A large neural network with billions of parameters could require billions of forward passes just to complete an iteration of weight or parameter updates, which is intractable using prior art digital computation systems.

Prior art machine learning computations are typically executed by digital integrated circuits such as center processing units (CPUs), graphic processing units (GPUs), or specialized artificial intelligence (AI) integrated circuits such as "tensor processing units" (TPUs) that are equipped with digital computation circuits such as binary multipliers and binary adders. Prior art machine learning computations typically require large computational resources—a forward pass of a neural network with one billion parameters involves the execution of around one billion multiplications and one billion summations. A single CPU with a few multipliers and few adders would take billions of instruction cycles to execute one forward pass. A GPU or specialized AI chip can comprise thousands of computation circuits that can execute thousands of multiply-summation computations in parallel, achieving faster computation speeds than general purpose CPUs. However, millions of computation cycles are still required to execute one forward pass. In addition, the system needs to continuously move billions of parameters to and from storage memory devices and the digital computation circuits. Such data movements consume significant amounts of energy and they can result in performance bottlenecks.

In the above equations, the "synapse" of the j'th input neuron $V_j$ to the i'th output neuron $A_i$ is assumed to be linearly proportional to $V_j$ as $W_{i,j}*V_j$, where $W_{i,j}$ is the weight. This linear relationship is not necessarily the best model for all cases. Actual biological neuron cells typically activate only when the input signal is greater than a threshold value and do not respond when the input is lower than such threshold. Biological synapse functions are more similar to nonlinear functions such as the ReLU function instead of a linear function like multiplication. The influence of the j'th input neuron $V_j$ to the i'th output neuron $Y_i$ can be modeled as a general function $f(Q_{i,j}, V_j)$, where $Q_{i,j}$ is a field-programmable parameter. Using aforementioned definition of a transistor matrix-vector operation, the output vector can then be written as:

$$(A_i) = \sigma\{AGG[f_j(Q_{i,j}, V_j)]\}.$$

For a neural network of L levels, we have:

$$A^{(L)} = \sigma^{(L)}\{AGG^{(L)}[f^{(L)}(Q^{(L)}, A^{(L-1)})]\};$$
$$A^{(L-1)} = \sigma^{(L-1)}\{AGG^{(L-1)}[f^{(L-1)}(Q^{(L-1)}, A^{(L-2)})]\}$$
$$\dots ;$$
$$A^{(k)} = \sigma^{(k)}\{AGG^{(k)}[f^{(k)}(Q^{(k)}, A^{(k-1)})]\};$$
$$\dots ;$$
$$A^{(1)} = \sigma^{(1)}\{AGG^{(1)}[f^{(1)}(Q^{(1)}, A^{(0)})]\}.$$

Prior art digital integrated circuits do not possess circuits that can execute thousands of $f_j(Q_{i,j}, V_j)$s in parallel and are therefore not well-equipped to execute computations other than weighted summations. It is therefore desirable to develop algorithms that possess a large number of circuits that can be configured for transistor matrix-vector operations in addition to weighted summations.

Prior art digital neural network devices executed by binary computations still achieve successes in applications such as image classification, object detection, text generation, image generation, and have also found success in the field of reinforcement learning. On the other hand, the cost and power required by prior art digital neural network devices have always limited the progress and success of the models they perform computations for—the popularity of deep learning for example was never feasible until the widespread adoption of GPUs, which still possess significant limitations. A prior art large-scale deep level neural network can cost millions in dollars and months in time to train and also consumes significant amounts of power that in the long run will exacerbate the energy consumption crisis. While prior art digital neural network devices have undoubtedly unlocked solutions to previously unsolvable problems, the prices in cost and energy are much higher relative to biological brains. It is therefore highly desirable to develop systems that require less power, cost less, and execute faster.

FIG. 1(a) shows a schematic symbol of a metal-oxide-semiconductor (MOS) transistor. An MOS transistor has gate, source, drain, and substrate terminals, as shown in FIG. 1(a). For simplicity, the substrate terminal is not typically drawn in schematic diagrams of MOS transistors. The substrate terminal is however an important terminal that can influence the behavior of the transistor. For example, if the substrate terminal is at a voltage that is lower than both the source voltage and drain voltage of an n-channel MOS transistor, the effective threshold voltage of the transistor will increase, and the channel leakage current will decrease; such effects caused by substrate voltages are called "body effects". P-channel MOS transistors also have body effects except that the polarity of voltages is opposite to that of n-channel MOS transistors.

FIG. 1(b) shows a schematic symbol of a floating-gate transistor. A floating-gate transistor is a type of MOS transistor that also has gate, source, drain, and substrate terminals, as shown in FIG. 1(b). For simplicity, the substrate terminal of a floating-gate transistor is not typically drawn in schematic diagrams. The major difference between a floating-gate transistor and a common MOS transistor is that its threshold voltage VT is field-programmable. The floating-gate is conductor surrounded by insulators, as illustrated symbolically in FIG. 1(b). Electrical charges can be trapped in the floating-gate to change its threshold voltage. Typically, the threshold voltage of a floating-gate transistor can be increased by putting a high drain-to-source voltage and gate voltage that puts the transistor in a saturation region to generate strong electrical fields in its channel, which can inject electrons into the floating-gate transistor by hot electron effects, causing an increase of threshold voltage. This process is called "programming" of the floating-gate transistor. For a floating-gate transistor, its threshold voltage is a function of the storage charge (Q) trapped in its floating-gate, modeled as $$V_T = V_{T0} + C_e * Q,$$

where $V_{T0}$ is the intrinsic threshold voltage when Q is zero and $C_e$ is the equivalent coupling capacitor of the floating-gate transistor. $V_{T0}$ and $C_e$ are determined by transistor properties. Current art integrated circuit technologies are able to manufacture large quantities of floating-gate transistors with matched $V_{T0}$ and $C_e$. It is possible to control the change of $V_T$ in analog values using short pulses of programming and subsequently measuring changes in channel current until $V_T$ reaches a desired value.

Typically, the threshold voltage of a floating-gate transistor can be decreased by putting a high voltage on its drain/source terminals, and a low voltage on its gate terminal, invoking a high electric field between the gate and drain/source which pulls electrons out of the floating-gate through tunneling. This process is called an "erase" of the floating-gate transistor. The amount of decrease in $V_T$ is typically difficult to accurately control during the erase process. For some cases, the erase procedure can be executed on an individual floating-gate transistor, but is more often executed on the whole array of floating-gate transistors. This is known as a "flash erase".

The floating-gate of the floating-gate transistor is surrounded by insulators that trap injected charges in the floating-gate with little loss over a long time. This property makes it useful as a non-volatile memory device. Currently, floating-gate transistors are widely used for applications such as solid-state hard discs, USB memory sticks, mobile phone memory cards, firmware storage memory, and many others. Floating-gate transistors function as memory devices that store data in these examples.

The current-voltage (I-V) relationships of MOS transistors are:

In the cut-off region where $V_{GS} < V_T$, $$I_{DS} = 0,$$

where $I_{DS}$ is the channel current flowing from the drain terminal to the source terminal of the transistor, $V_{GS}$ is the gate-to-source voltage, and $V_T$ is the threshold voltage. In the saturation region where $V_{GS} > V_T$, and $V_{DS} > V_{GS} - V_T$, $$I_{DS} = 1/2 K_n (V_{GS} - V_T)^2,$$

where $K_n = U_n C_o(W/L)$, Un is carrier mobility, $C_o$ is equivalent capacitance, W is effective channel width, and L is effective channel length. In the triode region, where $V_{GS} > V_T$, and $V_{DS} < V_{GS} - V_T$, $$I_{DS} = K_n [(V_{GS} - V_T) V_{DS} - 1/2 V_{DS}^2].$$

When the term ($\frac{1}{2} V_{DS}^2$) is negligible, we have $$I_{DS} = K_n (V_{GS} - V_T) V_{DS}.$$

The current-voltage (I-V) relationships of floating-gate transistors are similar to that of common MOS transistors. The difference is that its threshold voltage $V_T = V_{T0} - C_e Q$ is field-programmable.

FIG. 1(c) shows an exemplary current-voltage relationship with fixed $V_{GS}$ and variable $V_{DS}$. The channel current ($I_{DS}$) increases linearly with $V_{DS}$ in the triode region (111), but is virtually independent of Vos in the saturation region (112). In the triode region (111), $I_{DS} = K_n V_{DS}(V_{GS} - V_T)$ and the transistor behaves as an analog multiplier with $V_{DS}$ and $K_n(V_{GS} - V_T)$ as the two inputs of the analog multiplier. Thus, we will call this computation condition "multiplier mode". The linear relationship in multiplier mode provides a method to implement weighted multiplication operations in neural networks with one transistor; the value of input neuron would be Vos, and weight would be $K_n(V_{GS} - V_T)$. For a floating-gate transistor, the weight ($V_{GS} - V_T$) is field-programmable by changing storage charge Q, as ($V_{GS} - V_{T0} - C_e Q$).

FIG. 1(d) shows an exemplary current-voltage relationship with fixed $V_{DS}$ and variable $V_{GS}$. The channel current ($I_{DS}$) is near zero when $V_{GS}$ is less than $V_T$, and increases approximately linearly when $V_{GS}$ is greater than $V_T$ in the triode region. We will call this condition "ReLU mode" because this relationship provides a way to implement the "Rectified Linear activation function" (ReLU) with one transistor. If the device is operating in the saturation region, the current can increase super-linearly and the channel current is not sensitive to drain voltage. We will call this condition "saturation mode", where the I-V relationship is similar to ReLU mode but current increases super-linearly after the device is turned on.

FIG. 1(e) shows an exemplary current-voltage relationship when $V_{DS} = V_{GS}$ are input variables. The channel current ($I_{DS}$) is close to zero when $V_{GS}$ is less than $V_T$ and increases rapidly when $V_{GS}$ is greater than $V_T$. We will call this condition "rectifier mode" because this I-V relationship is similar to that of a rectifier.

These I-V relationships show that a floating-gate transistor not only can be used as a memory device, but can also be used to execute computations. An MOS transistor can execute the function of a multiplier when in the triode region where $V_{DS}$ and $(V_{GS}-V_T)$ are inputs. It can execute the ReLU function when $V_{GS}$ is used as the input. While in the saturation region, it can execute the function of a super-linear ReLU function using $V_{GS}$ as the input. When $V_{GS}$ and $V_{DS}$ are connected together as the input, it can execute the function of a rectifier. An MOS transistor can be a "current-mode computation" (CMC) cell with channel current as its computation output. A programmable-threshold voltage MOS transistor can be a current-mode computation memory cell with threshold voltage as the storage data and channel current as the computation output. It is also a type of "field-programmable current-mode computation memory cell" because the parameter stored in the transistor is field-programmable.

The above equations are valid for long channel MOS transistors under ideal conditions. The I-V relationship can be more complex for practical situations, but the general trend still holds. Thus, we will use these equations in the following discussions. Almost all the prior art floating-gate transistors are n-channel transistors; we will therefore assume they are n-channel in the following discussions. The results are also applicable to p-channel transistors if the polarities of voltages and currents are reversed. We will use floating-gate transistors, which are an example of programmable-threshold voltage transistors, as example embodiments in most of our discussions, though the same principles are applicable to other types of transistors.

Prior art digital computations are not efficient at summations involving a large number of elements. Take the example of summing over 128 binary numbers. Prior art binary computations first must use 64 binary adders in parallel, resulting in 64 summation results. Next, 32 adders are used in parallel to output 32 summation results; 16 are used next, and so on until the final adder is used with two summation outputs to yield the final result. The sequential nature makes this operation slow, and worsens as the number of summations increases. While it is possible to use "partial adders", which sum three binary numbers and output two binary numbers, to increase speed, the sequential nature of the summation still remains.

In contrast, FIG. 1(f) illustrates the principle of current-mode summation using a conductor line (141). Multiple electrical currents $(I_1, I_2, \ldots, I_j, \ldots, I_M)$ flow into a conductor (141) and an electrical current $(I_{sum})$ flows out of one end of the conductor (141) to a current summation circuit (ISC), as illustrated in FIG. 1(f). According to the principle of conservation of electrical charges, we have $$I_{sum} = (I_1 + I_2 + \ldots + I_j + \ldots + I_M) = \sum_{j}^{M} I_j.$$

A piece of electrical conductor (141) is therefore able to sum over a large number of electrical currents flowing into it and sends the resulting summation current to the output circuit (ISC). We will call such conductor (141) a "summation line" and call this method "Current-Mode Summation" (CMS) in the following discussions. When parasitic leakage currents are negligible, at steady states, current-mode summation results are accurate. In reality, errors maybe introduced due to none ideal effects such as parasitic leakage currents. CMS is significantly more efficient since all additions can be done in parallel, and performs the function of multiple binary adders in parallel at extremely high speed. By definition, a current-mode summation is a summation of electrical currents using an electrical conductor based on the principle of conservation of electrical charges. A "summation line" is typically shaped as a line, but the electrical conductor can have wide varieties of shapes.

While current mode computations are excellent at parallel computations, especially summations, using direct current (DC) to represent numbers consumes power even when the hardware is not executing computations. Prior art CMOS integrated circuits in contrast consume little power while idle. This "idle state power consumption" is therefore a disadvantage of current mode computations relative to digital computations.

FIG. 2(a) is a simplified schematic diagram for a prior art two-dimensional array of N columns and M rows of floating-gate transistors that are configured to support neural network computations, where N and M are positive integers. In this example, the drain terminals of the floating-gate transistors $(M_{1,j}, M_{2,j}, \ldots, M_{i-1,j}, M_{i,j}, \ldots M_{N-1,j}, M_{N,j})$ on the same row are connected by a conductor line to an input at voltage $Vd_j$ as shown in FIG. 2(a), where i is an integer greater than or equal to 1 and less than or equal to N. A conductor line that provides the same input to a plurality of computation memory cells will be called an "input line" in the following discussions. The source terminals of the floating-gate transistors $(M_{i,1}, M_{i,2}, \ldots, M_{i,j-1}, M_{i,j}, \ldots M_{i,M-1}, M_{i,M})$ on the same column and a current summation circuit (201) are connected by a conductor line (Is$_i$), as shown in FIG. 2(a), where j is an integer greater than or equal to 1 and less than or equal to M. A conductor that carries the output currents (in this case, the channel currents of floating-gate transistors) of a plurality of computation cells connected to the conductor to an output circuit (201) will be called a "branch summation line" in the following discussions. The current summation circuit (201) fixes the voltage on the branch summation line (Is$_i$) to a predefined reference voltage $V_s$ and provides an output voltage $(Vo_i)$ that is a function of the summation current on the branch summation line (Is$_i$). In this embodiment, the gate terminals of all floating-gate transistors in the array are biased to the same voltage $(V_g)$ while executing computations, as illustrated in FIG. 2(a). This gate voltage is selected to bias all the floating-gate transistors in the array in multiplier mode. Under ideal conditions where parasitic parameters are negligible, the branch output current (Is$_i$) in this example is the summation of all channel currents of the floating-gate transistors connected to it as:

$$I_{S_i} =$$

$$\sum_{j} (K_n(V_g - V_s - V_{Ti,j}) * Vd_j) = \sum_{j} (K_n(V_g - V_s - V_{T0} - C_e Q_{i,j}) * Vd_j)$$

Is$_i$ is the branch output current by the i'th branch summation line, $Vd_j$ is input voltage at the j'th input line, $V_{Ti,j}$ is the threshold voltage, and $Q_{i,j}$ is the storage charge of the floating-gate transistor at the i'th column and the j'th row. Because IC technologies are able to manufacture large numbers of transistors in nearly equal properties, it is valid to assume $K_n$, $V_{T0}$, and $C_e$ of all the transistors in the array are equal.

The above discussions show that the floating-gate transistor array in FIG. 2(a) is able to execute a weighted summation $\Sigma_j (W_{i,j} * V_j)$ by setting the weight $W_{i,j} = K_n(V_g - V_s - V_{T0} - C_e Q_{i,j})$. This can be done by programming the floating-gate storage charge $Q_{i,j}$. One floating-gate transistor is therefore able to serve the functions of an analog multiplier and the same floating-gate transistor can serve as a non-volatile storage memory of the weight without the need to move the parameter from external memory to a computation circuit. Using the natural properties of electrical currents, the summation of all synapses for an output neuron is performed by one conductor line instead of a large number of binary adders. A matrix-vector operation is executed by an array of floating-gate transistors in parallel. In theory, the floating-gate transistor array in FIG. 3(a) is able to execute computations that are fully compatible with prior art digital neural network devices with dramatic advantages to cost, power, and performance. Consider a floating-gate transistor array that supports 1000 inputs and 1000 outputs, and it is able to finish one calculation in 100 nanoseconds. Such a floating-gate transistor array can achieve the performance of $10^{13}$ multiply-summations per second.

In theory, the floating-gate transistor array in FIG. 2(a) appears to be ideal for neural network computations, but significant limitations arise in practice. Prior art software-controlled configurations can flexibly configure the number of levels, the operations at each level, and the output sizes at each level. However, the prior art floating-gate transistor array in FIG. 2(a) has a fixed number of rows and columns that cannot be altered after it is manufactured. It can support a matrix computation when the number of inputs is less than or equal to M and when the number of outputs is less than or equal to N, but does not have the flexibility to support a matrix computation that has a greater number of inputs or greater number of outputs. In addition, the configuration in FIG. 2(a) only can support one level of matrix computations; it cannot support multiple levels using the same array. It is therefore desirable to make the sizes of the computation array field-programmable and to provide the capabilities to support multiple levels of matrix function computations.

Configurability is not the only problem. Because the conductor materials used to manufacture branch summation lines ($Is_i$) are not superconductors, the branch summation line's parasitic resistance is non-zero; when electrical currents flow through it, there is a current times resistance ($I*R$) induced voltage difference. At worst-case conditions, this voltage difference increases with the square of the number of transistors ($M^2$) attached to the branch summation line. Feedback mechanisms provided by the output circuit (201) can fix the voltage of the branch summation lines ($Is_i$) at a desired source voltage ($Vs$) at one end of the line, but the source voltage will change at positions away from the output end due to the $I*R$ induced voltage difference. This means the gate-to-source voltage along the conductor line is less than ($V_g-V_s$), which can cause significant error when M is large. Furthermore, the computation assumes the total current ($Is_i$) detected by the output circuit (201) is the summation of the output currents of all the floating-gate transistors connected to the branch summation line. In reality, there are error sources caused by parasitic leakage currents such as junction leakage currents or channel leakage currents. This parasitic leakage current induced error is proportional to the number of transistors (M) connected to the branch summation line. In addition, while a conductor line in theory can take summation of currents at light speed, in practice the conductor line has parasitic capacitance; there are resistance-times-capacitance ($R*C$) induced delay times and capacitance-divided-by-current ($C/I$) induced delay times. Similarly, there are $I*R$ induced voltage differences along input conductor lines ($Vd_i$) proportional to $N^2$. The parasitic resistance of the input conductor line can cause an $I*R$ voltage difference on actual drain voltages applied to transistors along the line, which is proportional to $N^2$ in the worst-case. The parasitic capacitance of the input line also causes $R*C$ and $C/I$ induced delay time along input conductor lines. These non-ideal effects are summarized in the following table (Table 1).

TABLE 1

| Error sources | Relation to array size |
|---|---|
| 1: $I*R$ induced voltage difference on branch summation line | $M^2$ |
| 2: Parasitic leakage current induced error on branch summation line | M |
| 3: $R*C$ delay on branch summation line | $M^2$ |
| 4: $C/I$ delay on branch summation line | M |
| 5: $I*R$ induced voltage difference on input line | $N^2$ |
| 6: Parasitic leakage current induced $I*R$ voltage difference on input line | $N^2$ |
| 7: $R*C$ delay on input line | $N^2$ |
| 8: $C/I$ delay on input line | N |

These error sources increase rapidly with the size of the array. Floating-gate transistor arrays configured as in FIG. 2(a) are therefore not practical when array sizes are large either in the number of inputs or the number of outputs, rendering them inapplicable for large production models used in modern day applications that can contain up to trillions of parameters. It is therefore desirable to develop practical devices that can support large-scale deep neural network computations.

Changing a parameter for a prior art floating-gate transistor neural network requires program and erase procedures-increasing the threshold voltage of a floating-gate transistor requires time-consuming pulsed programming procedures. Reducing the threshold voltage involves first erasing followed by programming to the correct value. Erase operations must erase the entire array. This means an entire array must be reprogrammed to change a single parameter. Methods for updating parameters in prior art floating-gate neural networks are therefore very complex and inconvenient relative to prior art digital neural network devices. Given that the training process of neural networks involves considerable parameter updates, this makes it difficult and expensive to train a neural network using floating-gate transistor arrays. It is therefore highly desirable to develop more efficient methods of changing parameters.

The prior art programmable-threshold voltage transistor array in FIG. 2(a) executes multiply-summation computations in parallel, achieving high performance. Synapses that carry large currents however can experience "current overload", a problem that arises when the circuit is damaged by a large volume of current concentrating in a small area. Current overload is related to the size of the transistor array: when large numbers of transistors are connected to each branch summation line, the parasitic leakage current is large. The designer must as a result increase the channel currents of the floating-gate transistors to have enough signal-to-noise ratio. This not only increases operation power but also increases the chance of current overload. It is essential to prevent current overload before using floating-gate transistors for large-scale matrix function computations.

Another problem that the prior art array in FIG. 2(a) exhibits is the "idle state power consumption" (ISPC) problem. DC currents continuously flow in the array and consume power even when computations complete. It is therefore desirable to design current mode computation circuits that consume little power when they are idle. The prior art array in FIG. 2(a) is also limited to matrix-vector computation; it is not able to support other applications such as vector-vector or convolutions.

FIG. 2(b) is a simplified schematic diagram for another prior art two-dimensional array configured to support neural network computations. In this example, gate terminals of the floating-gate transistors ($M_{1,j}$, $M_{2,j}$, . . . , $M_{i-1,j}$, $M_{i,j}$, . . . $M_{N-1,j}$, $M_{N,j}$) on the same row are connected by an input line at input voltage $V_j$, as shown in FIG. 2(b), where i is an integer greater than or equal to 1 and less than or equal to N. The drain terminals of the floating-gate transistors ($M_{i,1}$, $M_{i,2}$, . . . , $M_{i,j-1}$, $M_{i,j}$, . . . $M_{i,M-1}$, $M_{i,M}$) on the same column are connected by a branch summation line (Idi) to a current summation circuit (211), as shown in FIG. 2(b), where j is an integer greater than or equal to 1 and less than or equal to M. The current summation circuit (211) fixes the voltage on the conductor line (Id$_j$) to a predefined voltage Va and provides an output (Vo$_j$) that is proportional to the current on the branch summation line (Id$_j$). While executing matrix computations, the source terminals of all floating-gate transistors in the array are connected to ground, as illustrated in FIG. 2(b). The configurations of the branch summation lines (Id$_j$) in FIG. 2(b) are the same as those (Is$_j$) in FIG. 2(a). The differences are that (1) the voltage on the branch summation line (Vd) is higher than the source voltages of the transistors connected to it, making the connected terminals drain terminals rather than source terminals, and (2) the channel currents flow in opposite polarity for the case in FIG. 2(b) versus the case in FIG. 2(a). Under this configuration, the transistors are biased in ReLU mode; the channel current (Id$_{i,j}$) of the transistor at the i'th column and j'th row is zero when input voltage is less than its threshold voltage ($V_{Ti,j}$). When input voltage is greater than its threshold voltage ($V_{Ti,j}$) and the transistor is operating in the triode region, channel current is $$Id_{i,j} = K_n(V_j - V_{Ti,j}) * V_{DS} = K_n(V_j - V_{T0} - C_e Q_{i,j}) * V_{DS}$$

In this configuration, the synapse of the j'th input neuron $V_j$ to the i'th output neuron represented by Id$_{i,j}$ is a ReLU function, as illustrated in FIG. 1(c). The branch output current on the i'th branch summation line (Id$_j$) is $$Id_i = \sum_j K_n * V_{DS} * (V_j - V_{T0} - C_e Q_{i,j}),$$

which is a summation of ReLU functions.

Prior art digital neural network device computations often use ReLU functions as output vector functions, but do not apply such activation functions to individual synapses. For this embodiment in FIG. 2(b), the ReLU function is applied to every synapse, making it incompatible with many prior art digital neural network devices. Additionally, the configuration in FIG. 2(b) still has the parasitic parameters induced problems listed in Table 1, difficulties in training, current overload problems, the ISPC problem, and configurability problem from fixed array sizes. It is also limited to matrix-vector computations; it is not able to support other applications such as vector-vector computations or convolutions.

FIG. 2(c) is a simplified schematic diagram for another prior art two-dimensional array configured to support neural network computations. In this example, the gate terminals and drain terminals of the floating-gate transistors ($M_{1,j}$, $M_{2,j}$, . . . , $M_{i-1,j}$, $M_{i,j}$, . . . $M_{N-1,j}$, $M_{N,j}$) on the same row are connected by an input line at input voltage $V_j$, as shown in FIG. 2(c). The source terminals of the floating-gate transistors ($M_{i,1}$, $M_{i,2}$, . . . , $M_{i,j-1}$, $M_{i,j}$, . . . $M_{i,M-1}$, $M_{i,M}$) on the same column are connected by a branch summation line (Is$_j$) to a current summation circuit (221), as shown in FIG. 2(c), where j is an integer greater than or equal to 1 and less than or equal to M. The current summation circuit (221) fixes the voltage on the conductor line (Is$_j$) to a predefined reference voltage $V_s$ and provides an output (Vo$_j$) proportional to the current on the branch summation line (Is$_j$). In this configuration, the "synapse" of the j'th input neuron $V_j$ to the i'th output neuron represented by Id$_{i,j}$ is a super-linear rectifier function, as illustrated in FIG. 1(d).

For the embodiment in FIG. 2(c), the rectifier function is used in every synapse, making it incompatible with prior art digital neural network device computations. The configuration in FIG. 2(c) also possesses the problems listed in Table 1, difficulties in training, current overload problems, the ISPC problem, and the configurability problem due to fixed array sizes. It is also limited to matrix-vector computations; it is not able to support other applications such as vector-vector computations or convolutions.

FIG. 2(d) is a simplified schematic diagram for another prior art two-dimensional array configured to support neural network computations. In this example, the gate terminals of the floating-gate transistors ($M_{1,j}$, $M_{2,j}$, . . . , $M_{i-1,j}$, $M_{i,j}$, . . . $M_{N-1,j}$, $M_{N,j}$) on the same row are connected by an input line at input voltage $V_j$, as shown in FIG. 2(d). The source terminals of the floating-gate transistors ($M_{i,1}$, $M_{i,2}$, . . . , $M_{i,j-1}$, $M_{i,j}$, . . . $M_{i,M-1}$, $M_{i,M}$) on the same column are connected by a branch summation line (Is$_j$) to a current summation circuit (231), as shown in FIG. 2(d). The drain terminals of the floating-gate transistors ($M_{i,1}$, $M_{i,2}$, . . . , $M_{i,j-1}$, $M_{i,j}$, . . . $M_{i,M-1}$, $M_{i,M}$) on the same column are connected by a control line set at a control voltage Vc$_i$, as shown in FIG. 2(d). The current summation circuit (221) fixes the voltage on the conductor line (Is$_j$) to a predefined reference voltage $V_s$ and provides an output (Vo$_j$) proportional to the current on the branch summation line (Is$_j$). Under this configuration, the transistors on the same column are turned off if Vc$_i$=V$_s$. If Vc$_i$ is set at a constant voltage greater than V$_s$, the transistors will be biased in ReLU mode with the I-V relationship illustrated in FIG. 1(c).

The embodiment in FIG. 2(d) serves similar functions as the embodiment in FIG. 2(b) except that it can selectively enable or disable columns of the array using the drain voltage control lines (Vc$_i$). These control lines can work as multiplex select signals that can reduce the number of output circuits (231) to achieve better array efficiency. The configuration in FIG. 2(d) has the same advantages and disadvantages as the configuration in FIG. 2(b). The drain voltage control lines (Vc$_i$) are able to field program which columns are activated, but the computation mode of transistors are not field-programmable. The configuration in FIG. 2(c) also possesses the problems listed in Table 1, difficulties in training, current overload problems, the ISPC problem, and the configurability problem due to fixed array sizes. It is also limited to matrix-vector computations; it is not able to support other applications such as vector-vector computations or convolutions.

Park et al. in U.S. Pat. No. 4,999,525 disclosed computation memory cells that have four floating-gate transistors to support positive and negative synapse values. The floating-gate transistors are connected in ReLU mode.

Canepa et al. in U.S. Pat. No. 5,055,897 disclosed a neural cell using a special floating-gate transistor; the floating-gate of an n-channel floating-gate device is used as the gate terminal of a nearby p-channel transistor. Holler et al. in U.S. Pat. No. 5,256,911 disclosed a floating-gate transistor array for performing weighted sum computation in ReLU mode, and a special computation memory cell that comprises one floating-gate transistor and one common MOS transistor; pairs of summing currents are connected to differential amplifier to provide the possibility to have negative weighing factor. Sethi in U.S. Pat. No. 5,284,786 disclosed a split floating-gate transistor combined with a nearby common transistor to form a synapse cell. Yariv et al. in U.S. Pat. No. 5,353,382 disclosed a synapse cell that uses one floating-gate transistor plus one MOS transistor used for neural networks. Yariv's cell array was in multiplier mode. Li et al. in U.S. Pat. No. 5,444,821 disclosed a computation memory cell that has two floating-gate transistors with different polarities of drain connection to allow both positive and negative synapse values. Li's cells are connected in ReLU mode. Castro et al. in U.S. Pat. No. 5,028,810 disclosed synapse cells that used two floating-gate transistors and two common transistors to discharge a capacitor as a way to implement 4 quadrant computations. Fick et al. in U.S. Pat. No. 9,760,533 disclosed floating-gate transistor array for performing weighted sum computation in configurations that matches the prior art configuration shown in FIG. 2(d). Leobandug in U.S. Pat. No. 11,055,607 disclosed integrated circuit configuration using a floating-gate transistor array to implement neural network computations. Leobandug's synapse cells comprise floating-gate transistors with gate and source terminals connected together as input and drain used as output, similar to the configuration shown in FIG. 2(c). Holler et al. in U.S. Pat. No. 5,268,320 disclosed methods for intentionally baking flash memory devices at high temperatures as a method to calibrate weighing parameters. Such methods are not methods used to mitigate the influences of unintentional heating on results. Gong et al. in U.S. Pat. No. 16,785,797 (Gong) disclosed a temperature assisted programming of flash memory for neuromorphic computing. Gong's methods intentionally control temperature to assist programming and reading of flash memory. Such methods are not methods used to mitigate the influences of unintentional heating on results. Breitwisch et al. in U.S. Pat. No. 8,589,320 disclosed floating-gate transistors connected gate terminal and drain terminal as diode configuration to support neural network applications similar to the prior art configuration discussed in FIG. 2(c). Strukov et al. in U.S. Pat. No. 16,608,006 disclosed prior art current summation lines and used a special synapse cell that comprises two floating-gate transistors and three common MOS transistors.

None of the above and other prior art publications addressed the critical limitations caused by parasitic parameters. While such approaches may be applicable for small neural networks, none provide solutions needed to implement multiple levels of large-scale transistor tensor operations. None of the above prior art publications provide solutions to address flexibility problems caused by fixed array sizes; none mention solutions for preventing current overload problems; none mention solutions for preventing the ISPC problem. None are able to support other applications such as vector-vector computations or convolutions. All of them only use floating-gate transistors as the computation transistors.

SUMMARY

One embodiment of the present invention is directed to an integrated circuit comprising a plurality of current-mode computation (CMC) branches, each CMC branch comprising a plurality of CMC cells and a branch summation line, and a plurality of layer-one current summation circuits. An individual CMC cell may comprise at least one computation transistor, and may produce a CMC cell output current that is a function of the channel current of the computation transistor. A branch summation line may comprise an electrical conductor that may be electrically coupled to, and may receive the CMC cell output currents produced by, a plurality of CMC cells in an individual CMC branch. A branch summation line may produce a branch output current that is a current-mode summation of the received CMC cell output currents. An individual layer-one current summation circuit may be electrically coupled to, and may receive the branch output current produced by, at least one branch summation line. An individual layer-one current summation circuit may comprise a feedback circuit that can limit at least an amplitude of the received branch output current. A layer-one current summation circuit may produce a layer-one current summation circuit output current that is a function of the received branch output currents.

The integrated circuit may also comprise a plurality of layer-two summation lines and a plurality of layer-two current summation circuits. An individual layer-two summation line may comprise an electrical conductor that may be electrically coupled to, and may receive the layer-one current summation circuit output currents produced by, a plurality of layer-one current summation circuits. A layer-two summation line may produce a layer-two summation line output current that is a current-mode summation of the received layer-one current summation circuit output currents. An individual layer-two current summation circuit may be electrically coupled to, and may receive the layer-two summation line output current produced by, at least one layer-two summation line. A layer-two current summation circuit may produce a layer-two current summation circuit output current that is a function of the received layer-two summation line output currents.

The integrated circuit may also comprise a plurality of layer-three summation lines and a plurality of layer-three current summation circuits. An individual layer-three summation line may comprise an electrical conductor that may be electrically coupled to, and may receive the layer-two current summation circuit output currents produced by, a plurality of layer-two current summation circuits. A layer-three summation line may produce a layer-three summation line output current that is a current-mode summation of the received layer-two current summation circuit output currents. An individual layer-three current summation circuit may be electrically coupled to, and may receive the layer-three summation line output current produced by, at least one layer-three summation line. A layer-three current summation circuit may produce a layer-three current summation circuit output current that is a function of all received layer-three summation line output currents.

A computation transistor of at least one of the CMC cells may comprise an MOS transistor, a native transistor, or a programmable-threshold-voltage transistor, which may be a floating-gate transistor. The integrated circuit may also comprise a select transistor having a source or drain terminal that is electrically coupled to the gate terminal of a computation transistor of one of the CMC cells, or to the gate terminals of computation transistors of a plurality of CMC cells. The integrated circuit may also comprise a storage-control capacitor electrically coupled to the gate terminal of a computation transistor of each of said CMC cells while the other terminal of the storage-control capacitor is electrically coupled to a field-programmable CMC cell gate voltage control signal.

A plurality of the CMC cells may be field-programmable to operate in multiple modes, which may include a multiplier mode, a ReLU mode, a rectifier mode, and/or a saturation mode. The integrated circuit may be field-programmable to disable parts of the circuits. At least one of the layer-one current summation circuits may be field-programmable, and the integrated circuit may perform transistor tensor operations by programming one or more of the layer-one current summation circuits to combine all branch output currents received by those layer-one current summation circuits. At least one of the layer-two current summation circuits may be field-programmable, and the integrated circuit may perform transistor tensor operations by programming one or more of the layer-two current summation circuits to combine all layer-two summation line output currents received by those layer-two current summation circuits. At least one of the layer-three current summation circuits may be field-programmable, and the integrated circuit may perform transistor tensor operations by programming one or more of the layer-three current summation circuits to combine all layer-three summation line output currents received by those layer-three current summation circuits.

The integrated circuit may comprise multiple semiconductor dice that are connected by inter-dice connections. Using embodiments of the present invention, millions, billions, trillions or more of the CMC cells can be field-programmed to execute computations in parallel to support transistor tensor operations.

BRIEF DESCRIPTION OF THE DRAWINGS

FIG. 1(a) is a typical schematic symbol of a metal-oxide-semiconductor (MOS) transistor;

FIG. 1(b) is a typical schematic symbol of a floating-gate transistor;

FIGS. 1(c-e) show examples of the current vs voltage (I-V) relationship of a typical MOS transistor;

FIG. 1(f) is a symbolic diagram illustrating the principle of current-mode summation;

FIGS. 5(d-e) show simplified embodiments of inter-dice connections;

FIG. 7(a) is a simplified flow chart for programing a programmable-threshold voltage transistor;

FIG. 8(a) is a simplified flow chart for one exemplary learning algorithm of an embodiment the present invention;

FIG. 8(b) is a simplified flow chart for one exemplary learning algorithm of an embodiment of the present invention that uses current sample-and-hold circuits;

DETAILED DESCRIPTION

As discussed in previous sections, prior art floating-gate transistor arrays cannot support large-scale transistor matrix-vector operations due to the non-ideal effects listed in Table 1. These non-ideal effects increase rapidly with the size of the transistor arrays. Embodiments of the present invention overcome these problems by distribute computation cells into a large number of small units and combine the computations executed in different units to execute full large-scale computations. This architecture also reduces power consumption, solves the current overload problem, and provides configurability.

Figure 2A:
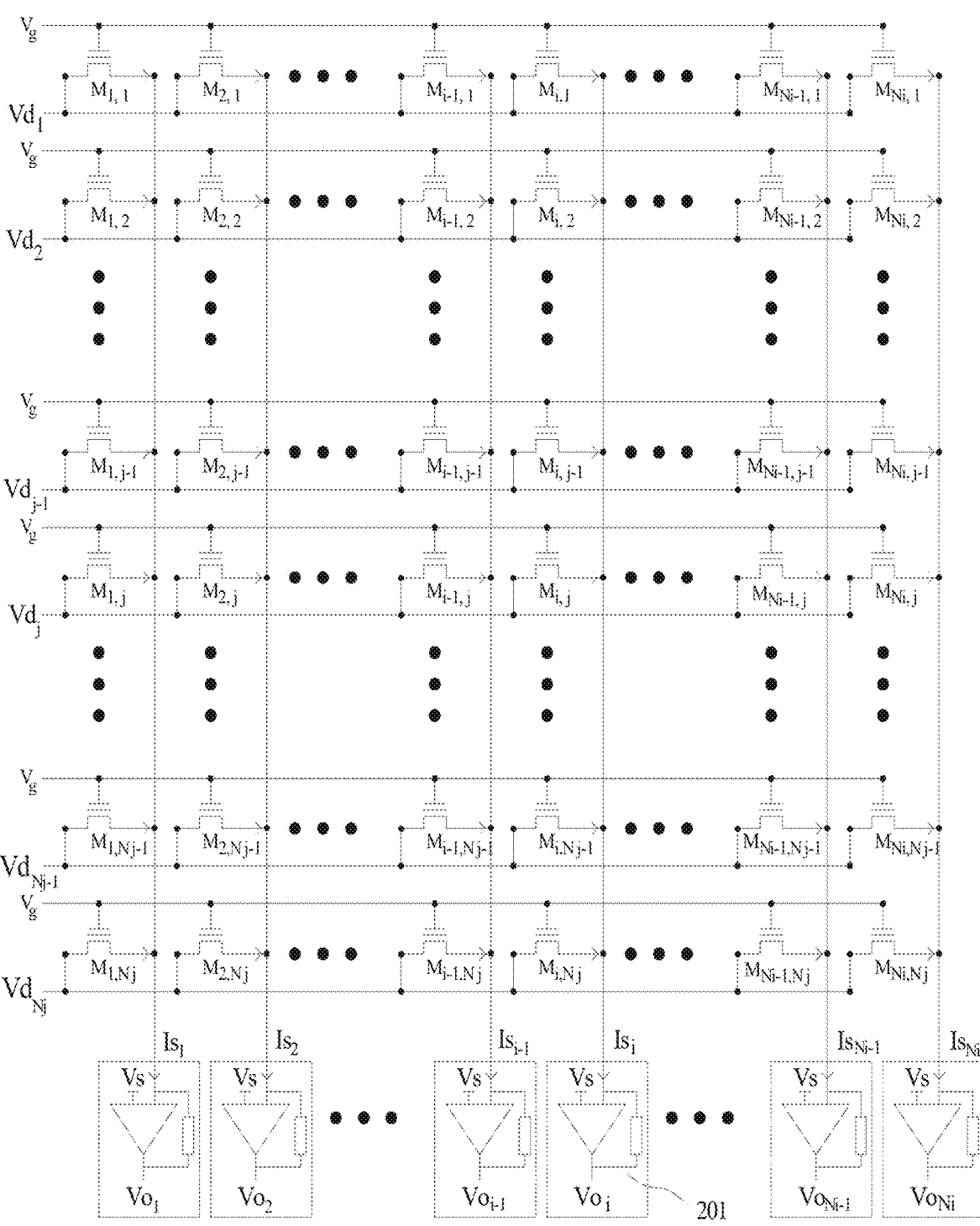
FIGS. 2(a-d) are simplified symbolic diagrams of examples of prior art floating-gate transistor arrays configured to support neural network computations.
Figure 2B:
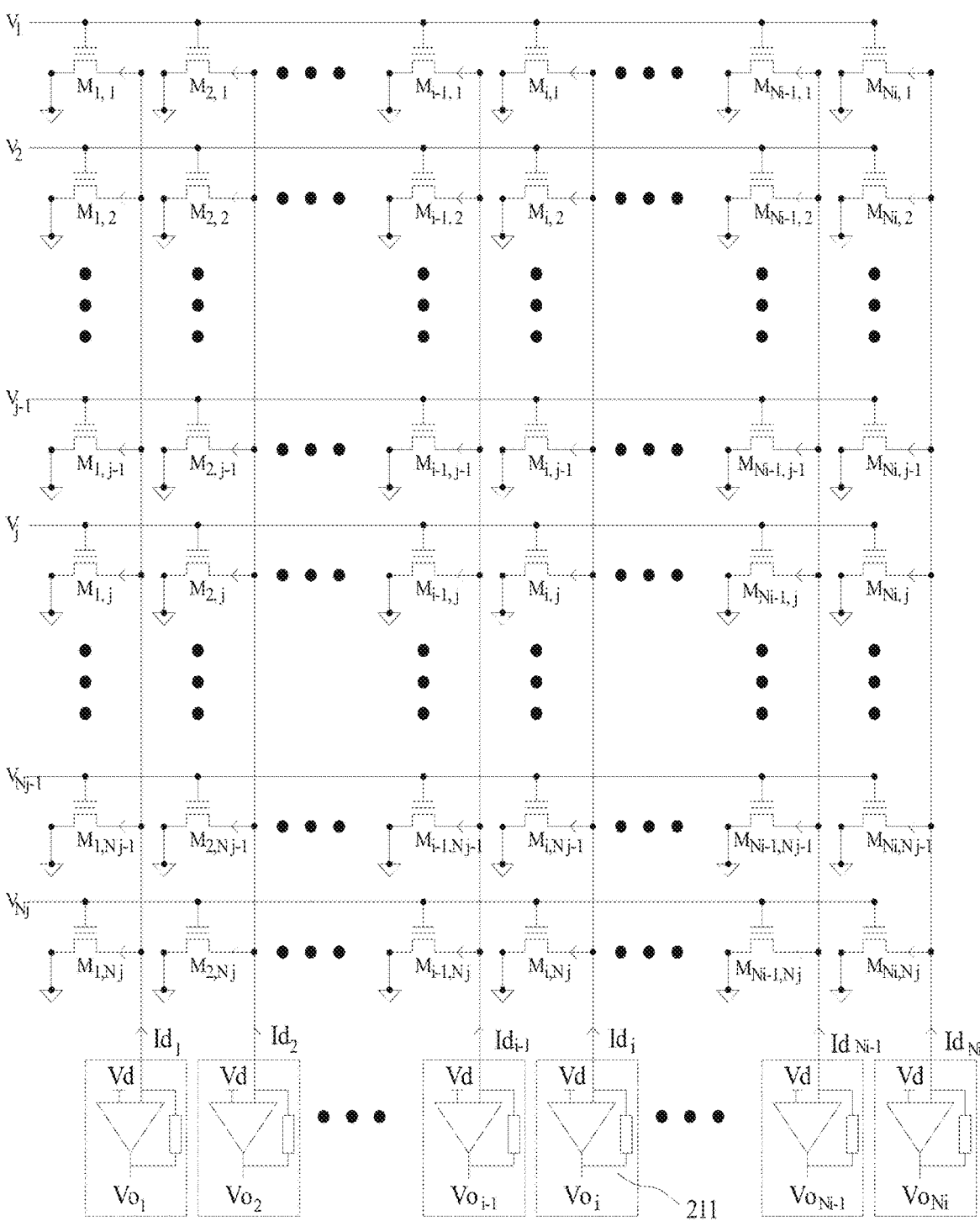
Figure 2C:
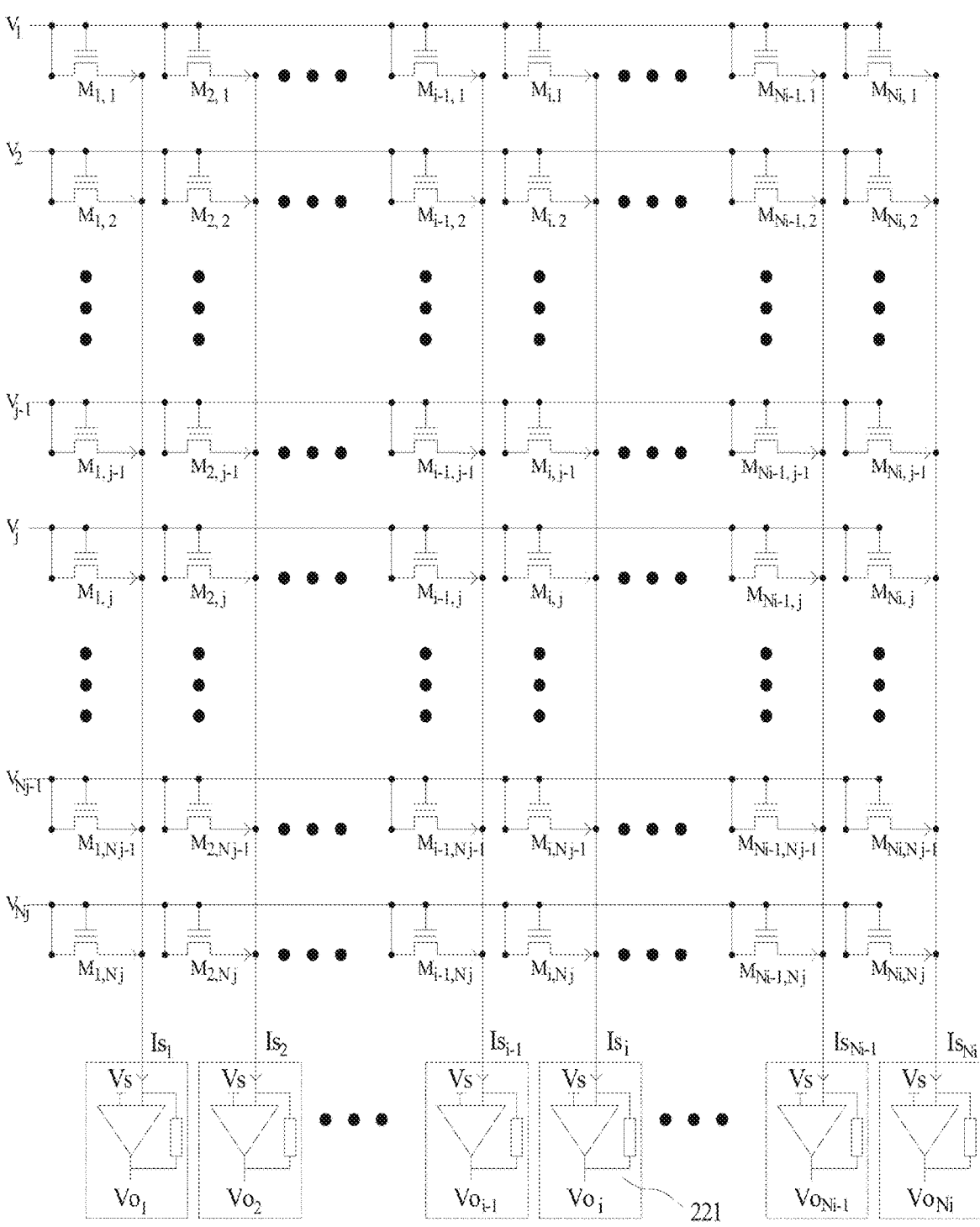
Figure 2D:
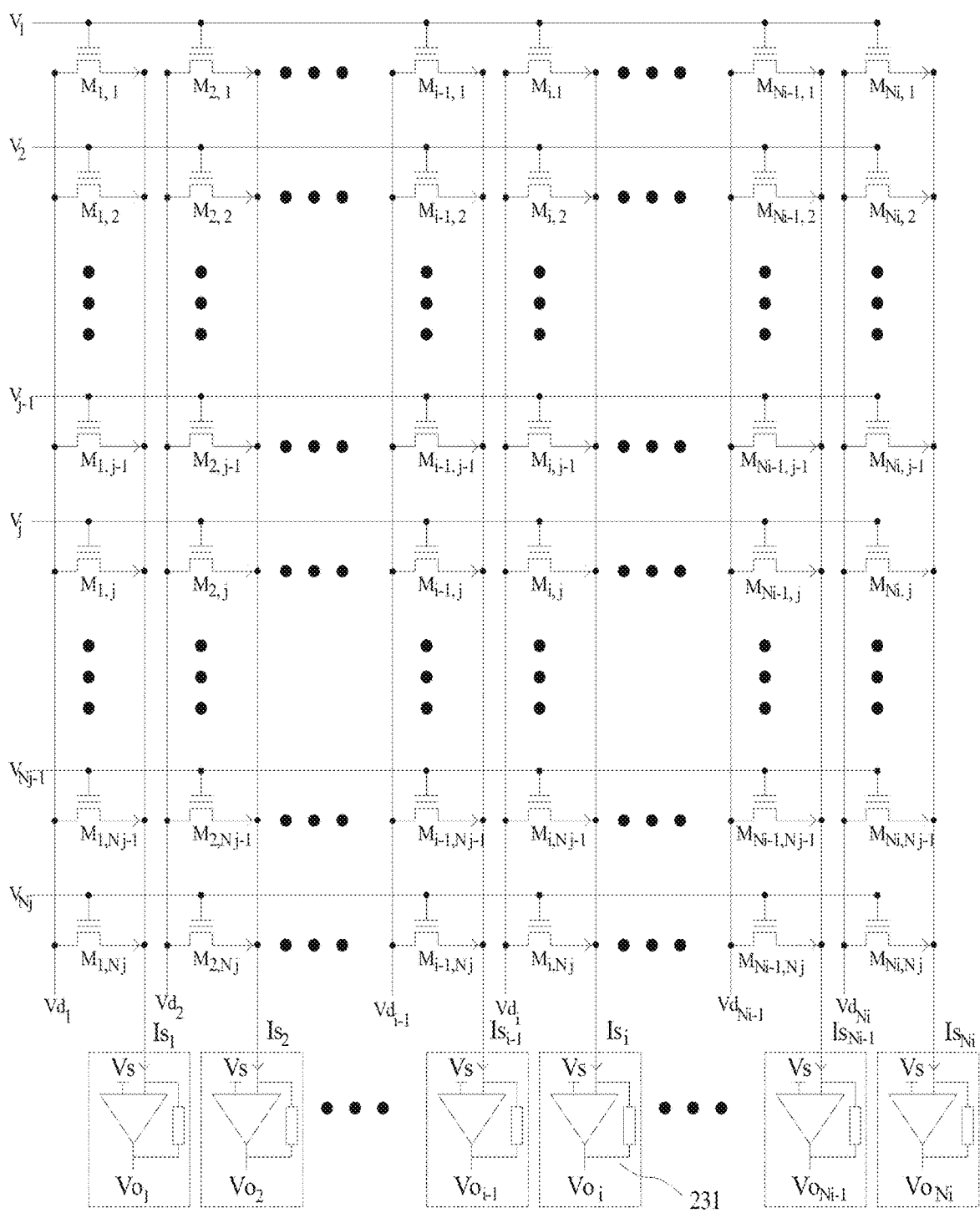
Figure 3A:
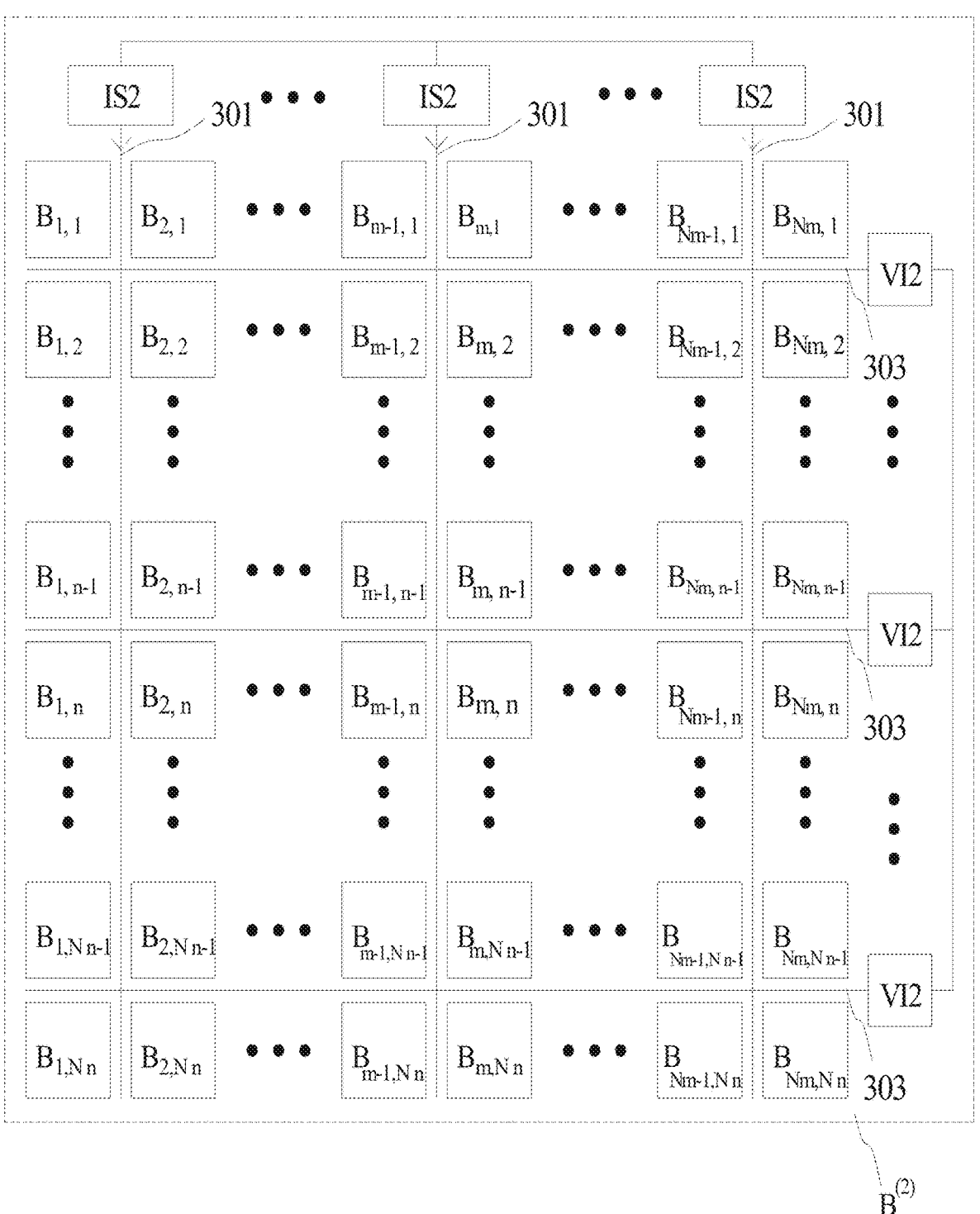
FIG. 3(a) is a simplified symbolic block diagram of one embodiment of a layer-two block of the present invention.

FIG. 3(a) is a simplified symbolic block diagram for an embodiment of a layer-two block ($B^{(2)}$) of an embodiment of the present invention. This layer-two block ($B^{(2)}$) comprises P columns and U rows of layer-one blocks ($B_{m,n}$), as shown in FIG. 3(a), where P and U are positive integers, n is an integer greater than or equal to 1 and less than or equal to U, and m is an integer greater than or equal to 1 and less than or equal to P.

Figure 3B:
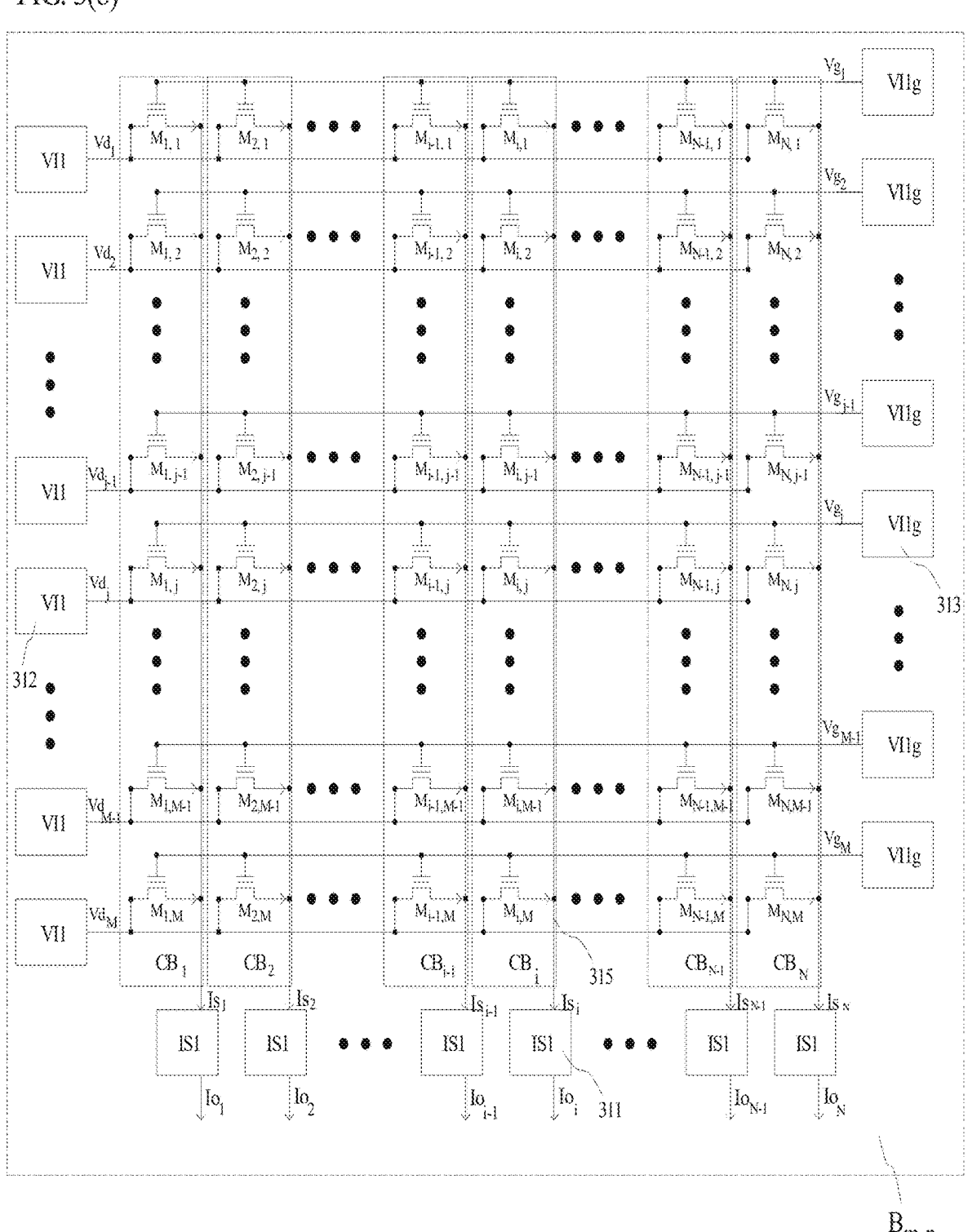
FIG. 3(b) is a simplified symbolic block diagram of one embodiment of a layer-one block in FIG. 3(a) that uses current-mode computation memory cells.
Figure 3C:
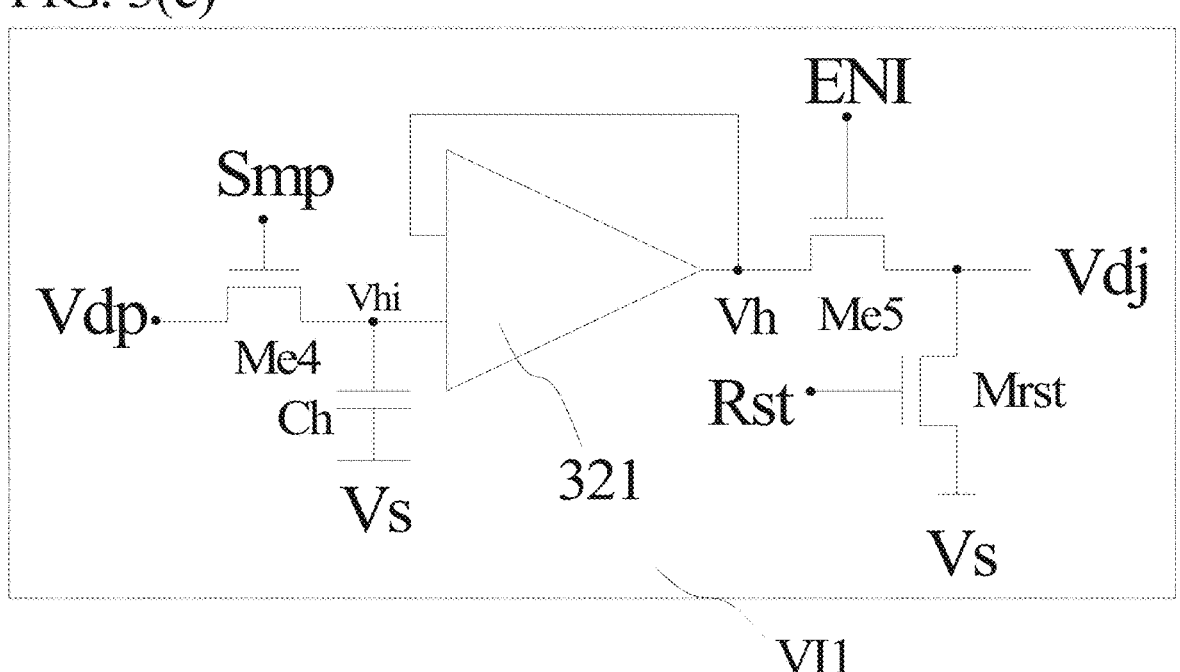
FIG. 3(c) is a simplified schematic diagram of one embodiment of a layer-one input circuit (VI1) in FIG. 3(b)

FIG. 3(b) is a simplified schematic diagram for one embodiment of a layer-one block in FIG. 3(a). This layer-one block ($B_{m,n}$) comprises a two-dimensional array of N columns and M rows of CMC cells that are configured to support transistor matrix-vector operations, where N and M are positive integers, i is an integer greater than or equal to 1 and less than or equal to N, and j is an integer greater than or equal to 1 and less than or equal to M. In this embodiment, each CMC cell comprises one programmable-threshold voltage transistor ($M_{i,j}$), which is a floating-gate transistor that is used as a computation transistor and as a memory device. The drain terminals of a subset of the floating-gate transistors ($M_{1,j}$, $M_{2,j}$, . . . , $M_{i-1,j}$, $M_{i,j}$, . . . $M_{N-1,j}$, $M_{N,j}$) are connected by a conductor line ($Vd_j$) to an drain voltage input circuit (VI1)(312), as shown in FIG. 3(b), where j is an integer greater than or equal to 1 and less than or equal to M. A conductor line (e.g $Vd_1$, $Vd_2$, . . . , $Vd_j$, . . . , $Vd_M$) that controls the drain voltages of a subset of the computation transistors in the layer-one block ($B_{m,n}$) will be called a "drain voltage input line" in the following discussions. The number (N) of transistors connected to each drain voltage input line is designed to be low enough such that the aforementioned parasitic parameter induced problems are negligible, allowing the drain voltage input line to be considered as an equal-potential electrical conductor line. FIG. 3(c) shows a simplified schematic diagram for an exemplary "sample-and-hold" (S&H) circuit that can serve the function of the drain voltage input circuit (VI1) that drives a drain voltage input line. In "sample" mode, when the field-programmable control signal Smp is activated, transistor Me4 is turned on such that the voltage (Vhi) on the storage capacitor (Ch) is substantially equal to input voltage (Vdp), as shown in FIG. 3(c). A unit gain amplifier (321) senses and drives the voltage on its input node (Vhi) to its output (Vh) at a voltage equal to Vdp during sampling mode. During "hold" mode, when the field-programmable control signal Smp is deactivated, transistor Me4 is turned off such that the voltage on the storage capacitor (Ch) is held at the previously sampled value even when the input voltage Vdp changes. When the field-programmable enable signal (ENI) is activated, and the field-programmable reset signal (Rst) is deactivated, transistor Me5 is turned on, transistor Mrst is turned off, and the output voltage on the drain voltage input line (Vdj) is driven by the unit gain amplifier (321) to be equal to its output voltage at Vh. When the field-programmable enable signal (ENI) is deactivated, and the field-programmable reset signal (Rst) is activated, transistor Me5 is turned off, transistor Mrst is turned on, and the output voltage on the drain voltage input line (Vdj) is reset to voltage Vs. The number of transistors (N) connected to the drain voltage input line (Vdj) is designed to be low enough such that the R*C delay time caused by the parasitic parameters of the input conductor line (Vdj) is no more than a fraction of the intrinsic delay time of the input circuit (VI1).

The gate terminals of the same subset of the floating-gate transistors ($M_{1,j}$, $M_{2,j}$, . . . , $M_{i-1,j}$, $M_{i,j}$, . . . $M_{N-1,j}$, $M_{N,j}$) that share the same drain voltage input line ($Vd_j$) in the layer-one block ($B_{m,n}$) are connected by another conductor line ($Vg_j$) to another gate voltage input circuit (VI1g) (313), as shown in FIG. 3(g). A conductor line (e.g $Vg_1$, $Vg_2$, . . . , $Vg_j$, . . . , $Vg_M$) that controls the gate voltages of a subset of the computation transistors in the layer-one block ($B_{m,n}$) will be called a "gate voltage input line" in the following discussions. In this embodiment, the sample-and-hold (S&H) circuit (VI1g) in FIG. 3(g) is nearly identical to the S&H circuit in FIG. 3(c), except that one terminal of its storage capacitor (Ch) is connected to a field-programmable reference voltage (Vsg) instead of a fixed voltage (Vs), as shown in the design in FIG. 3(g). When Vsg=Vs, VI1g is identical to VI1 and serves the same functions of a voltage sample-and-hold circuit based on the same operation principles exhibited by the circuit in FIG. 3(c). In "hold" mode, a change in Vsg causes a change in output voltage ($Vg_j$), providing a convenient way to execute training algorithms of an embodiment of the present invention. The number of transistors (N) connected to the gate voltage input line ($Vg_j$) is designed to be low enough such that the R*C delay time caused by the parasitic parameters of the Vg input conductor line ($Vg_j$) is no greater than a fraction of the intrinsic delay time of the gate voltage input circuit (VI1g).

The source terminals of a subset of the floating-gate transistors ($M_{i,1}$, $M_{i,2}$, . . . , $M_{i,j-1}$, $M_{i,j}$, . . . $M_{i,M-1}$, $M_{i,M}$) in the layer-one block ($B_{m,n}$) are connected by a branch summation line (315) to a layer-one current summation circuit (IS1) (311), as shown in FIG. 3(b), where j is an integer greater than or equal to 1 and less than or equal to M. During computation, feedback circuits in the layer-one current summation circuits (IS1) fix the voltages on the branch summation lines to a predefined voltage ($V_s$). Under this configuration, the channel current ($Ids_{i,j}$) of the transistor ($M_{i,j}$) at the i'th column and j'th row is a function of the threshold voltage ($V_{Ti,j}$), drain voltage ($Vd_j$), source voltage (Vs), and gate voltage ($Vg_j$) of the transistor ($M_{i,j}$) is $Ids_{i,j}((Vd_j-V_s), (Vg_j-Vs-V_{Ti,j}))$. The number of transistors (M) connected to each branch summation line ($Is_i$) is designed to be low enough so that the total parasitic leakage currents on the conductor line is negligible relative to the transistor channel currents. Under these conditions, the branch output current ($Is_i$) carried by the branch summation line (315) to the layer-one current summation circuit (311) is equal to the current-mode summation of the channel currents ($Ids_{i,j}$) of all the transistors (($M_{i,1}$, $M_{i,2}$, . . . , $M_{i,j-1}$, $M_{i,j}$, . . . $M_{i,M-1}$, $M_{i,M}$)) connected to the branch summation line:

$$Is_i = \sum\nolimits_j Ids_{i,j}\big((Vd_j - Vs), (Vg_j - Vs - V_{Ti,j})\big).$$

In this embodiment, the transistor $M_{i,j}$ serves the functions of a current mode computation (CMC) cell that executes a scalar function of two scalar inputs, ($Vd_j-V_s$) and ($Vg_j-Vs-V_{Ti,j}$), to generate a CMC cell output current ($Ids_{i,j}$) that is a function of the channel current ($Ids_{i,j}$) of the computation transistor ($M_{i,j}$). A plurality of CMC cells ($M_{i,1}$, $M_{i,2}$, . . . , $M_{i,j-1}$, $M_{i,j}$, . . . $M_{i,M-1}$, $M_{i,M}$) are coupled to a branch summation line (315) to form a current mode computation (CMC) branch ($CB_i$). This CMC branch ($CB_i$) executes transistor vector-vector operation on two input vectors ($Vd_j-Vs$)$^M$ and ($Vg_j-Vs-V_{Ti,j}$)$^M$, and produces a branch out current ($Is_i$). The branch summation line (315) is an electrical conductor that is electrically coupled to, and receives the CMC cell output currents ($Ids_{i,1}$, $Ids_{i,2}$, . . . , $Ids_{i,j-1}$, $Ids_{i,j}$, . . . , $Ids_{i,M-1}$, $Ids_{i,M}$) produced by, a plurality of CMC cells ($M_{i,1}$, $M_{i,2}$, . . . , $M_{i,j-1}$, $M_{i,j}$, . . . $M_{i,M-1}$, $M_{i,M}$) in the CMC branch ($CB_i$), and produces a branch output current ($Is_i$) that is a current-mode summation of all received CMC cell output currents. Under ideal conditions, the current-mode summation of a plurality of electrical currents ($Ids_{i,1}$, $Ids_{i,2}$, . . . , $Ids_{i,j-1}$, $Ids_{i,j}$, . . . , $Ids_{i,M-1}$, $Ids_{i,M}$) equals to the summation of those currents ($\Sigma_j Ids_{i,j}$), while in reality none ideal effects such as parasitic leakage currents or timing delay may introduce inaccuracies. The layer-one current summation circuit (IS1) is electrically coupled to, and receives the branch output current ($Is_i$) produced by, at least one branch summation line (315), and produces a layer-one current summation circuit output current ($Io_i$) that is a function of the received branch output currents ($Is_i$). Combining the functions of a plurality of the CMC branches ($CB_1$, $CB_2$, . . . , $CB_i$, . . . , $CB_N$), the layer-one block in FIG. 3(b) executes transistor matrix-vector operations. Combining the functions of large number of layer-one blocks ($B_{m,n}$) in a multiple layer architecture, millions, a billion, a trillion or more of the CMC cells can be field-programmable to execute computations in parallel using their computation transistors, together with the branch summation lines that are coupled to those CMC cells, and the layer-one current summation circuits that are coupled to those branch summation lines, to execute large scale multiple-level transistor tensor operations that can have millions, billions, trillions or more scalar computations.

The layer-one block in FIG. 3(b) has two input lines for each row of transistors—one drain voltage input line and one gate voltage input line. This configuration provides the flexibility to field-program the computation mode of each computation transistor, as listed in the following table (Table 2).

TABLE 2

| gate voltage input line | drain voltage input line | Transistor computation mode |
|---|---|---|
| Constant | input | Multiplier |
| input | Constant | ReLU |
| input | input | Rectifier |
| input | Vs | Saturation |
| Vs | Don't care | Turned off |
| Source also at Vs | Vs | Turned off |

When the voltage on the gate voltage input line is set to a constant voltage and the drain voltage input line is used to provide input signals, the computation transistors on the row operate in multiplier mode. When the voltage on the drain voltage input line is fixed and the gate voltage input line is used to provide input signals, the computation transistors on the row operate in ReLU mode. When both the drain voltage input line and the gate voltage input line are set to provide the same input voltage, the computation transistors on the row operate in rectifier mode. When the gate voltage input line is set to source voltage Vs, the computation transistors on the row are all turned off. When the drain voltage input line is set to source voltage Vs and the branch summation line is also set to voltage Vs, the computation transistors on the row are all turned off. When the drain voltage input line is set to source voltage Vs, and the branch summation lines are coupled to the layer-one saturation mode current summation circuit (IS1') in FIG. 4(c), the floating-gate transistors on the row operate in saturation mode. In other words, this configuration provides the flexibility to program a selection of the scalar functions for computation transistors.

While the preferred embodiments have been illustrated and described herein, other embodiments of the invention may incorporate modifications and changes to the embodiments described herein. In the above embodiments, while each current-mode computation (CMC) cell comprises one floating-gate transistor, the CMC cell can also use other types of programmable-threshold voltage transistors. For example, instead of trapping electrical charges in an isolated conductor, it is also possible to trap electrical charges in the insulator layer that forms the gate insulator, creating a programmable-threshold voltage transistor. Each CMC cell can have multiple transistors. CMC cells can be arranged in different geometries instead of simple two-dimensional arrays. The layer-one blocks can be arranged in different geometries instead of two-dimensional arrays. The inputs and outputs can be configured in various directions. Instead of having two sets of input lines, the layer-one blocks can have one set of input lines or more than two sets of input lines. The layer-one block in the above embodiment does not have multiplexers at its inputs and outputs, but multiplexers can be used for embodiments of the present invention to improve array efficiency. A branch summation line does not have to be a line, it can be of any shape; it also can be a combination of electrical conductors of different shapes or materials. It is to be understood that there are many other possible modifications and implementations so that the scope of the invention is not limited by the specific embodiments discussed herein.

Figure 3D:
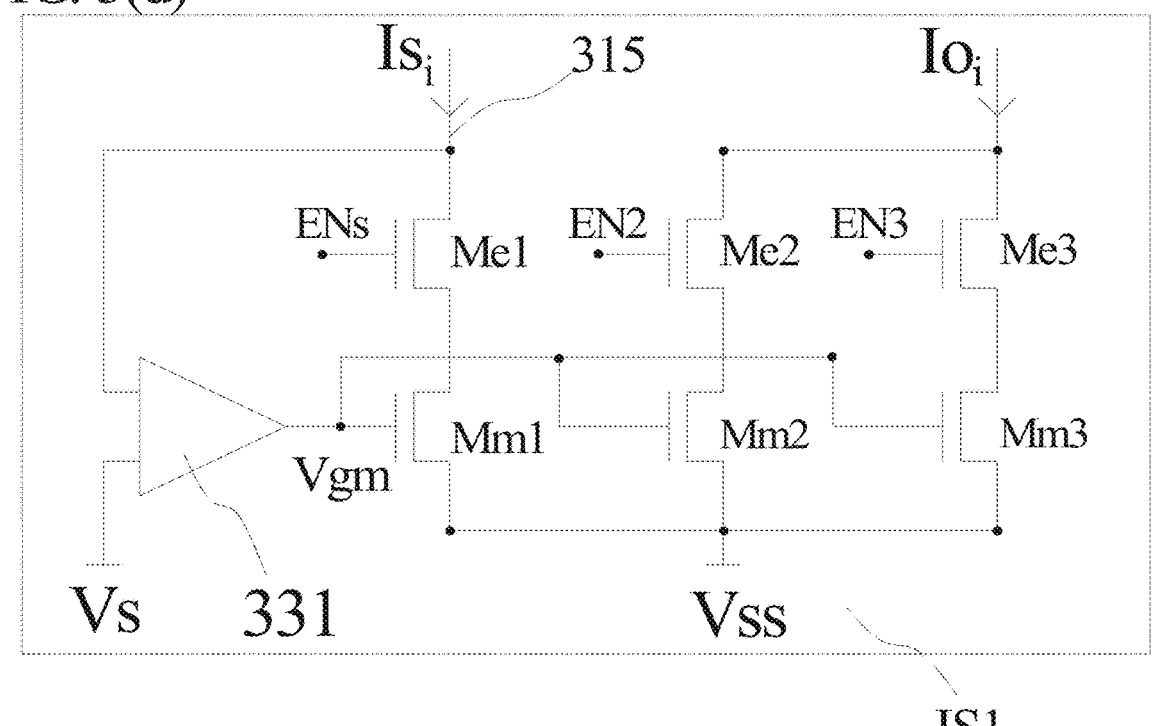
FIG. 3(d) is a simplified schematic diagram of one embodiment of a layer-one current summation circuit (IS1) in FIG. 3(b)

FIG. 3(d) is a simplified schematic diagram for one embodiment of the layer-one current summation circuit (IS1) in FIG. 3(b). A high gain amplifier (331) fixes the voltage on the branch summation line (315) to a predefined reference voltage $V_s$ and provides an output (Vgm) that controls the gate voltages of three matched transistors (Mm1, Mm2, Mm3) whose source terminals are connected together to the same voltage at Vss. The voltage $V_s$ also can be field-programmable. When the field-programmable input enable signal (Ens) is activated, select transistor Me1 is turned on and the amplifier (331) adjusts the current flowing through Mm1 to be equal to the branch output current ($Is_i$) by adjusting the gate voltage (Vgm) of matched transistors. Matched transistor Mm2 has the same gate voltage, source voltage, and properties as transistor Mm1. Therefore, when transistor Me2 is turned on by field-programmable enable signal EN2, the channel current flowing through Mm2 is designed to be equal to $(Wm2/Wm1)*Is_i$, where Wm2 is the effective channel width of transistor Mm2 and Wm1 is the effective channel width of transistor Mm1. Similarly, when transistor Me3 is turned on by field-programmable enable signal EN3, the channel current flowing through Mm3 is designed to be equal to $(Wm3/Wm1)*Is_i$, where Wm3 is the effective channel width of transistor Mm3. Matched transistors (Mm1, Mm2, Mm3) are arranged in a configuration known as "current mirrors" in the art of circuit design. The layer-one current summation circuit output current ($Io_i$) is therefore proportional to the branch output current ($Is_i$):

$$Io_i = K_i * In_i$$

$K_i$ is a scale factor depending on the design of the circuit IS1 and the status of the field-programmable enable signals (Ens, EN2, EN3). For example, when EN2 is activated and EN3 is deactivated, $K_i=(Wm2/Wm1)$; when EN2 is deactivated and EN3 is activated, $K_i=(Wm3/Wm1)$. Having multiple matched transistors (Mm2, Mm3) allows the scale factor $K_i$ to be field-programmable, and we can use more matched transistors to increase the range of selection for the scale factor. The layer-one current summation circuit output current ($Io_i$) is coupled to the layer-two summation line. If all the field-programmable enable signals (EN2, EN3) are deactivated, this output is isolated from the layer-two summation line.

A small enough layer-one block yields negligible parasitic leakage current on branch summation lines. The CMC cell output currents can be adjusted to be small while meeting the required signal-to-noise ratio. This not only saves operation power, but also mitigates the current overload problem. The layer-one current summation circuit (IS1) is also designed to prevent the "current overload" problem. Firstly, M is chosen to be low enough such that when all computation memory cells along the branch summation line are turned on at their maximum currents, the layer-one block will still not exhibit current overload. In addition, the output range of the amplifier (331) is designed to work, meaning to output a current proportional to the input summation current ($Is_i$), only when the branch current ($Is_i$) is less than a pre-calibrated maximum value ($IS_{max}$). When ($Is_i$) is close to $Is_{max}$, the amplifier (331) no longer can hold the voltage of the branch summation line at Vs, reducing the gate-to-source voltage of all transistors connected to the branch summation line and therefore the branch output current. Meanwhile, the current mirror output current ($Io_i$) is no longer proportional to the input current so that the maximum value of the output current is also limited, which prevents current overload problem at upper layers. In this way, the amplifier (331) and transistor Mm1 form a feedback circuit that can limit the amplitude of the received branch output current ($Is_i$). Transistor Mm1 and the maximum output voltage of the high gain amplifier (331) defines $Is_{max}$. Adjusting the size of transistor Mm1 can adjust $Is_{max}$. It maybe desirable to make the size of Mm1 field-programmable. Such design effectively prevents the current overload problem, and provides a way to limit operation power. The computation remains accurate as well because when $Is_i$ is close to $Is_{max}$, the output current is limited by the output function.

Figure 4A:
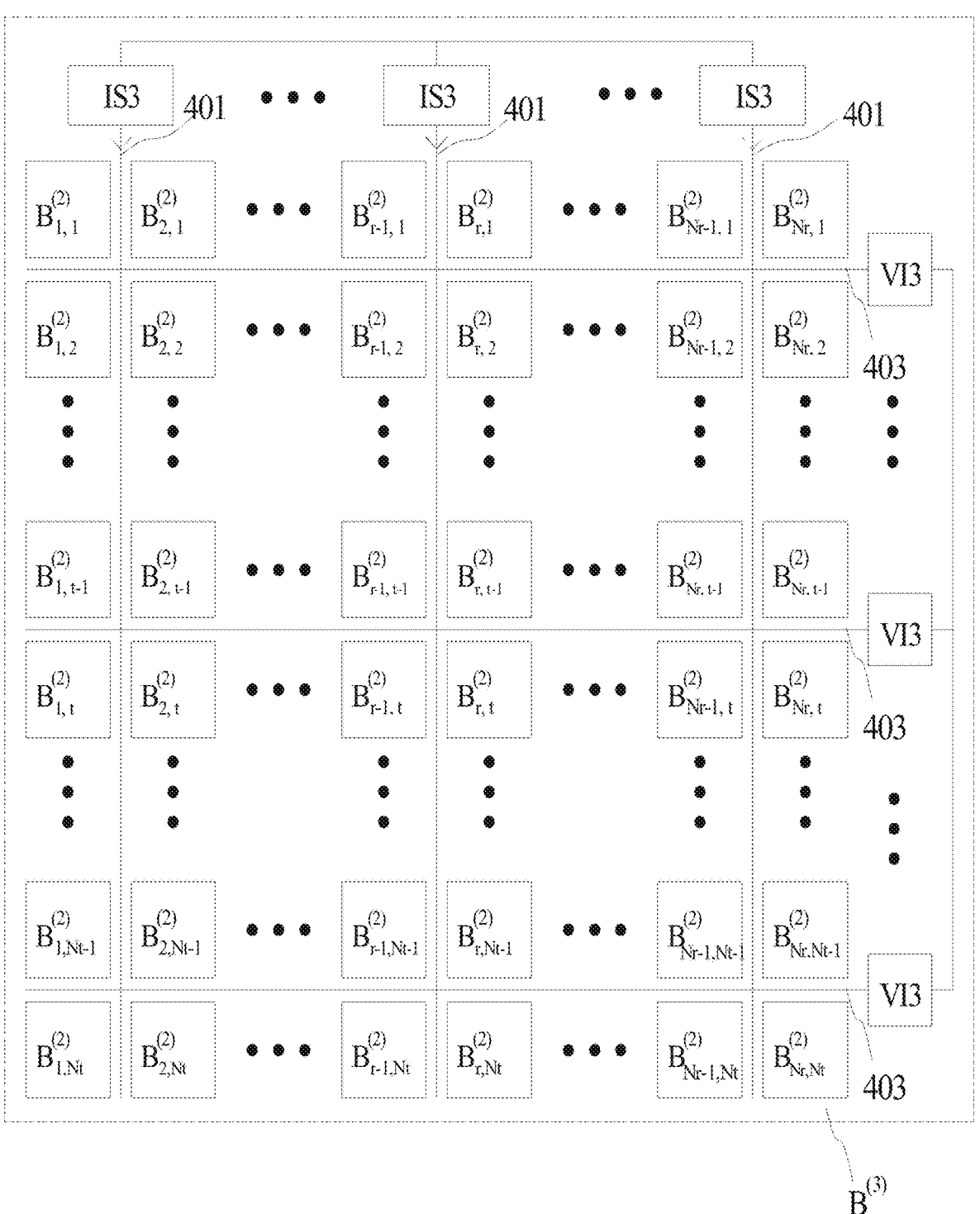
FIG. 4(a) is a simplified symbolic block diagram of one embodiment of a layer-three block of the present invention.
Figure 4B:
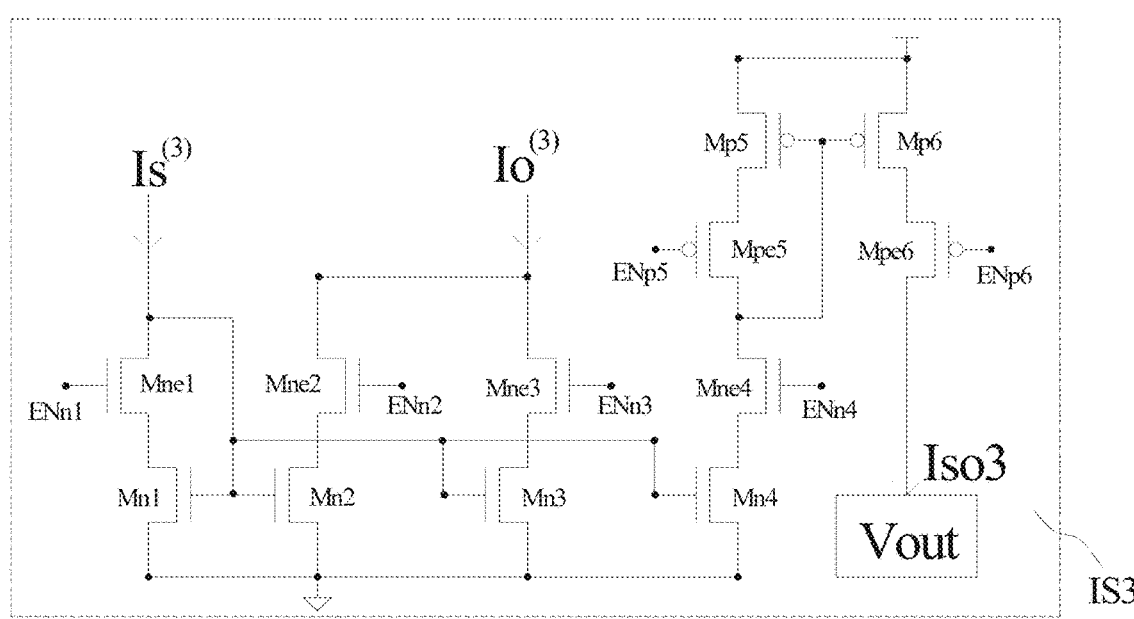
FIG. 4(b) a simplified schematic diagram of one embodiment of a layer-three current summation circuit (IS3)
Figure 4C:
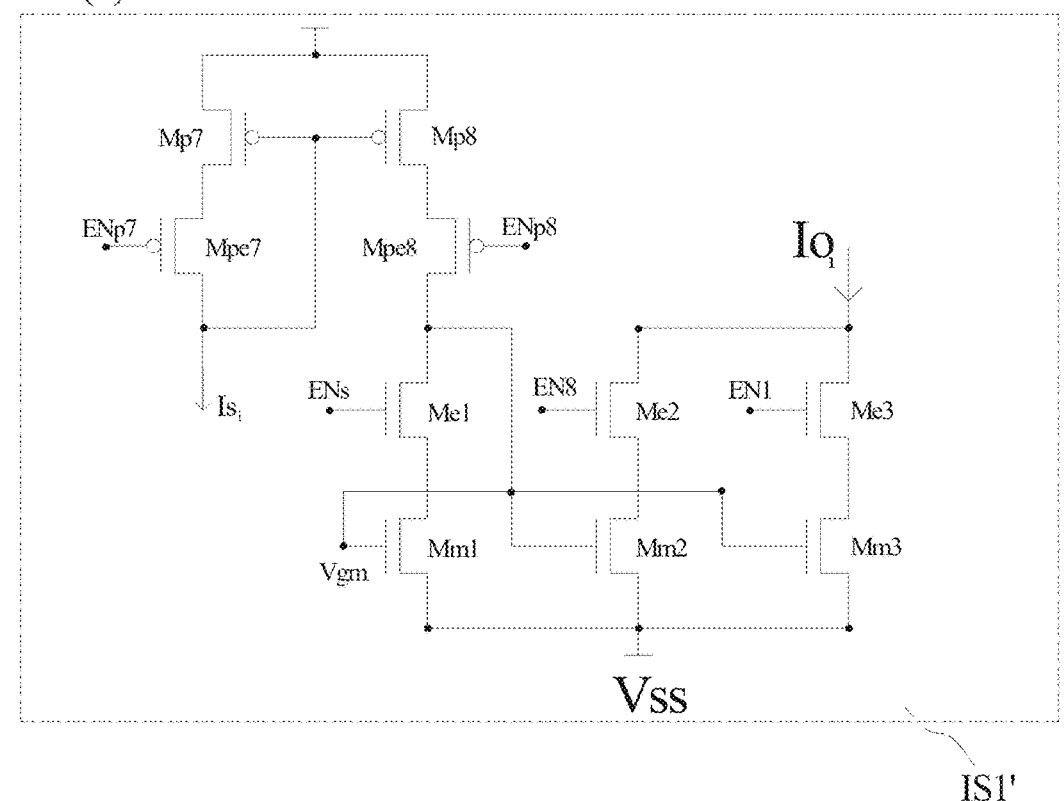
FIG. 4(c) a simplified schematic diagram of one embodiment of a layer-one current summation circuit (IS1) that can be used when the layer-one array is configured at saturation mode.

When the input functions are operating in saturation mode, the polarity of channel currents is changed and the layer-one saturation mode current summation circuit (IS1') shown in the simplified schematic diagram in FIG. 4(c) can be used. IS1' has the same n-channel current mirrors as those in FIG. 3(d). The difference is that its input stage is a p-channel current mirror formed by two matched transistors (Mp7, Mp8) and two enable transistors (Mpe7, Mpe8) as shown in FIG. 4(c). When field-programmable enable signals Enp7 and ENp8 are both activated, the branch output current ($Is_i$) is duplicated to the input of the n-channel current mirrors, providing a layer-one saturation mode current summation circuit output current ($Io_i$) that is compatible with the circuit in FIG. 3(d). At saturation mode, the channel currents of MOS transistors are not sensitive to the value of the drain voltage. IS1' therefore does not need a feedback mechanism to fix the voltage of the branch summation line in this case. Because a current mirror is significantly faster than a high gain amplifier (331), saturation mode can achieve better performance than other modes. The circuit in FIG. 4(c) is also able to prevent the current overload problem because current mirror circuits by nature have upper limitations on the amplitudes of output currents.

While the preferred embodiments have been illustrated and described herein, other embodiments of the invention may incorporate modifications and changes to the embodiments described herein. For instance, in the above embodiments, the output currents produced by the layer-one current summation circuits (IS1) or layer-one saturation mode current summation circuit (IS1') is proportional to the branch output current ($Is_i$). For more general cases, $Io_i$ can be other functions of $Is_i$ instead of a simple proportional relationship. IS1, IS1', VI1, VI1g can be designed in multiple ways. It is to be understood that there are many other possible modifications and implementations so that the scope of the invention is not limited by the specific embodiments discussed herein.

To avoid the non-ideal parasitic parameter induced problems listed in Table 1, the layer-one block ($B_{m,n}$) for embodiments of the present invention typically has a small transistor array (for example: 128 rows by 64 columns) that when combined with other blocks can support large-scale transistor tensor operations. FIG. 3(a) is a simplified symbolic block diagram showing an embodiment of a layer-two block ($B^{(2)}$) for embodiments of the present invention. The layer-two summation lines (301) are coupled to a plurality of layer-one blocks ($B_{m,n}$) as shown in FIG. 3(a). An individual layer-two summation line comprises an electrical conductor that is electrically coupled to, and receives the layer-one current summation circuit output currents produced by, a plurality of layer-one current summation circuits (IS1 or IS1') in the layer-one blocks ($B_{m,n}$), and that produces a layer-two summation line output current that is a current-mode summation of all received layer-one current summation circuit output currents. FIG. 3(e) is a simplified schematic diagram for one embodiment of the layer-two current summation circuit (IS2) in FIG. 3(a). In this embodiment, four matched transistors (Mp1, Mp2, Mp3, Mp4) and four enable transistors (Mpe1, Mpe2, Mpe3, Mpe4) are configured as current mirrors, as shown in FIG. 3(e). P-channel transistors are used in IS2 because, in this embodiment, the polarity of the input current ($Is^{(2)}$) is opposite to that of the layer-one current summation circuits (IS1). When the field-programmable enable signals Enp1 and Enp2 are activated and Enp3 is deactivated, the layer-two summation circuit output current $Io^{(2)}=(Wp2/Wp1)Is^{(2)}$, where Wp2 is the effective channel width of transistor Mp2 and Wp1 is the effective channel width of transistor Mp1. When the field-programmable enable signals Enp1 and Enp3 are activated and Enp2 is deactivated, the layer-two summation circuit output current $Io^{(2)}=(Wp3/Wp1)Is^{(2)}$, where Wp3 is the effective channel width of transistor Mp3. When the field-programmable enable signals Enp1 and Enp4 are activated, a layer-two output circuit input current $Iso=(Wp4/Wp1)Is^{(2)}$ is produced as the input current to the interface output circuit (Vout) illustrated in FIG. 3(f), where Wp4 is the effective channel width of transistor Mp4. IS2 is also able to prevent the current overload problem because current mirror circuits by nature have an upper limit on the output currents. An individual layer-two current summation circuit (IS2) is electrically coupled to, and receives the layer-two summation line output current ($Is^{(2)}$) produced by, at least one layer-two summation line (301), and produces a layer-two current summation circuit output current ($Io^{(2)}$) that is a function of all received layer-two summation line output currents.

FIG. 3(f) is a simplified schematic diagram for one embodiment of the interface output circuit (Vout) in FIG. 3(e). The layer-two output circuit input current (Iso) in FIG. 3(e) passes through a variable impedance formed by a diode (D1) and 4 field-programmable variable resistors (VR1, VR2, VR3, VR4) to generate a voltage (Vi4) connected to the input of a programmable gain amplifier (351) which drives an layer-two output voltage (Avo) that is proportional to the voltage (Vi4) at the input of the amplifier (351). The gain of this programmable gain amplifier (351) is designed to be adjustable by a reference transistor (fgTa), as shown in FIG. 3(*f*). This reference transistor (fgTa) matches the computation transistors used in CMC cells such that it has matched temperature dependence in channel current. Using this reference transistor (fgTa) as a thermometer to adjust the gain of the amplifier (351) can mitigate temperature induced variations. The field-programmable gate voltage (Vga) allows field-programmable gain control of the amplifier (351). Avo can be used as input voltage for the next level of neural network computation; it is also connected to an analog-to-digital converter (ADC) to provide digital outputs (DVo) to digital interfaces. The field-programmable variable resistors (VR1, VR2, VR3, VR4) can typically be implemented by transistors with field-programmable gate voltages. These variable resistors (VR1, VR2, VR3, VR4) allow the interface output circuit (Vout) to support different output functions. For example, when VR2 and VR3 are set to zero, Vi4 is a sigmoid function with minimum level controlled by the field-programmable voltage Vref; when VR1 and VR4 are set to zero, the output is a ReLU function; when VR3 and VR4 are set to zero, the output is a linear function. This design allows field-programmable individual selection of output functions for transistor tensor operations.

The layer-two summation lines (301) and layer-two current summation circuits (SI2) provide effective ways to expand the number of inputs for transistor tensor operations. For example, if a layer-one block can support 128 inputs, and a layer-two summation line (301) is coupled to 64 layer-one current summation circuits (IS1), then the layer-two block with two-layer current summation architecture can support transistor tensor operations with up to 8192 inputs. If less inputs are needed, unused rows or layer-one blocks are disabled. If more inputs are needed, then more columns of layer-one blocks or layer-three summation lines can be used. Biases can be implemented as one layer-one row with constant inputs.

Layer-two summation lines (301) also can suffer parasitic parameter induced non-ideal effects similar to those in Table 1. It is important to choose a proper number (U) of layer-one current summation circuits (IS1) coupled to each layer-two summation line to avoid such parasitic induced errors. Because current mirrors are not sensitive to the voltage on input lines, parasitic voltage differences are less important. The width and the length of the layer-two summation line should be designed properly to avoid significant R*C delay. The current amplification factor in the layer-one current summation circuit (IS1) should be chosen properly to have a good signal-to-noise ratio and optimum power consumption.

The layer-two block in FIG. 3(*a*) also has layer-two input circuits (VI2) that drive layer-two input lines (303). These layer-two input circuits (VI2) also can be implemented by S&H circuits similar to that (VI1) of FIG. 3(*c*). The layer-two input lines (303) are coupled to the inputs of layer-one input circuits (VI1, VI1g) in layer-one blocks (B$_{m,n}$). Therefore, the voltages on the layer-one input lines (Vd$_j$, Vg$_j$) in each layer-one block can be controlled by layer-two input circuits (VI2). This multiple-layer input configuration supports field-programmable input configurations that approach the flexibility of prior art software configurations. Such flexible multiple-layer input configurations can be used to duplicate the same sets of inputs into different layer-one blocks that have different branch summation lines in order to expand the number of outputs. For example, if a layer-one block can support 64 outputs, and each layer-two input line (303) is coupled to 32 sets of layer-one input circuits (VI1, VI1g), then the layer-two block with two-layer input architecture can support transistor tensor operations with up to 2048 outputs. If less outputs are needed, unused columns or layer-one blocks are disabled. If more outputs are needed, more columns of layer-one blocks or layer-three input lines can be used to handle more outputs.

While the preferred embodiments have been illustrated and described herein, other embodiments of the invention may incorporate modifications and changes to the embodiments described herein. For example, the layer-two, layer-three, and other upper-layer summation lines and input lines can be in different shapes (do not need to be a line) or travel along different directions. These summation lines can be a combination of different layers of metals, vias, contacts, and other components. Blocks in different layers do not need to have the same dimensions or structures, and they can be arranged in different geometries instead of two-dimensional arrays. IS2, IS3, and VOUT can be designed in multiple ways. It is to be understood that there are many other possible modifications and implementations so that the scope of the invention is not limited by the specific embodiments discussed herein. The input lines of the layer-one block in FIG. 3(*b*) are always horizontal to the branch summation lines; such configuration can support transistor matrix-vector (TMV) operations, while layer-one blocks for embodiments of the present invention can be configured in other ways to support other tensor operations such as TVV or TMM operations.

FIG. 3(*h*) shows another layer-one block (370) that comprises a plurality of "current-mode computation" (CMC) branches (CM$_1$, CM$_2$, . . . , CM$_{i-1}$, CM$_i$, . . . , CM$_N$), where i is an integer larger or equal to 1 and less than or equal to N. An individual CMC branch (CM$_i$) comprises (a) a plurality of CMC cells (C$_{i,1}$, C$_{i,2}$, . . . , C$_{i,j-1}$, C$_{i,j}$, . . . , C$_{i,M}$), where an individual CMC cell comprises at least one computation transistor and produces a CMC cell output current that is a function of the channel current of the computation transistor, such as the exemplary CMC cells illustrated in FIGS. 3(*i-m*); and (b) a branch summation line (371) that comprises an electrical conductor that is electrically couples to, and receives the CMC cell output currents produced by, a plurality of the CMC cells (C$_{i,1}$, C$_{i,2}$, . . . , C$_{i,j-1}$, C$_{i,j}$, . . . , C$_{i,M}$) in the CMC branch (CM$_i$), and that produces a branch output current (Is$_i$) that is a current-mode summation of all received CMC cell output currents. The branch summation line (371) is connected to a layer-one current summation circuit (IS1) that receives the branch output current (Is$_i$) produced by the branch summation line (371), and produces a layer-one current summation circuit output current (Io$_i$) that is a function of the received branch output current. In this embodiment, each layer-one current summation circuit (IS1) is coupled to one CMC branch (CM$_i$), while a layer-one current summation circuit can also be coupled to multiple CMC branches. Multiplexers can sometimes be used between the CMC branches and the layer-one current summation circuits. Field-programmable selection circuits can be used to selectively activate a subset of or all of the layer-one and layer-two current summation circuits in order to combine the computation capabilities of different CMC branches to support parts of or all of a large-scale transistor tensor operation.

The input connections to the CMC branches (CM$_1$, CM$_2$, . . . , CM$_{i-1}$, CM$_i$, . . . . CM$_N$) are not shown in FIG. 3(*h*) because there are many possible configurations to arrange the input connections; different input configurations can support different types of transistor tensor operations. For example, the layer-one block ($B_{m,n}$) shown in FIG. 3($b$) is a special case when the input lines ($Vd_1$, $Vd_2$, . . . , $Vd_j$, . . . , $Vd_M$; $Vg_1$, $Vg_2$, . . . , $Vg_j$, . . . , $Vg_M$) connected to its CMC branches ($CB_1$, $CB_2$, . . . , $CB_{i-1}$, $CB_i$, . . . , $CB_{N-1}$, $CB_N$) all travel in a horizontal direction and are shared by every CMC branch in the layer-one block; such configuration is suitable to support transistor matrix-vector operations. FIG. 9($a$) shows an embodiment of different configuration that is suitable to support convolution operations.

FIG. 3($i$) shows the schematic symbol for an embodiment of a CMC cell (991) that can be used for the layer-one block (370) illustrated in FIG. 3($h$). In this embodiment, the CMC cell (991) comprises one computation transistor ($MM_{i,j}$) that is controlled by the gate-to-source voltage ($VG_{i,j}$) and drain-to-source voltage ($VD_{i,j}$) and outputs its channel current ($I_{i,j}$) as the CMC cell output current. The channel current ($I_{i,j}$) is a function of $VG_{i,j}$ and $VD_{i,j}$ according to the I-V relationship of the computation transistor ($MM_{i,j}$). If the computation transistor is operating in triode region, we have $$I_{i,j} = K_n * VD_{i,j} * (VG_{i,j} - V_T)$$

where $V_T$ is the threshold voltage of the computation transistor ($MM_{i,j}$). In this embodiment, The branch output current ($Is_i$) of CMC branch $CM_i$ is the current mode summation of CMC cell output currents ($I_{i,1}$, $I_{i,2}$, . . . , $I_{i,j}$, . . . , $I_{i,M}$) of all the CMC cells ($C_{i,1}$, $C_{i,2}$, . . . , $C_{i,j}$, . . . , $C_{i,M}$) coupled to the branch summation line (371) as:

$$Is_i = \sum_j^M I_{i,j} = \sum_j^M [K_n VD_{i,j} * (VG_{i,j} - V_T)],$$

where we assume the $V_T$ of all computation transistors are the same because they are matched transistors manufactured by IC technology. The above equation shows that the summation current is proportional to the dot product of two input vectors ($VD_{i,1}$, . . . , $VD_{i,j}$, . . . , $VD_{i,M}$) and (($VG_{i,1}-V_T$), . . . , ($VG_{i,j}-V_T$), . . . , ($VG_{i,M}-V_T$)). In this embodiment, a CMC branch executes transistor vector-vector operation of two input vectors and produces a branch output current to represent the transistor vector-vector computation results. The computation transistor ($MM_{i,j}$) can use body effects as a way to reducer parasitic leakage currents. One convenient approach is to use a native transistor as the computation transistor ($MM_{i,j}$). A native transistor is an MOS transistor with a threshold voltage close to zero. Native transistors can be manufactured by proper adjustment of threshold voltage implant dosage, by adjusting the storage charge of a field-programmable-threshold voltage transistor, or by other methods. Using native transistors, we have $Is_i=\sum_j^M I_{i,j}=\sum_j^M [K_n VD_{i,j} * VG_{i,j}]$.

Each CMC branch ($CM_i$) in FIG. 3($h$) with the CMC cells illustrated in FIG. 3($i$) is able to execute the transistor vector-vector operation of two vectors of size M. The input vectors of an CMC branch can be a set of various kinds of parameters. For example, the vector can be parts or all of external input vectors, parts of all of internally vectors generated during deep level transistor tensor operation, a set of data stored in CMC memory cells, parts of or all of Hadamard parameters used for transistor convolution operations, parts of signed data, parts of multiple-precision data, or many other types of parameters. If the size of the input vector is larger than M, we can use layer-two summation lines to combine CMC branches in multiple layer-one blocks to execute dot products of large vectors. The number of layers can be increased to meet larger vector size. If vector components have both positive and negative numbers, the methods described in FIGS. 6($a$-$d$) can be used to support negative components. If the computations require greater accuracy, the methods described in FIG. 6($e$) can be used. With field-programmable configurations, CMC branches for embodiments of the present invention are able to support a wide variety of dot product computations. Since all tensor operations are based on vector dot products, CMC branches for embodiments of the present invention are therefore able to support vector-vector, matrix-vector, matrix-matrix, and other kinds of tensor operations of various size, level, and rank while achieving unprecedented performance by parallel computations.

In addition, the CMC cell in FIG. 3($i$) not only can operate in the triode region to support multiplier mode, but can also operate in other modes such as ReLU, saturation, or rectifier modes. In other words, CMC branches for embodiments of the present invention can support transistor vector-vector operations using scalar functions other than multiplication, such as ReLU, saturation, or rectifier functions. Since all transistor tensor operations are based on transistor vector-to-vector operations, CMC branches for embodiments of the present invention are therefore able to support transistor vector-vector, transistor matrix-vector, transistor matrix-matrix, and other kinds of transistor tensor operations of various size, depth, and rank while achieving unprecedented performance by parallel computations executed by CMC cells.

Transistor tensor convolution operations also can be supported by CMC branches as illustrated by the embodiment in FIG. 9($a$). In this embodiment, components of a 3 by 3 kernel matrix are used as an input vector ($W_{11}$, $W_{12}$, $W_{13}$, $W_{21}$, $W_{22}$, $W_{23}$, $W_{31}$, $W_{32}$, $W_{33}$) to a plurality of CMC branches ($CG_{11}$, $CG_{12}$, . . . , $CG_{17}$, . . . , $CG_{31}$, $CG_{32}$, . . . , $CG_{37}$, . . . ). In this embodiment, the index (ij) of each CMC branch ($CG_{ij}$) is the same as the index of the starting component ($A_{ij}$) of the input matrix. In FIG. 9($a$), each CMC cell is represented by a rectangular box with two numbers; the number on the left ($A_{ij}$) represents which element from the input matrix is provided to the input terminal of the CMC cell; and the number on the right represents which element in the convolution matrix is provided to the other input terminal of the CMC cell. For example, FIG. 9($b$) shows the schematic view of one of the CMC cells (901) in one of the CMCC branches ($CG_{33}$). This CMC cell (901) comprises one computation transistor ($MW_{32}$); the drain-to-source voltage of the computation transistor is controlled to be equal to the element $A_{54}$ of the input matrix; the gate-to-source voltage of the computation transistor is controlled to be ($W_{32}+V_T$), where $V_T$ is the threshold voltage of the computation transistor ($MW_{32}$). Therefore, the CMC cell output current ($I_c$) of the CMC cell (901) is $I_c=A_{54}*W_{32}$, which is received by the branch summation line (903) of the CMC branch ($CG_{33}$). FIG. 9($b$) is another embodiment that shows the schematic view of another CMC cell (902) in another CMC branch ($CG_{36}$). This CMC cell (902) comprises one computation transistor ($MW_{23}$); the drain-to-source voltage of the computation transistor is controlled to be equal to the element $A_{48}$ of the input matrix; the gate-to-source voltage of the computation transistor is controlled to be ($W_{23}+V_T$), where $V_T$ is the threshold voltage of the computation transistor ($MW_{23}$); therefore, the output current ($I_c'$) of the CMC cell (902) is $I_c'=A_{48}*W_{23}$, which is collected by the branch summation line (904) of the CMC branch ($CG_{36}$). The CMC cells are therefore executing the functions of a multiplier. The CMC cells also can operate in other operation modes such as ReLU mode, saturation mode, or rectifier mode. Each component of the input matrix can be used as the input of up to 9 CMC cells in 9 different CMC branches. For example, $A_{3,4}$ is the input to the 9 CMC cells marked with shaded rectangles in FIG. 9(*a*). When inputs to the CMC branches are configured as shown in FIG. 9(*a*), CMC branch ($CG_{ij}$) executes one transistor Hadamard product that is equivalent to the transistor vector-vector operation of two input vectors ($W_{11}$, $W_{12}$, $W_{13}$, $W_{21}$, $W_{22}$, $W_{23}$, $W_{31}$, $W_{32}$, $W_{33}$) and ($A_{i,j}$, $A_{i,j+1}$, $A_{i,j+2}$, $A_{i+1,j}$, $A_{i+1,j+1}$, $A_{i+1,j+2}$, $A_{i+2,j}$, $A_{i+2,j+1}$, $A_{i+2,j+2}$). Therefore, the CMC branches in FIG. 9(*a*) can support convolution operations and calculate large numbers of transistor Hadamard products in parallel.

FIG. 9(*c*) shows the schematic diagram for an exemplary circuit that can be used as the convolution current summation circuits ($S_{ij}$) in FIG. 9(*a*). The first half (921) of the circuit are the same as the layer-one current summation circuit (IS1) in FIG. 3(*d*), which uses current mirrors to generate a convolution current summation circuit output current ($Io_{ij}$) that is proportional to the branch output current ($Is_{ij}$) provided by the branch summation line. In addition, a current-to-voltage converter (922) generates a convolution current summation circuit output voltage ($AV_{ij}$) that is proportional to the branch output current ($Is_{ij}$). The gain of this current-to-voltage converter (922) is field-programmable and is temperature compensated using a matched transistor (923) as a thermometer.

FIG. 9(*d*) shows the schematic diagram for an exemplary pulling circuit (929) that takes the current-mode summation of the convolution current summation circuit output currents ($Io_{11}$, $Io_{12}$, $Io_{13}$, $Io_{21}$, $Io_{22}$, $Io_{23}$, $Io_{31}$, $Io_{32}$, $Io_{33}$) using a pulling summation line (925), and uses a current-to-voltage converter (926) to generate an output voltage ($VA_{11}$) that is proportional to the summation of the convolution current summation circuit output current ($Io_{11}+Io_{12}+Io_{13}+Io_{21}+Io_{22}+Io_{23}+Io_{31}+Io_{32}+Io_{33}$). The gain of the current-to-voltage converter (926) is field-programmable and temperature compensated using a matched transistor (927) as a thermometer. Therefore, this circuit (929) can support average-pulling operations.

FIG. 9(*e*) shows the schematic diagram for an exemplary pulling circuit (920) that connects the anode terminals of 9 native rectifiers ($D_{11}$, $D_{12}$, $D_{13}$, $D_{21}$, $D_{22}$, $D_{23}$, $D_{31}$, $D_{32}$, $D_{33}$) to the convolution current summation circuit output voltages ($AV_{11}$, $AV_{12}$, $AV_{13}$, $AV_{21}$, $AV_{22}$, $AV_{23}$, $AV_{31}$, $AV_{32}$, $AV_{33}$) of 9 convolution current summation circuits ($S_{ij}$); the cathode terminals of the native rectifiers are connected together to one terminal of a load resistor (924) and to the input of a voltage amplifier (928), as shown in FIG. 9(*e*). Each native rectifier ($D_{11}$, $D_{12}$, $D_{13}$, $D_{21}$, $D_{22}$, $D_{23}$, $D_{31}$, $D_{32}$, $D_{33}$) comprises one native n-channel MOS transistor which has a threshold voltage close to zero. The drain and gate terminals of the native MOS transistor are connected together as the anode terminal of the native rectifier; the source terminal of the native MOS transistor is used as the cathode terminal of the native rectifier. In this configuration, the cathode voltage is always larger or equal to the anode voltage of the native rectifier. The input voltage to the voltage amplifier (928) is therefore equal to the maximum voltage among all input voltages ($AV_{11}$, $AV_{12}$, $AV_{13}$, $AV_{21}$, $AV_{22}$, $AV_{23}$, $AV_{31}$, $AV_{32}$, $AV_{33}$). The output voltage ($VM_{11}$)

is proportional to the maximum of the input voltages. The gain of the voltage amplifier (928) is field-programmable and temperature compensated using a matched transistor as a thermometer. Therefore, this circuit (920) can support max-pulling operations.

While the preferred embodiments have been illustrated and described herein, other embodiments of the invention may incorporate modifications and changes to the embodiments described herein. For example, in the above embodiment the kernel matrix parameters are represented by gate voltages of the computation transistor in the CMCC cells; the drain voltage can also be used for the same purpose. It is to be understood that there are many other possible modifications and implementations so that the scope of the invention is not limited by the specific embodiments discussed herein. The above embodiments in FIGS. 9(*a-e*) are simplified examples for convolutions using a 3 by 3 kernel matrix, but the same principles are applicable to wide varieties of tensor convolution operations. For example, to support a 4 by 4 kernel, each CMC branch should have at least 16 CMC cells and each input matrix element can be the input to 16 different CMC branches. The pulling circuits in FIG. 9(*d, e*) can have greater or fewer inputs. Other types of pulling circuits also can be used. To support a standard convolution over a color image convolution, the kernel is typically three dimensional such as 5 by 5 by 3. Each CMCC branch in this case must comprise at least 75 CMCC cells. We can also use a layer-two summation line to combine more than one CMCC branch to support one transistor Hadamard product. Architectures for embodiments of the present invention can also be field programmed to support multiple levels of convolution tensor operations and/or pulling operations, in combination with multiple levels of transistor matrix-vector operations of different dimensions. Such operations can be done in one integrated circuit die or by a combination of multiple dice of integrated circuits. Tensor operations can be executed in parallel and/or pipelined using integrated circuits in architectures for embodiments of the present invention, achieving performances that are orders of magnitude greater than prior art GPUs and TPUs. It is highly desirable to connect multiple dice of integrated circuits of embodiments of the present invention using inter-dice connections illustrated in FIG. 5(*d, e*). It is also highly desirable to combine other types of integrated circuits such as image sensors, CPUs, GPUs, TPUs, image displays, and other ICs with ICs of embodiments of the present invention by inter-dice connections.

FIG. 3(*j*) shows the schematic symbol for another embodiment of a CMC cell (992) that can be used in the layer-one block ($B_{m,n}$) illustrated in FIG. 3(*h*). In this embodiment, the CMC cell (992) comprises one field-programmable-threshold voltage transistor ($FM_{i,j}$) that is controlled by the gate-to-source voltage ($VG_{i,j}$), drain-to-source voltage ($VD_{i,j}$), and the storage charge stored in its floating-gate ($Q_{i,j}$). Its channel current ($I_{i,j}$) is the CMC cell output current. The channel current ($I_{i,j}$) is a function of ($VG_{i,j}-V_{T0}-C_eQ_{i,j}$) and $VD_{i,j}$ according to the I-V relationship of the transistor. A CMC branch equipped with such CMC cells (992) is therefore able to support transistor vector-vector operations of two input vectors ($VD_{i,1}$, . . . , $VD_{i,j}$, . . . , $VD_{i,M}$) and (($VG_{i,1}-V_{T0}-C_eQ_{i,1}$), . . . , ($VG_{i,j}-V_{T0}-C_eQ_{i,j}$), . . . , ($VG_{i,M}-V_{T0}-C_eQ_{i,M}$)). The most common embodiment of field-programmable-threshold voltage transistors are floating-gate MOS transistors. The floating-gate transistor ($FM_{i,j}$) not only can execute scalar functions supported by common MOS transistors as a computation transistor, but can also serve as a memory device for storing operation parameters.

Figure 3H:
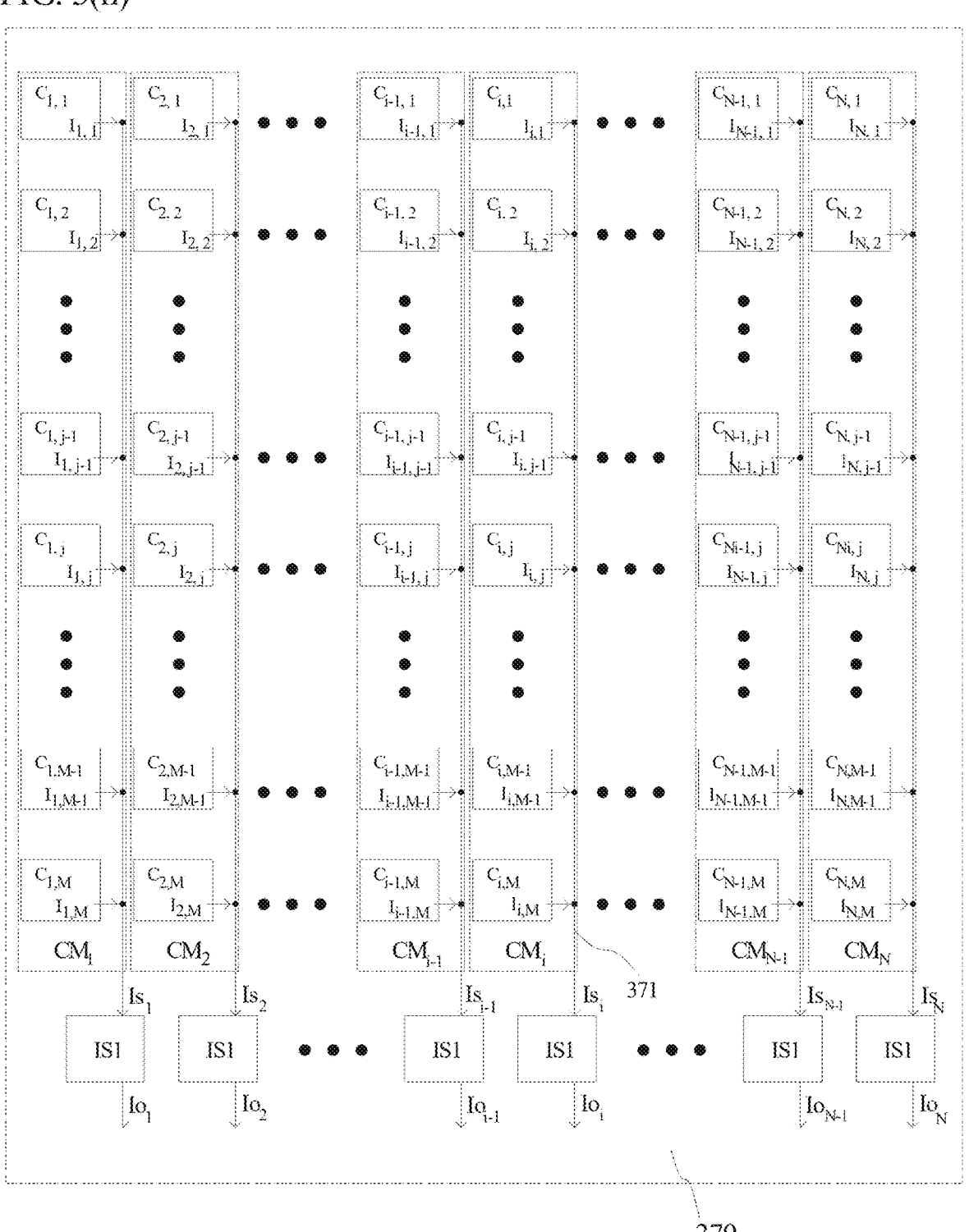
FIG. 3(h) is a simplified symbolic block diagram of one embodiment of a layer-one block in FIG. 3(a)
Figure 3I:
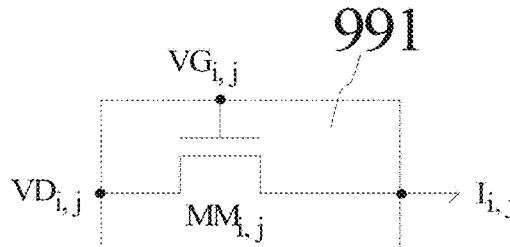
FIG. 3(e) is a simplified schematic diagram of one embodiment of a layer-two current summation circuit (IS2)
FIG. 3(f) is a simplified schematic diagram of one embodiment of an interface output circuit (VOUT) in FIG. 3(e)
FIG. 3(g) is a simplified schematic diagram of one embodiment of a layer-one gate voltage input circuit (VI1g) in FIG. 3(b)
FIGS. 3(i-m) are simplified schematic diagram of embodiments of current mode computation cells.
Figure 3J:
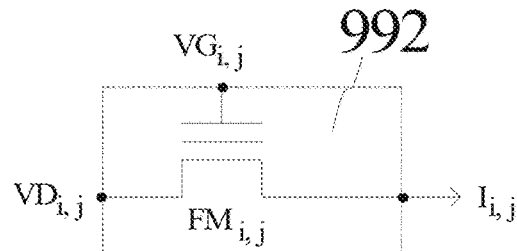
Figure 3K:
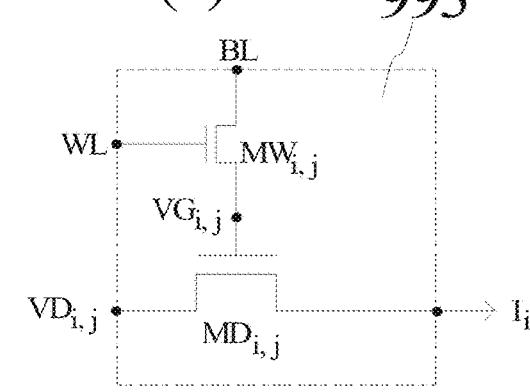

FIG. 3(k) shows the schematic symbol for another embodiment of a CMC cell (993) that can be used in FIG. 3(h). This CMC cell comprises one computation transistor $(MD_{i,j})$ that executes scalar computations and provides its channel current $(I_{i,j})$ as the cell output current of the CMC cell. One select transistor $(MW_{i,j})$ provides the gate voltage $(VG_{i,j})$ of the computation transistor from an cell gate voltage input line (BL) when the select transistor is activated by its gate select signal (WL) and isolates the gate terminal of the computation transistor from the cell gate voltage input line (BL) when the select transistor is deactivated by WL. This select transistor $(MW_{i,j})$ can be an MOS transistor (including a native transistor), a field effect transistor, or other types of transistors; it also can be a variable resistor controlled by WL. This CMC cell (993) is able to support all transistor tensor operations that the CMC cell (991) in FIG. 3(i) can support. In addition, this CMC cell (993) also functions as a memory device by holding the value of the gate voltage of the computation transistor $(MD_{i,j})$. However, it cannot fix the voltage indefinitely due to non-ideal effects such as leakage currents. To maintain the value of the gate voltage, it can "refresh" the value by rewriting the same value periodically, similar to how memory is updated in dynamic random access memory (DRAM). This CMC cell (993) is therefore a current-mode computation dynamic memory cell.

Figure 3L:
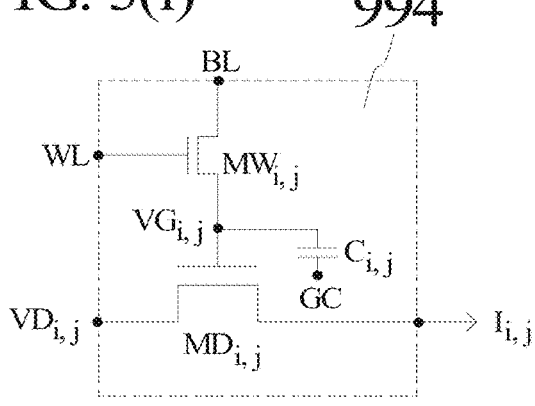

FIG. 3(l) shows the schematic symbol for another embodiment of a CMC cell (994) that is nearly identical to the CMC dynamic memory cell (993) in FIG. 3(k). This cell however has a storage-control capacitor $(C_{i,j})$; one terminal of $(C_{i,j})$ is coupled to the gate terminal of the computation transistor $(MD_{i,j})$ and the other terminal is coupled to a field-programmable CMC cell gate voltage control signal (GC). When the voltage on GC is a constant, the storage-control capacitor $(C_{i,j})$ behaves as a storage capacitor that helps to reduce the influence of leakage currents and voltage coupling problems, similar to the functions of the storage capacitors in DRAM memory cells. When GC is controlled as an input signal, then the CMC cell in FIG. 3(l) functions as a floating gate device that can support the functions of the CMC cell in FIG. 3(j), where $VG_{i,j}$ behaves as the floating gate and GC as the gate of the floating gate device, except that the storage charge of this device may need to be refreshed periodically.

Figure 3M:
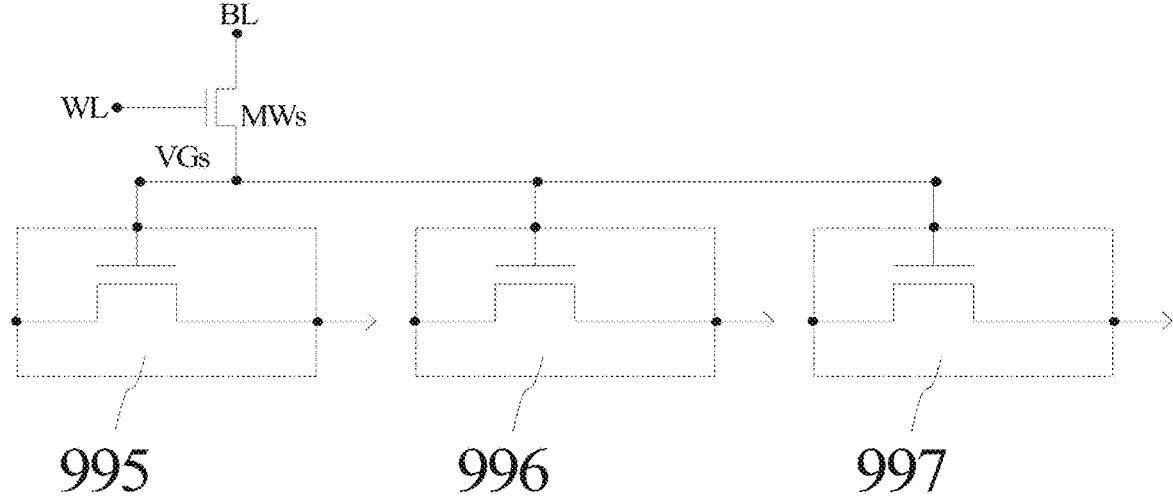

FIG. 3(m) shows the schematic symbol for an embodiment of a plurality of CMC cells (995, 996, 997) that share one select transistor $(MW_s)$ that provides the gate voltage $(VG_s)$ of the computation transistors in those CMC cells (995, 996, 997) from an cell gate voltage input line (BL) when the select transistor is activated by its gate select signal (WL) and isolates the gate terminals of those computation transistors from the cell gate voltage input line (BL) when the select transistor is deactivated by WL. The CMC cells (995, 996, 997) can be in different CMC branches. The circuit in FIG. 3(m) is also a type of CMC dynamic memory cell because it can store and maintain datum with dynamic refresh procedures. Such design is useful when the same input is shared by multiple CMC cells like when performing transistor convolution tensor operations. For CMC dynamic memory cells of embodiments of the present invention, reduction of transistor leakage currents is more important than transistor performance. Use of body effects by proper selection of substrate voltages can reduce leakage currents.

While the preferred embodiments have been illustrated and described herein, other embodiments of the invention may incorporate modifications and changes to the embodiments described herein. The transistor in the CMC cell shown in FIG. 3(i) is an n-channel MOS transistor, while other types of transistors such as p-channel transistors, field-effect transistors (FET), bipolar transistors, and combinations of other types of electrical devices also can be used in CMC cells. The CMC cell output current does not have to be the drain-to-source current; a source-to-drain current also can be used as the output current. Combinations of channel currents from multiple sources also can be used as the CMC cell output current. Current art IC technologies typically manufacture transistors that are optimized for speed. For transistors used in CMC cells of embodiments of the present invention, low leakage and low power are of greater priority. Body effects can be used to reduce leakage currents of the transistors in the CMC cells. It is to be understood that there are many other possible modifications and implementations so that the scope of the invention is not limited by the specific embodiments discussed herein.

FIG. 4(a) is a simplified symbolic block diagram of an embodiment of a layer-three block $(B^{(3)})$ of the present invention. This layer-three block $(B^{(3)})$ comprises R columns and T rows of layer-two blocks $(B^{(2)}_{r,t})$, where R and T are positive integers, r is an integer greater than or equal to 1 and less than or equal to R, and t is an integer greater than or equal to 1 and less than or equal to T. The layer-three summation lines (401) are coupled to the layer-two current summation circuit (IS2) inside those layer-two blocks $(B^{(2)}_{r,t})$. Embodiments of layer-two blocks are illustrated in FIG. 3(a, h), while an embodiment of layer-two current summation circuit (IS2) is illustrated in FIG. 3(e). An individual layer-three summation line (401) comprises an electrical conductor that is electrically coupled to, and receives the layer-two current summation circuit output currents produced by, a plurality of layer-two current summation circuits (IS2), and that produces a layer-three summation line output current $(Is^{(3)})$ that is a current-mode summation of the received layer-two current summation circuit output currents (ideally, $Is^{(3)}=\Sigma_s Io^{(2)}_s$). This layer-three block $(B^{(3)})$ comprises a plurality of layer-three current summation circuits (IS3), wherein an individual layer-three current summation circuit is electrically coupled to, and receives the layer-three summation line output current $(Is^{(3)})$ produced by, at least one layer-three summation line (401), and produces a layer-three current summation circuit output current $(Io^{(3)})$ that is a function of all received layer-three summation line output currents $(Is^{(3)})$. FIG. 4(b) is a simplified schematic diagram of one embodiment of the layer-three current summation circuit (IS3) in FIG. 4(a). In this embodiment, four matched transistors (Mn1, Mn2, Mn3, Mn4) and four enable transistors (Mne1, Mne2, Mne3, Mne4) are connected as current mirrors, as shown in FIG. 4(b). N-channel transistors are used in IS3 because the polarity of the input current $(Is^{(3)})$ is opposite of that of the layer-two current summation circuits (IS2). In addition, two matched p-channel transistors (Mp5, Mp6) and two enable transistors (Mpe5, Mpe6) are connected as a current mirror to duplicate the current amplitude and invert the polarity of the current flows through Mn4, as shown in FIG. 4(b). When the field-programmable enable signals ENn1 and ENn2 are activated and ENn3 is deactivated, the layer-three summation circuit output current $Io^{(3)}=(Wn2/Wn1)Is^{(3)}$, where Wn2 is the effective channel width of transistor Mn2 and Wn1 is the effective channel width of transistor Mn1. When the field-programmable enable signals ENn1 and ENn3 are activated and ENn2 is deactivated, the output current $\text{Io}^{(3)}=$ (Wn3/Wn1)$\text{Is}^{(3)}$, where Wn3 is the effective channel width of transistor Mn3. When the field-programmable enable signals ENn1, ENn4, ENp5, and ENp6 are activated, a current Iso3=(Wn4/Wn1)$\text{Is}^{(3)}$ is sent to the interface output circuit (Vout), as illustrated in FIG. 4(b), where Wn4 is the effective channel width of transistor Mn4. The function of the interface output circuit (Vout) in this embodiment can be the same as that in FIG. 3(f). IS3 is also able to prevent current overload because current mirror circuits by nature have an upper limitation on maximum value of output currents.

The layer-three block ($\text{B}^{(3)}$) in FIG. 4(a) also has layer-three input circuits (VI3) that drive layer-three input lines (403). These layer-three input circuits (VI3) also can be implemented by S&H circuits similar to that of FIG. 3(c). The layer-three input lines (403) and layer three input circuits (VI3) provide field-programmable controls on the layer-two input circuits (VI2) in all the layer-two blocks ($\text{B}^{(2)}_{r,t}$). Therefore, the voltages on the layer-one input lines (Vd$_j$, Vg$_j$) in all layer-one blocks included in this layer-three block ($\text{B}^{(3)}$) can be controlled by those layer-three input circuits (VI3). This multiple-layer input configuration supports field-programmable input configurations that approaches the flexibility of prior art software configurations. Such flexible multiple-layer input configurations can be used to duplicate the same sets of inputs into different layer-one blocks that have different branch summation lines in order to expand the number of outputs. If the number of inputs is greater than the capacity of one layer-two block, we can use the layer-three current summation circuits (IS3) to form a three-layer current summation structure to support more inputs without significant increases in delay time. If insufficient, more layers can be added until the requirement is fulfilled. Similarly, layer-three input circuits (VI3) can be used to expand the number of output neurons.

Figure 5A:
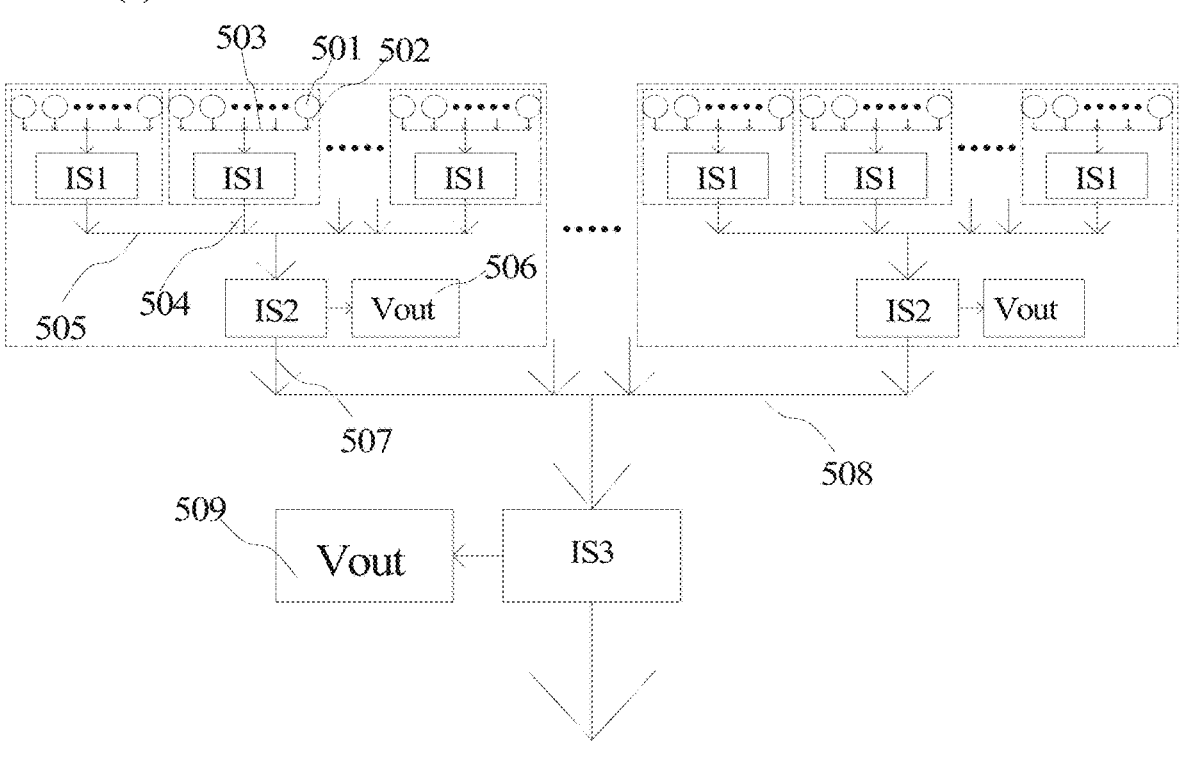
FIG. 5(a) is a simplified symbolic block diagram of one embodiment of a multiple-layer current summation configuration of the present invention.

FIG. 5(a) is a simplified block diagram for an embodiment of a multiple-layer summation line architecture of the present invention described in FIGS. 3(a-h) and in FIGS. 4(a-c). A subset of CMC cells (501) represented symbolically by small circles in FIG. 5(a) are coupled to a branch summation line (503). All the cell output currents (502) from those CMC cells (501) flow into the branch summation line (503) that brings current mode summation of all the cell output currents to a layer-one current summation circuit (IS1). This circuit produces a layer-one current summation circuit output current (504) that is a function of the summation of all CMC cell output currents (502) from the CMC cells (501) coupled to the branch summation line (503). All layer-one current summation circuit output currents (504) of the layer-one current summation circuits (IS1) are received by a layer-two summation line (505) and are inputted to a layer-two current summation circuit (IS2) that produces a layer-two summation circuit output current (507) that is a function of the current-mode summation of the layer-one current summation circuit output currents received by the layer-two summation line (505). Similarly, the layer-two current summation circuit output currents (507) are received by a layer-three summation line (508) such that the summation of the IS2 output currents is input to a layer-three current summation circuit (IS3). This multiple layer architecture can be expanded to an arbitrary number of layers. If the number of inputs can be supported in layer-two, IS2 can send the result of current summation to an interface output circuit (506) that produces the inputs for the next level transistor tensor operation or produces digitized outputs to a digital interface. If a third layer is needed, then outputs are produced at the layer-three interface output circuit (509). One can continue to add additional layers as needed-outputs will be produced at the final layer. If one semiconductor dice cannot provide the needed computation memory cells, upper layer summation lines or input lines can be implemented by inter-dice connections to expand parallel transistor computations beyond dice boundaries, as illustrated in FIG. 5(d, e). The architecture illustrated in FIG. 5(a) provides flexibility to configure CMC cells to support large-scale transistor tensor operations. Prudent designs of the summation lines in each layer can mitigate non-ideal parasitic parameters induced problems such that the delay time introduced by each layer is only the delay time of current mirrors. With this architecture, large-scale transistor tensor operations can be executed within a few gate delays.

Figure 5B:
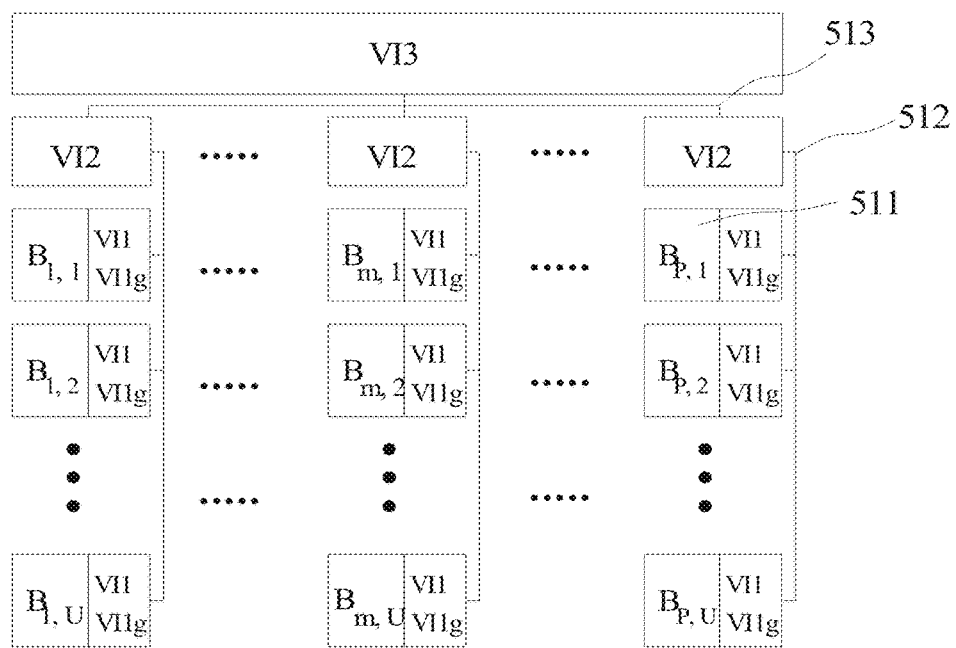
FIG. 5(b) is a simplified symbolic block diagram of one embodiment of a multiple-layer input configuration of the present invention.

FIG. 5(b) is a simplified block diagram for an embodiment of input control architecture of the present invention described in FIGS. 3(a-h) and in FIGS. 4(a-c). Layer-three input circuits (VI3) drive layer-three input lines (513) under field-programmable controls to reach layer-two input circuits (VI2). Layer-two input circuits (VI2) drive layer-two input lines (512) under field-programmable controls to reach layer-one input circuits (VI1, VI1g). Layer-one drain voltage and gate voltage input circuits (VI1, VI1g) drive layer-one input lines inside layer-one blocks ($\text{B}_{i,j}$) to configure CMC cells. All input circuits (VI3, VI2, VI1, VIg) in various layers only drive a limited number of active devices, mitigating non-ideal parasitic parameter induced problems. If the number of outputs is greater than the number of outputs in layer-one blocks, the inputs are duplicated to other layer-one blocks that have different current summation trees, effectively expanding the overall number of outputs. Careful designs for the input lines in each layer can mitigate non-ideal parasitic parameter induced problems such that the delay time introduced by each layer is the delay time of input circuits (VI3, VI2, VI1, VI1g): one analog gate delay per layer. The architecture illustrated in FIG. 5(b) provides flexibility to configure CMC cells to support transistor tensor operations of various sizes. With this architecture, large-scale transistor tensor operations can be executed in parallel within a few gate delays.

Figures 5C, 5D, 5E:
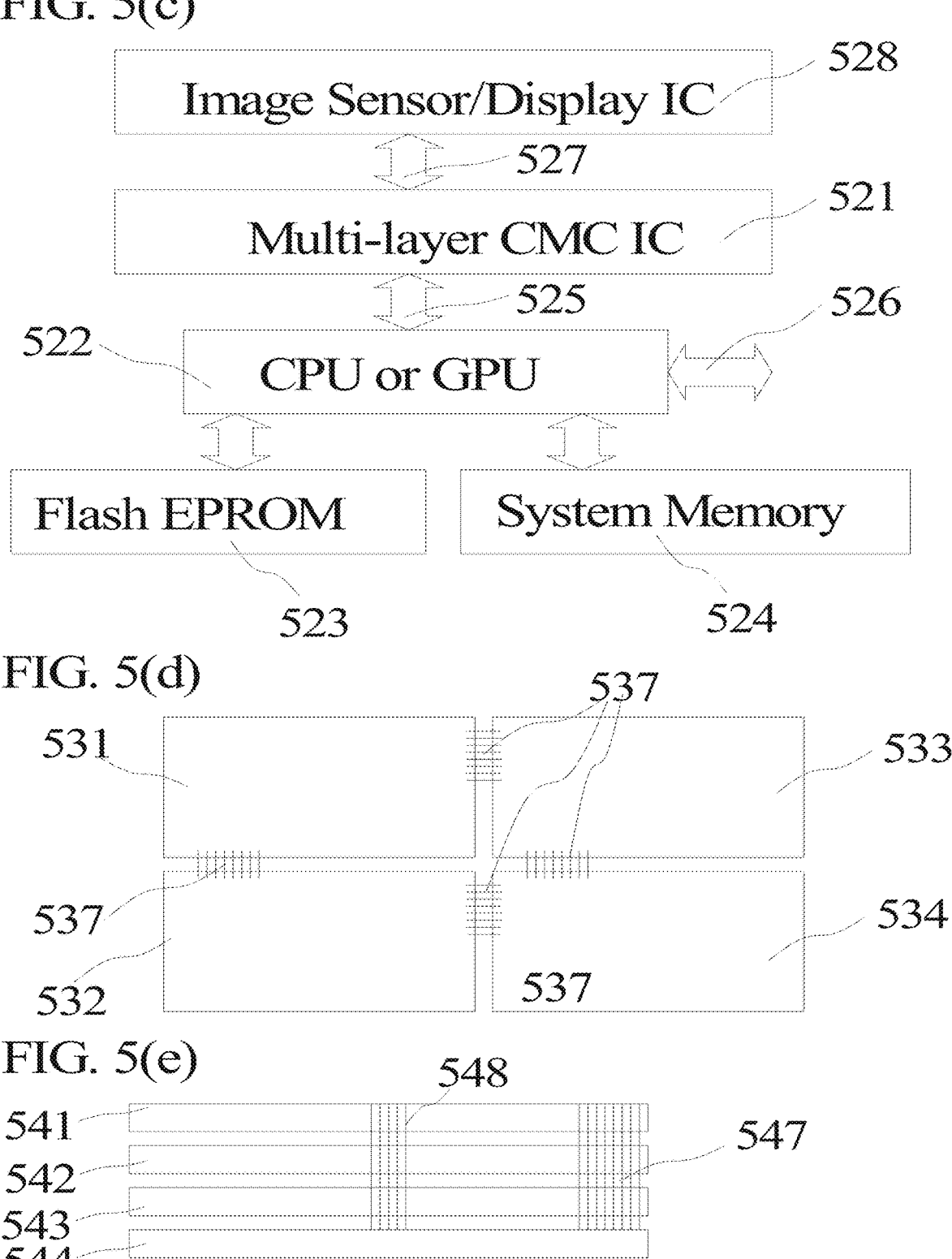
FIG. 5(c) is a simplified symbolic block diagram of one embodiment of a system configuration of the present invention.

A transistor tensor operation of embodiments of the present invention comprises many field-programmable options to allow flexibility in configuration. These options are typically selected by register write, scan chain, or memory write operations to memory devices distributed around an integrated circuit (IC) of embodiments of the present invention. The procedures to define those available options require detailed knowledge of actual designs, and such details can differ between IC designs. Therefore, a packaged IC chip of embodiments of the present invention typically comprises integrated circuits of different functions packaged in the same chip, as shown by the symbolic block diagram in FIG. 5(c). In this embodiment, multiple layer current-mode computation integrated circuits of embodiments of the present invention (521) are packaged in the same package with CPU or GPU (522), a flash EPROM (523), a system memory (524) which is typically a dynamic random-access memory (DRAM) IC, and an image sensor or image display IC (528). The multiple layer CMC IC (521) of embodiments of the present invention can have multiple stacked ICs as described in above sections. FIG. 5(d) shows a simplified embodiment of horizontal inter-dice communication lines (537) between different IC dice (531, 532, 533, 534). FIG. 5(e) shows a simplified embodiment of through-die inter-dice communication lines (547) between vertically stacked IC dice (541, 542, 543, 544). The microprocessor (522) executes firmware stored in the flash EPROM (523) to configure CMC IC (521) through a digital interface (525). The system memory (524) is used for temporary storages to achieve better performance. The Flash EPROM (523) also can store information such as which parts in the transistor tensor operation (521) ICs are defective, which blocks are used by which application, and the parameters needed to configure the CMC IC (521). Libraries of firmware circuits are also stored in the flash EPROM (523) to support functions similar to those of an operating system. The CMC ICs (521) also can send data to the microprocessor (522) through a digital interface (525) such that the microprocessor (522) can assist in executing computations that are not built in the ICs computing the transistor tensor operations. This digital interface (525) also provides the capability to communicate with external systems through an external digital interface (526). The CMC ICs (521) can also have a direct communication interface (527) with image sensor and/or image display ICs (528). This direct communication interface (527) can be a digital interface or an analog interface.

The architectures illustrated in FIGS. 3(a-h), FIGS. 4(a-c), and FIGS. 5(a-c) provide flexibility to configure CMC cells to support transistor tensor operations of wide varieties of sizes. For example, if a layer-one array comprises 128 inputs and 64 outputs, while each upper layer summation line connects 32 lower layer current summation circuits and each upper layer input line connects 32 lower layer input circuits, then a layer-two block can support a transistor tensor operation of up to 8 million parameters; a layer-three block can support up to 8 billion parameters; a layer-four block would be able to support up to 8 trillion parameters. If all the devices in an integrated circuit are insufficient to support the parameters of the transistor tensor operation being executed, the analog or digital output circuits allow convenient interfaces to other integrated circuits to expand into multiple-dice operations. For smaller computations, the unused layer-one blocks can be configured to support computations at different levels, or computations of other applications. Under this architecture, multi-leveled large-scale transistor tensor operations can be implemented with a flexible field-programmable configuration. Each level of transistor tensor operations can be executed in parallel and finished in a few gate delays, and multiple-level transistor tensor operations can be executed in parallel for a few gate delays in each level. Using the sample-and-hold circuits, one can choose to pipeline multiple-level computations to achieve higher throughputs or disable unused circuits to save power.

To better understand the performance gains of a multiple-layer summation circuit of embodiments of the present invention, consider a three-layer network of an embodiments of present invention that comprises 10 billion CMC cells. Delay time for each computation is approximately that of one analog gate plus two current mirrors, which is about 2 nanoseconds. When all 10 billion of computation-summations are executed in parallel within 2 nanoseconds, $5 \times 10^{18}$ computation-summations are executed per second. For a four-layer network of embodiments of the present invention, the performance can reach $5 \times 10^{21}$ computation-summations per second or higher.

Under programmable controls, the CMC cells can be configured to operate at multiplier mode such that a deep learning model that comprises a sequence of transistor tensor operations of embodiments of the present invention can be fully compatible with existing digital neural network devices. That means we can port the results of an existing deep learning model into a device of an embodiment of the present invention to support the same functions. In addition, each individual neuron can be configured to operate in its own operation mode, such as multiplier mode, ReLU mode, rectifier mode, or saturation mode to adapt for the nature of individual neurons to potentially achieve better results than prior art digital neural network devices. Similarly, the output functions for each individual output neuron also can be configured to its own specific function to potentially achieve better results.

Because summations are commutative, if one CMC branch is defective, we can mark and disable that CMC branch and use a different CMC branch to replace its functions; if one layer-one block is defective, we can mark and disable that block and use a different layer-one block to replace its functions; defects at any layer can be handled the same way. The marks for defective parts can be stored in the flash EPROM (523) such that other applications can avoid known defective parts. This flexible redundancy architecture significantly improves yield, and reduces costs.

While the preferred embodiments have been illustrated and described herein, other embodiments of the invention may incorporate modifications and changes to the embodiments described herein. Skillful circuit designers are able to design circuits in wide varieties of ways. It is to be understood that there are many other possible modifications and implementations so that the scope of the invention is not limited by the specific embodiments discussed herein.

Figure 6A:
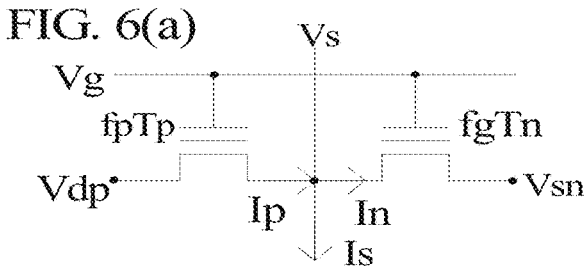
FIG. 6(a) is a simplified schematic diagram for a two-transistor CMC cell that can have positive or negative values.

In the above embodiments, channel currents of computation transistors always flow in the same direction, meaning all parameters are positive. For some cases, it is desirable to have both positive and negative parameter values. FIG. 6(a) is a simplified schematic diagram for a CMC cell that comprises two computation transistors (fgTp, fgTn) with gate terminals coupled to the same input at voltage Vg. The source terminal of fpTp and the drain terminal of fpTn are coupled to a branch summation line (Is) which is forced at a voltage Vs, as shown in FIG. 6(a). The drain terminal of fpTp is coupled to a constant drain voltage (Vdp) greater than Vs, causing the channel current (Ip) of fpTp to flow into the branch summation line (Is); the source terminal of fpTn is coupled to a constant drain voltage (Vsn) less than Vs, causing the channel current (In) of fpTn to flow away from the branch summation line (Is), as shown in FIG. 6(a). The overall channel current of this two-transistor cell is therefore Ip−In, which can be positive when Ip>In or negative when Ip<In. Two transistors configured as the embodiment in FIG. 6(a) to support one computation are therefore able to model both positive and negative parameter values.

Figure 6B:
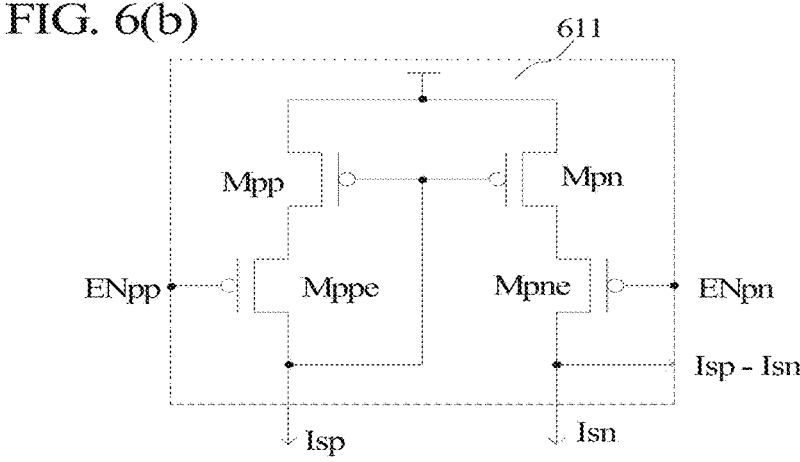
FIG. 6(b) is a simplified schematic diagram for a current subtraction circuit that allows synapses to have positive or negative values.

Another embodiment to support both positive and negative values is to use the same layer-one block as discussed in previous embodiments while taking the difference of branch output currents from two nearby columns using the current subtraction circuit (611) illustrated by the simplified symbolic embodiment in FIG. 6(b). In this embodiment, two matched transistors (Mpp, Mpn) and two enable transistors (Mppe, Mpne) are configured as a current mirror. The input of the current mirror is connected to one branch summation line with a branch output current Isp and the other end of the current mirror is connected to another branch summation line with a branch output current Isn, as shown in FIG. 6(b). When field-programmable enable signals ENpp and ENpn are both activated, the output current of this current subtraction circuit (611) is Isp-Isn. Using such current subtraction circuits (611), each scalar computation in the level-one block is modeled by a CMC cell along one branch summation line and another CMC cell along the other branch summation line that have the same input voltages, resulting in scalar computations that can have positive or negative results.

Figure 6C:
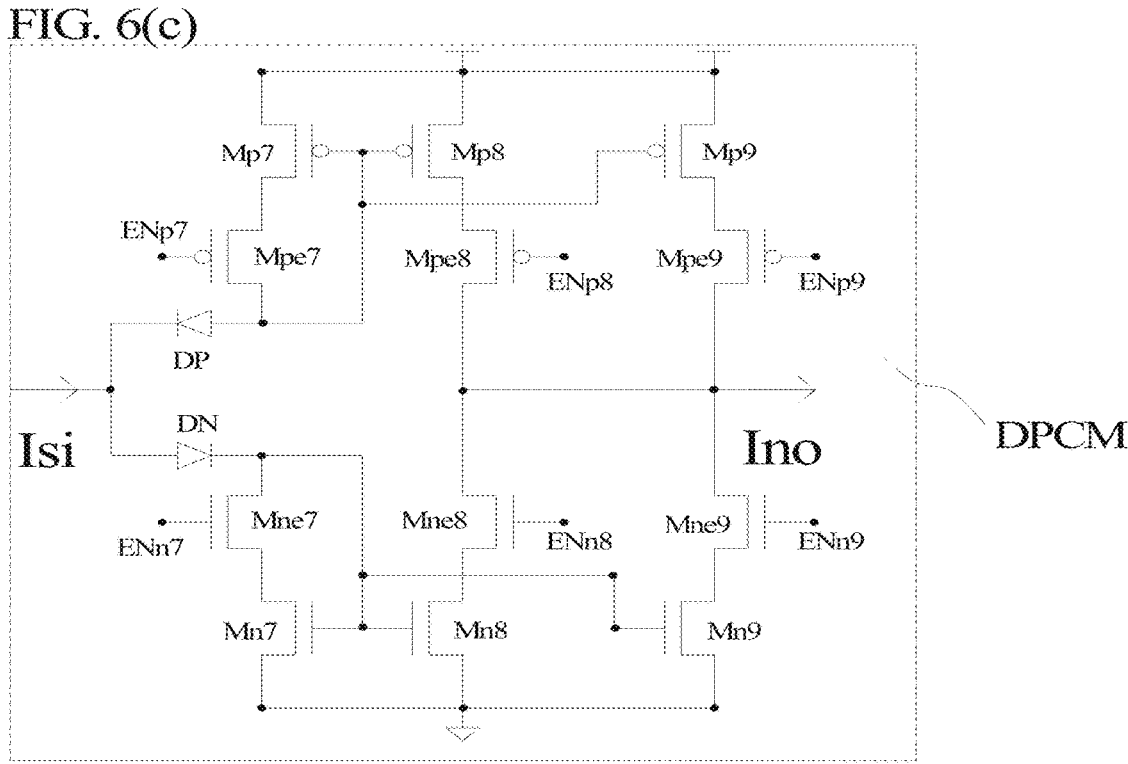
FIG. 6(c) is a simplified schematic diagram for a dual polarity current mirror circuit.

In the above embodiment, the current summation circuit needs to support input currents of different polarities. FIG. 6(c) is a simplified schematic diagram for an exemplary dual polarity current mirror (DPCM). In this embodiment, matched p-channel transistors (Mp7, Mp8, Mp9) and enable transistors (Mpe7, Mpe8, Mpe9) are configured as p-channel current mirrors; matched n-channel transistors (Mn7, Mn8, Mn9) and enable transistors (Mne7, Mne8, Mne9) are configured as n-channel current mirrors, as shown in FIG. 6(c). When the input current (Isi) is positive, current flows through diode DN to the n-channel current mirrors while diode DP blocks the current such that the output currents of the p-channel current mirrors are approximately zero. The resulting output current (Ino) is therefore completely generated by the n-channel current mirrors. When the input current (Isi) is negative, current flows through diode DP to the p-channel current mirrors while diode DN blocks the current such that the output currents of the n-channel current mirrors are approximately zero. The resulting output current (Ino) is therefore completely generated by the p-channel current mirrors. Therefore, this dual polarity current mirror (DPCM) works for input currents of both polarities. The diodes DN and DP can be implemented by transistors configured in rectifier modes.

While the preferred embodiments have been illustrated and described herein, other embodiments of the invention may incorporate modifications and changes to the embodiments described herein. For example, different types of CMC cells can be designed to support both positive and negative parameters. It is to be understood that there are many other possible modifications and implementations so that the scope of the invention is not limited by the specific embodiments discussed herein.

Figure 6D:
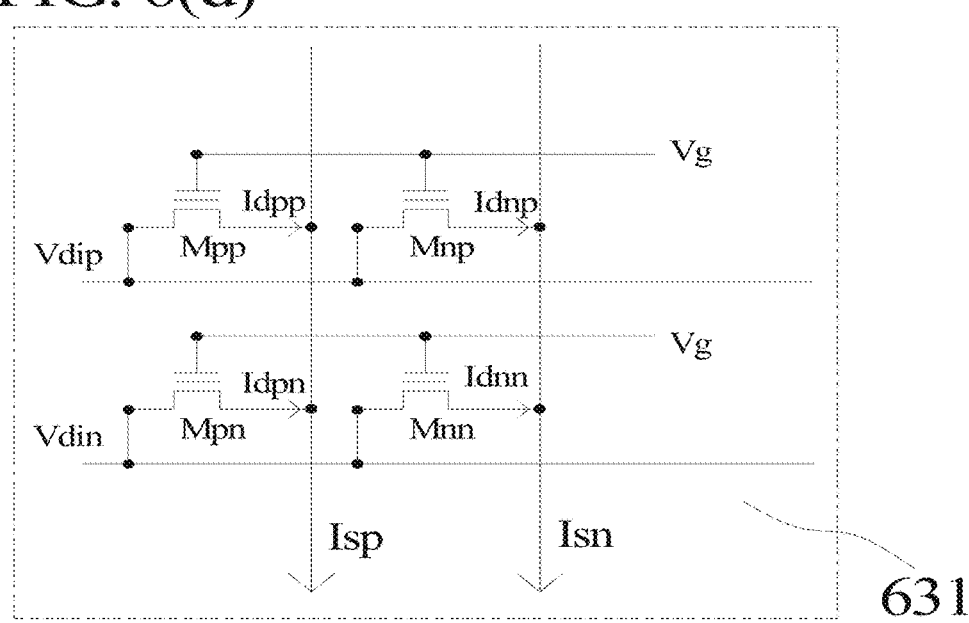
FIG. 6(d) is a simplified schematic diagram for a four-transistor synapse cell that can have positive or negative values in both inputs and outputs.
Figure 6E:
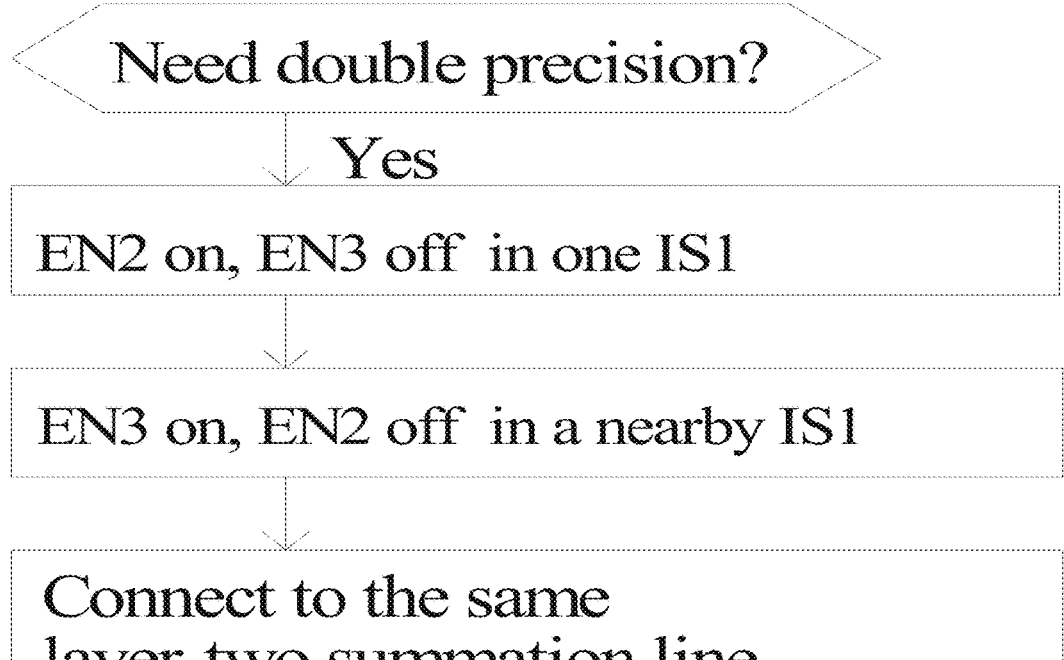
FIG. 6(e) is a simplified flow chart for implementing double-precision parameters.

In the above embodiments, input values are always positive. It is often desirable to have both positive and negative input values. FIG. 6(d) is a simplified schematic for a CMC cell that comprises four matched transistors (Mpp, Mpn, Mnp, Mnn). The source terminals of Mpp and Mpn are connected to the branch summation line (Isp) that is connected to the current subtraction circuit in FIG. 6(b). The drain terminals of Mpp and Mpn are connected to the same input line (Vdip); the drain terminals of Mpn and Mnn are connected to another input line (Vdin); the gate terminals are all connected to the same gate voltage Vg, as shown in FIG. 6(d). The source terminals of Mnp and Mnn are connected to another branch summation line (Isn) that is connected to the input of the current subtraction circuit in FIG. 6(b). The contribution of this CMC cell (631) to the overall summation current is therefore Idpp+Idpn−Idnp−Idnn, where Idpp is the channel current of computation transistor Mpp, Idpn is the channel current of computation transistor Mpn, Idnp is the channel current of computation transistor Mnp, and Idnn is the channel current of computation transistor Mnn. Computation transistor Mpp and computation transistor Mnn are programmed to have the same storage charges. Therefore, when all inputs are equal, Idpp is equal to Idnn. Similarly, computation transistor Mnp and computation transistor Mpn are programmed to have equal storage charges; when all inputs are the same, Idnp equals Idpn. For a positive input at voltage Vdinp, Vdip is set to voltage Vdinp and Vdin is set to Vs. The contribution of this CMC cell (631) is (Idpp−Idnp). For a negative input at voltage −Vdinp, Vdip is set to voltage $V_s$ and Vdin is set to voltage Vdinp. The contribution of this CMC cell (631) is (Idpn−

Idnn). Since the input voltages are equivalent under both conditions, we have (Idpn−Idnn)=−(Idpp−Idnp), which is equivalent to a negative input.

While the preferred embodiments have been illustrated and described herein, other embodiments of the invention may incorporate modifications and changes to the embodiments described herein. For example, one can allow drain input voltage to be less than Vs to achieve positive and negative inputs. This works if the amplitudes of the input voltages are small. It is to be understood that there are many other possible modifications and implementations so that the scope of the invention is not limited by the specific embodiments discussed herein.

FIG. 7(a) shows a flow chart for an example procedure to "program" and set a desired amount of storage charge on a floating-gate transistor. The first step is to determine if the floating-gate transistor needs to be erased. If the floating-gate transistor's storage charge is too high, we execute an "erase" operation by putting a low voltage at its gate terminal and high voltages at its source/drain terminals to pull storage charges out of the floating-gate via tunneling. The next step is to "read" the floating-gate transistor to measure its threshold voltage (VT) or channel current (Id) to determine if its storage charge is already at the desired value. If not, we execute one short pulse of the "programming" operation by setting a high electrical field at the channel region of the floating-gate transistor to inject electrons into its floating-gate through hot electron effects. After each short pulse of programming, we measure VT or Id again and repeat the same procedure until the desired threshold voltage is achieved. The "read" operation used in this application also can be used to measure the value of the threshold voltage of each individual floating-gate transistor and output the result through a digital interface to external devices. This can be used to duplicate the training results to other devices.

Using the "programming" method described in FIG. 7(a), the threshold voltage of a floating-gate transistor can be controlled in analog values, but the floating-gate transistors programmed in this way typically cannot achieve the same precision as digital computations. One method to improve precision is illustrated by the simplified flow chart in FIG. 6(e). To achieve double precision, select one column of CMC cells in combination with a different column of CMC cells. For example, if the layer-one current summation circuit (IS1) is that of FIG. 3(d), configure the layer-one current summation circuit (IS1) of the first column with EN2 activated and EN3 deactivated. Configure the layer-one current summation circuit of another column with EN3 activated and EN2 deactivated, with the outputs of both layer-one current summation circuits connected to the same layer-two summation line. With this configuration, the combined output current is $$Isc = (Wm2/Wm1)*Is_1 + (Wm3/Wm1)*Is_2$$

where $Is_1$ is the branch output current from the first column, $Is_2$ is the branch output current from the second column, and Isc is the combined summation current from both columns. If we assume (Wm2/Wm1) is designed to be equal to 16, and is (Wm3/Wm1) designed to be equal to 1, then we have Isc=16*$Is_1$+$Is_2$. In this embodiment, the CMC cells in column 1 represent the most significant four bits, while those in column 2 provide the least significant 4 bits of the combined synapse value to achieve 8-bit precision. Therefore, double precision parameter value is achieved.

Figure 7B:
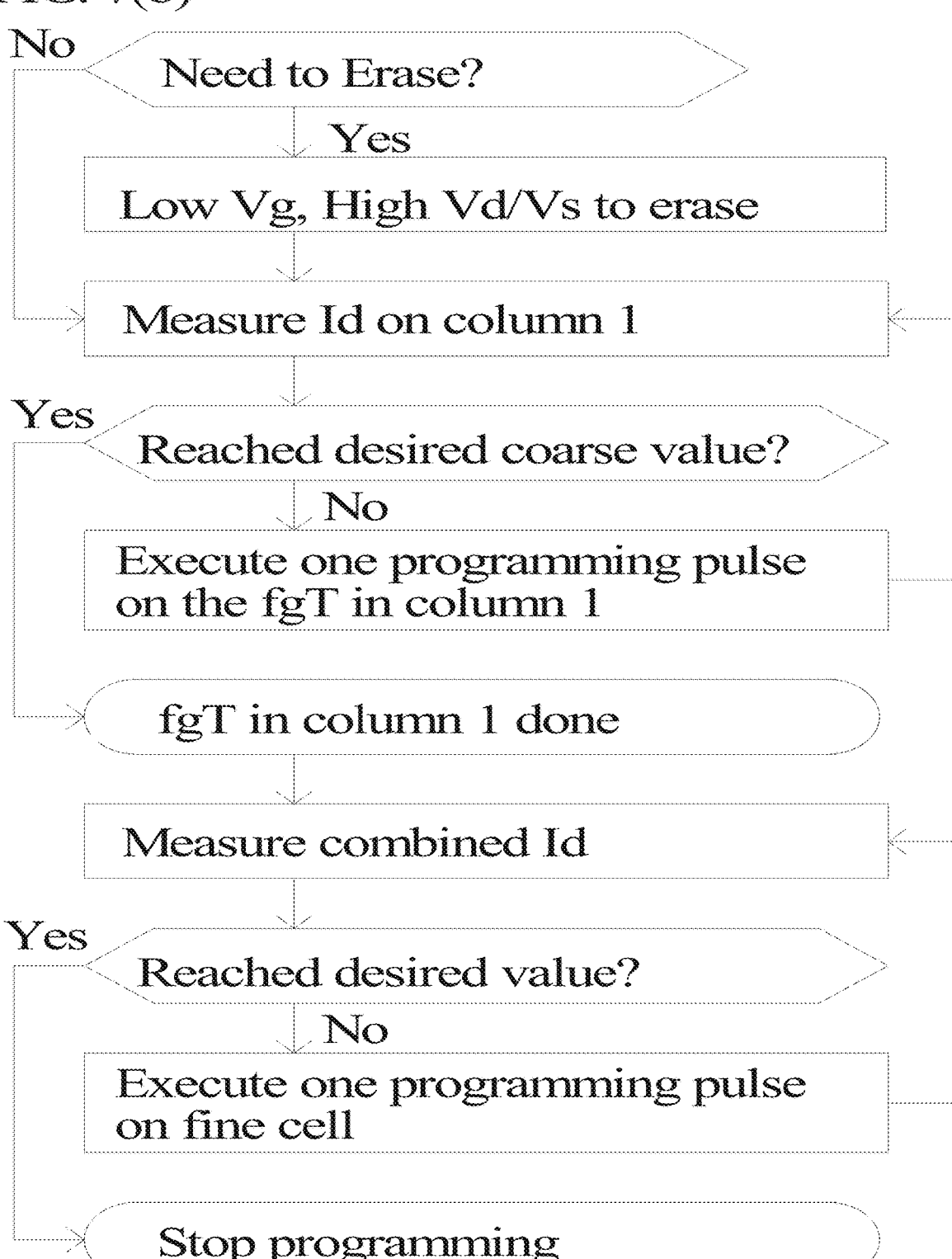
FIG. 7(b) is a simplified flow chart for programing programmable-threshold voltage transistors to support double-precision parameter values.

FIG. 7(b) is a simplified flow chart that shows an exemplary procedure to program floating-gate transistors configured to support double-precision accuracy. By measuring Id on column 1, the floating-gate transistor in the first column is programmed first to reach a predefined coarse value. Next, the combined channel current is measured and the floating-gate transistor in column 2 is programmed until the desired value is achieved.

While the preferred embodiments have been illustrated and described herein, other embodiments of the invention may incorporate modifications and changes to the embodiments described herein. For example, triple precision can be achieved by combining three columns, and quadruple precision can be achieved by combining four columns. It is to be understood that there are many other possible modifications and implementations so that the scope of the invention is not limited by the specific embodiments discussed herein.

When training neural network models that use operations that are non-differentiable or do not have a simple closed-form expression for its derivative using programmable-threshold voltage transistors, the partial derivative should be taken against threshold voltages $(\partial C_o/\partial V_{Tj,k}^{(i)})$ to determine optimal changes in threshold voltages. As shown by above embodiments, the procedures to change the threshold voltages of floating-gate transistors can be time-consuming, which can add up during training. Changing the storage charge of one floating-gate transistor and restoring the storage charge to its original value is not only time consuming but also inaccurate. To more efficiently calculate $(\partial C_o/\partial V_{Tj,k}^{(i)})$, we observe that the channel current of a programmable-threshold voltage transistor is a function of $(V_{gs}-V_{Tj,k})$, where $V_{gs}$ is the gate-to-source voltage and $V_{Tj,k}$ is the threshold voltage. While changing $V_{Tj,k}$ is complex, changing $V_{gs}$ is simple. When $(V_{gs}-V_{Tj,k})$ is fixed, the behavior of the programmable-threshold voltage transistor is the same. Therefore, we have $\partial C_o/\partial V_{Tj,k}=-\partial C_o/\partial V_{gs}$. During training, we can simulate a change in threshold voltage by changing in $V_{gs}$. This results in an efficient method for approximating the derivatives required for training models using non-differentiable operations.

FIG. 8(a) is a flow chart for simplified exemplary training processes of embodiments of the present invention. Starting from a batch of input vectors with corresponding labels, the final output and cost of each input is determined by executing a forward pass on each input. Note that the size of a batch can range anywhere from a single vector to the entirety of the training set. Next, using the circuits of an embodiments of the present invention, one parameter or the values of a set of orthogonal parameters is changed while keeping all other parameters fixed. Next, a forward pass is executed, and the change in the cost function due to changed parameter(s) is calculated to determine partial derivative(s) of the cost function with respect to the parameter(s) under this test, as shown in FIG. 8(a). The same procedure is repeated for all parameters to calculate the derivative of the cost with respect to the parameters. Once the process has gone through all inputs in the batch, an approximate gradient of the cost function with respect to all parameters is calculated by aggregating the previously computed gradients for each input. Now, we know the deltas for each parameter, so program/erase operations are executed to change the storage charges of programmable-threshold voltage transistors and/or configuration parameters according to the approximated gradient. This procedure is repeated until the cost of the model reaches an acceptable threshold.

Figures 8C, 8D:
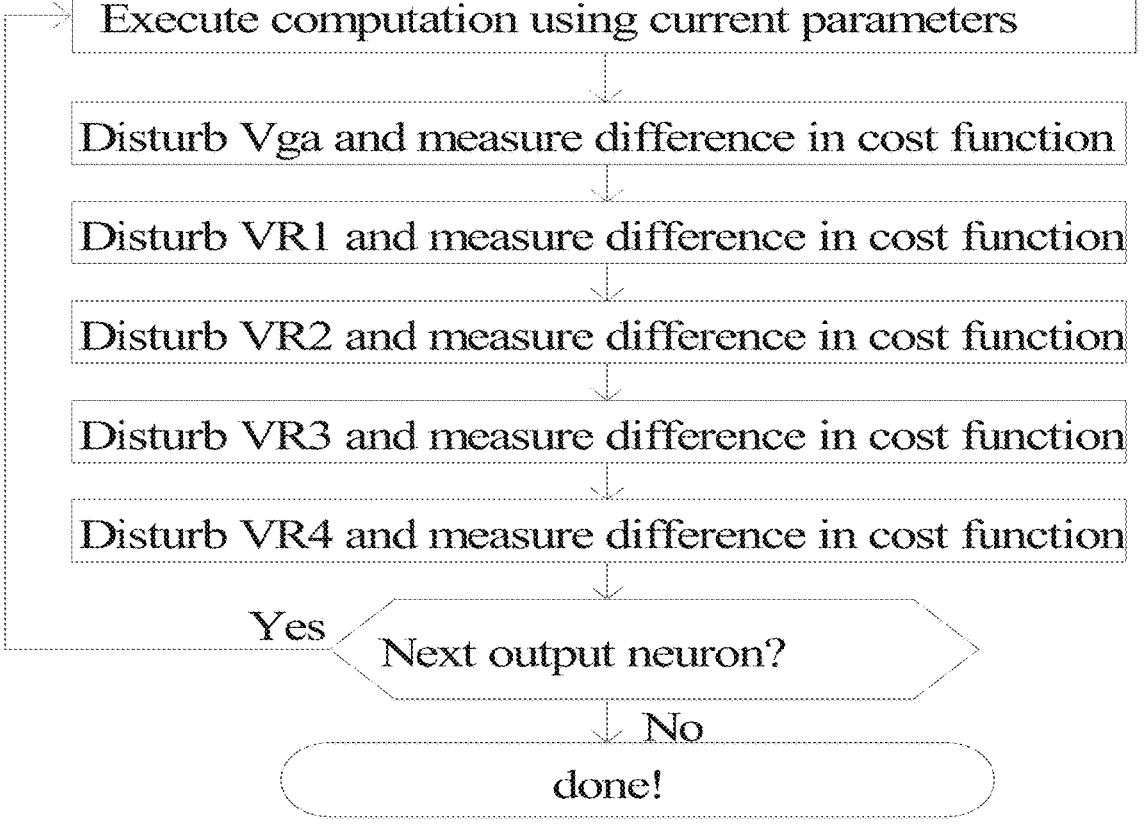
FIG. 8(c) is a simplified schematic diagram of one exemplary current sample-and-hold circuit that can support the algorithm in FIG. 8(b)
FIG. 8(d) is a simplified flow chart for one exemplary output function learning algorithm of an embodiment of the present invention.
Figures 9A, 9B:
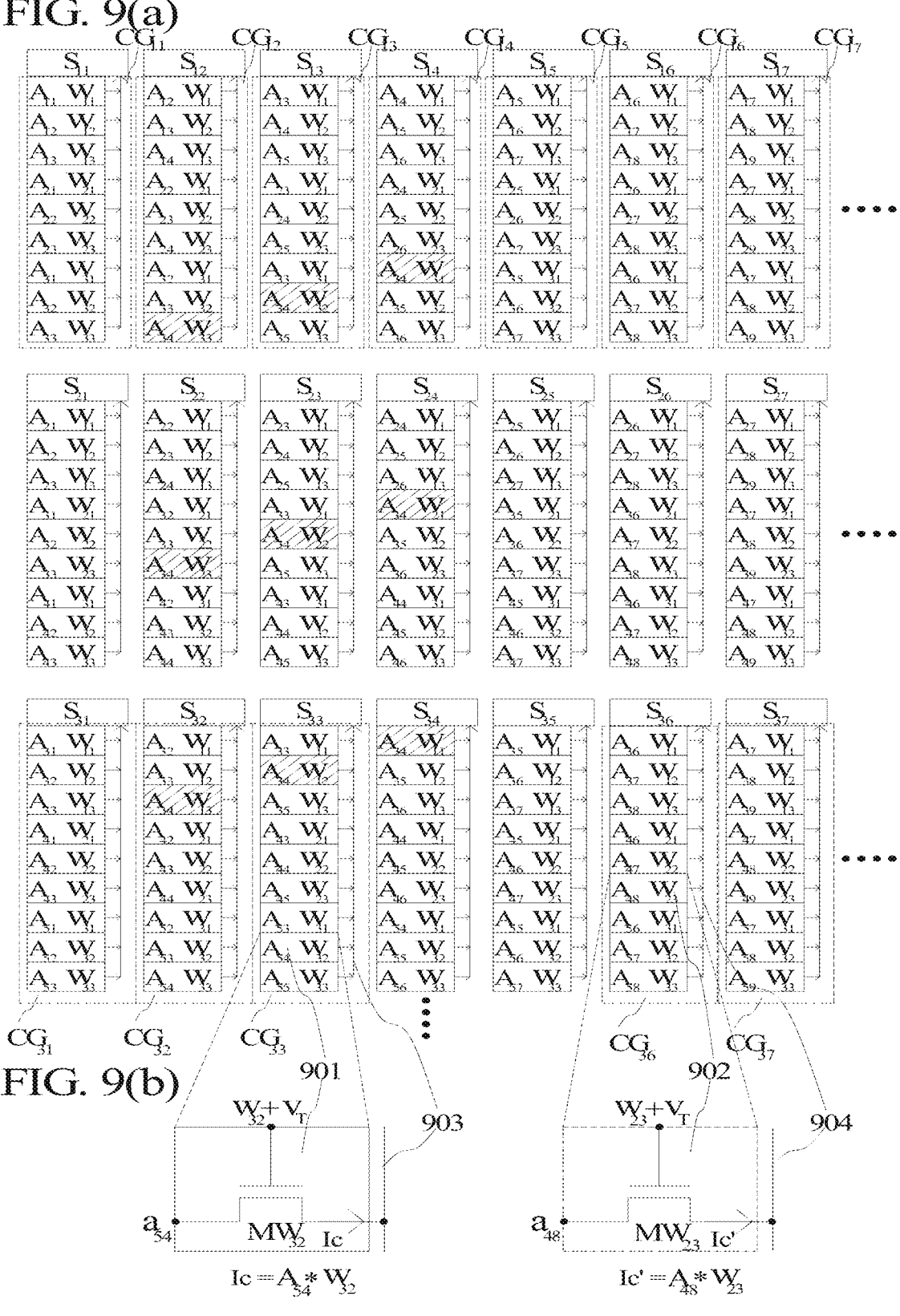
FIG. 9(a) is a simplified block diagram of an exemplary convolution matrix computation circuit of an embodiment of the present invention.
FIG. 9(b) shows schematic symbols of the convolution computation cells in FIG. 9(a)
Figure 9C:
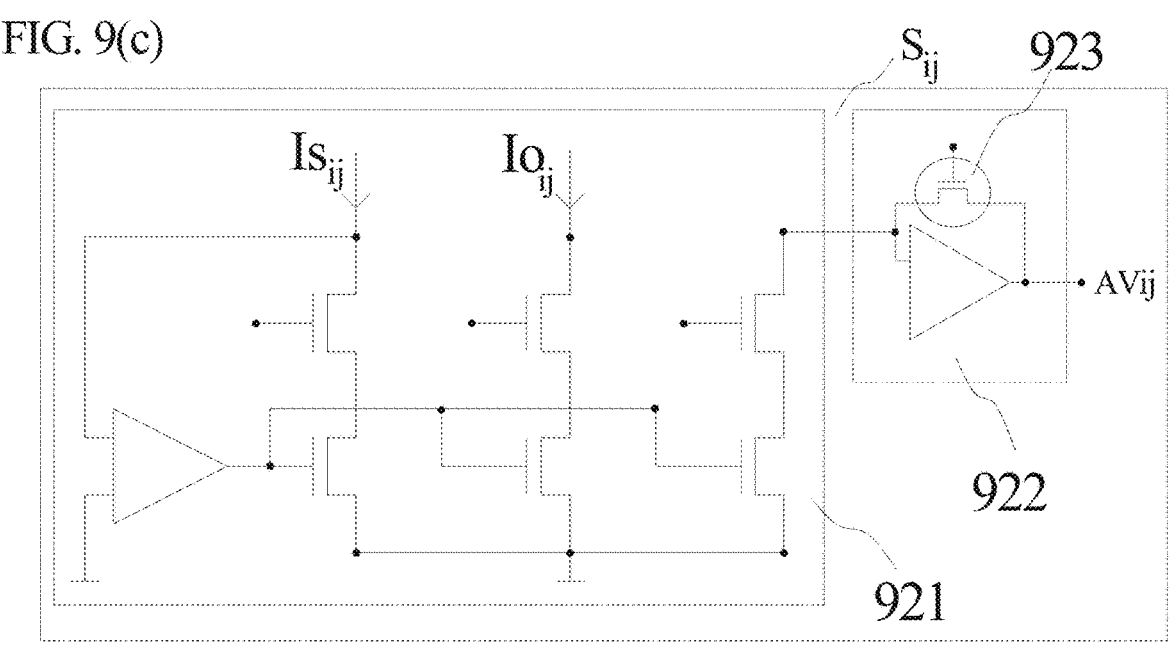
FIG. 9(c) is a simplified schematic diagram of the current summation circuit in FIG. 9(a)
Figure 9D:
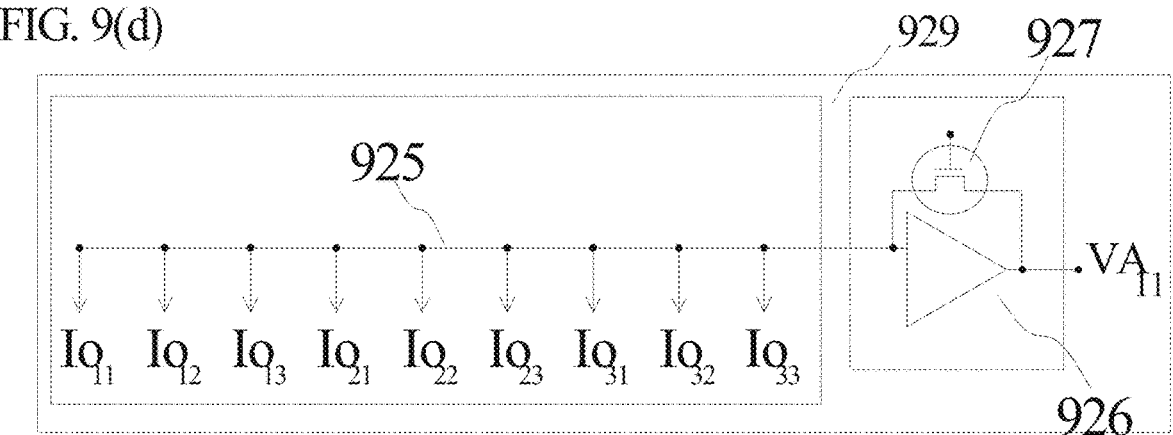
FIG. 9(d, e) are simplified schematic diagrams of exemplary circuits that execute pulling computations.
Figure 9E:
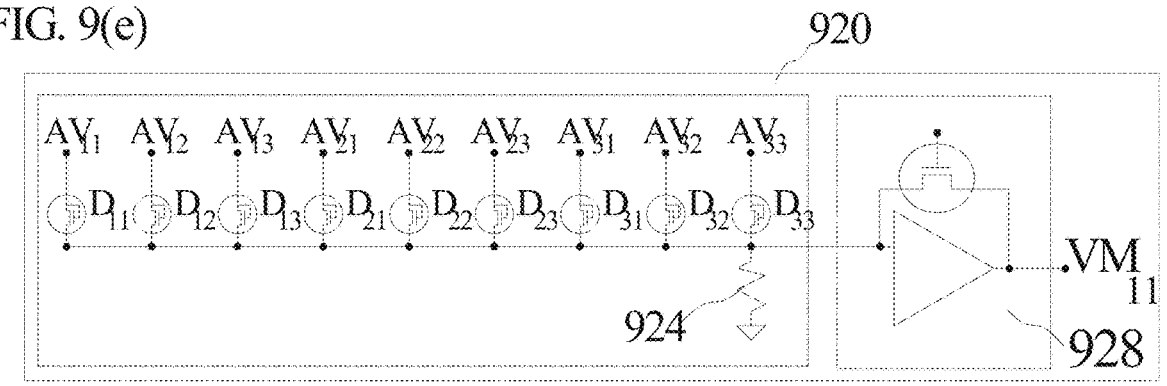

FIG. 8(b) is a flow chart for simplified exemplary training processes of embodiments of the present invention use to calculate partial derivative $(\partial C_o/\partial V_{Tj,k})$ by determining $(\partial C_o/\partial V_{gs})$ and the partial derivatives of output functions. For this embodiment, the layer-one gate voltage input circuit (VI1g) is the one in FIG. 3(g). Using this VI1g, the gate voltage along one row of floating-gate transistors can be conveniently changed by changing Vsg, as shown in FIG. 3(g). During normal operations, Vsg is set to be the same as Vs. During partial derivative calculation procedures described in FIG. 8(b), the sampling select signal (Smp) is deactivated while Vsg of the selected VI1g can be changed, which will change the gate voltage $(Vg_j)$ applied on the gate terminals of selected floating-gate transistors. After the partial derivative calculation, Vsg is changed back to Vs to restore original conditions. In the meantime, the current-sample-and-hold (IS&H) circuit shown in FIG. 8(c) is used as the layer-two current summation circuit (IS2). This IS&H is nearly identical to the IS2 shown in FIG. 3(e), except that a multiplex (MUX) is added to control the current mirror gate voltage (Vmo) as shown in FIG. 8(c). When the mux select signal SMi is activated and the other mux select signal SMh is deactivated, Vmo is determined by the input current $(Is^{(2)})$ induced voltage (Vmi) so that this IS&H operates exactly the same as the circuit in FIG. 3(e). In the meantime, a voltage sample-and-hold (VS&H) circuit can be activated to sample Vmi so that the output of the VS&H (Vmh) can capture the value of Vmi and hold the value when the VS&H is in "hold" mode. When the mux select signal SMi is deactivated and the other mux select signal SMh is activated, Vmo is determined by the VS&H hold voltage (Vmh) so that the output currents $(Io^{(2)}$ and Iso) are the same as those of previous values when VS&H last sampled Vmi, and independent of input current $(Is^{(2)})$; under this situation, the output currents are "hold" at previous values.

Using IS1g in FIG. 3(e) and IS&H in FIG. 8(c), the training algorithm of embodiments of the present invention can be described by the exemplary flow chart in FIG. 8(b). Execute computation using current parameters, sample-and-hold current mirror input voltage by the VS&H in the IS&H, then turn off the select muxes in related IS&Hs; the output currents of those IS&Hs will remain the same, so that all the neurons will remain the same throughout the whole large-scale multiple-level function matrix. While the output currents are held at the same values, disturb the gate voltage of all the floating-gate transistors connected to the same input, which will change the layer-two summation currents $(Is^{(2)})$ related to the selected input without disturbing the rest of entire function matrix network; use the VS&H circuits in IS&Hs to record the current mirror voltage (Vmi) of the disturbed summation currents $(Is^{(2)})$; after that, turn off Vg disturb by returning Vsg value back to Vs in the layer-one gate voltage input circuit (IS1g) so that $Is^{(2)}$ will return to undisturbed values, then turn on SMi of all selected muxes in related IS&Hs so that everything returns to undisturbed conditions. Now we are ready to determine $(\partial C_o/\partial V_{gs})$ one by one for all the floating-gate transistors connected to the selected input neuron, as illustrated in FIG. 8(b). Starting from the first output neuron, change the corresponding IS&H connected to the output neuron to "hold" mode by deactivate SMi and activate SMh of the mux in the IS&H of the selected output neuron, so that its output current is the disturbed output current, while all the other output neurons remain unchanged. In these ways, $(\partial C_o/\partial V_{gs})$ and therefore $(\partial C_o/\partial V_{Tj,k}^{(i)})$ can be determined conveniently at high performance. Such procedures can be repeated until all $(\partial C_o/\partial V_{Tj,k}^{(i)})$ of all floating-gate transistors are determined, as shown in FIG. 8(b).

A current-sample-and-hold (IS&H) circuit is an electrical circuit that supports a "hold" operation mode and a "sample" operation mode and provides an electrical output current. During "hold mode", an IS&H holds its output current at a constant value that is independent of its input or inputs. During "sample mode" the IS&H detects and maintains the parameter or parameters needed to supply the correct output current for the next "sample mode" operation. IS&H circuits are very useful in supporting training algorithms of embodiments of the present invention that change gate voltages instead of threshold voltages in order to determine partial derivatives. IS&H circuits also can be used to support pipeline operations to increase transistor tensor operations throughput. When IS&H circuits are used as the current summation circuits (IS1, IS2, IS3, . . . ), they can also save power by holding correct output currents while shutting down the computation array, effectively mitigating the ISPC problem.

While the preferred embodiments have been illustrated and described herein, other embodiments of the invention may incorporate modifications and changes to the embodiments described herein. Different cost functions for example can be used instead of mean-squared error. The aforementioned voltage sample-and-hold and current sample-and-hold circuits are oversimplified for clarity; actual S&H circuits require more complex designs. The flow charts in the above embodiments are also over simplified for clarity; the sequences of training processes can be executed in wide varieties. It is to be understood that there are many other possible modifications and implementations so that the scope of the invention is not limited by the specific embodiments discussed herein.

The output functions of embodiments of the present invention also can be optimized flexibly with high performance, as illustrated by the flow chart in FIG. 8(d). In this embodiment, we assume the output function is determined by the output circuit shown in FIG. 3(f). Since all the parameters (Vga, VR1, VR2, VR3, VR4) of the output function in FIG. 3(f) are programmable, it is trivial to implement a small change in each individual parameter to calculate the partial derivative against each individual parameter, as illustrated in FIG. 8(d).

While specific embodiments of the invention have been illustrated and described herein, it is realized that other embodiments of the invention may incorporate modifications and changes to the embodiments described herein. It is therefore to be understood that the appended claims are intended to cover all modifications and changes that fall within the true spirit and scope of the invention.

What is claimed is:

1. An integrated circuit comprising:
a plurality of current-mode computation (CMC) branches, wherein each of the CMC branches comprises:
a plurality of CMC cells, wherein each of the CMC cells comprises at least one computation transistor and produces a CMC cell output current that is a function of a channel current of the computation transistor;
a branch summation line comprising an electrical conductor that is electrically coupled to, and receives the CMC cell output currents produced by, a plurality of the CMC cells in that individual CMC branch, and that produces a branch output current that is a current-mode summation of the CMC cell output currents electrically coupled thereto;
a plurality of layer-one current summation circuits, wherein each of the layer-one current summation circuits is electrically coupled to, and receives the branch output current produced by, at least one branch summation line, and further comprises a feedback circuit that can limit at least an amplitude of the branch output current received thereto, and produces a layer-one current summation circuit output current that is a function of the branch output currents received thereto;
a plurality of layer-two summation lines, wherein each of the layer-two summation lines comprises an electrical conductor that is electrically coupled to, and receives the layer-one current summation circuit output currents produced by, a plurality of layer-one current summation circuits, and that produces a layer-two summation line output current that is a current-mode summation of the received layer-one current summation circuit output currents; and
a plurality of layer-two current summation circuits, wherein each of the layer-two current summation circuits is electrically coupled to, and receives the layer-two summation line output current produced by, at least one layer-two summation line, and produces a layer-two current summation circuit output current that is a function of the received layer-two summation line output currents.

2. The integrated circuit of claim 1, further comprising:
a plurality of layer-three summation lines, wherein each of the layer-three summation lines comprises an electrical conductor that is electrically coupled to, and receives the layer-two current summation circuit output currents produced by, a plurality of layer-two current summation circuits, and that produces a layer-three summation line output current that is a current-mode summation of the received layer-two current summation circuit output currents; and
a plurality of layer-three current summation circuits, wherein each of the layer-three current summation circuit is electrically coupled to, and receives the layer-three summation line output current produced by, at least one layer-three summation line, and produces a layer-three current summation circuit output current that is a function of the received layer-three summation line output currents.

3. The integrated circuit of claim 2, wherein:
each of said layer-three current summation circuits is field-programmable; and the integrated circuit can perform transistor tensor operations by programming one or more of said layer-three current summation circuits to combine the layer-three
summation line output currents received by those layer-three current summation circuits.

4. The integrated circuit of claim 1, wherein the computation transistor of each of said CMC cells comprises an MOS transistor.

5. The integrated circuit of claim 4, further comprising a select transistor having a source or drain terminal that is electrically coupled to a gate terminal of a computation transistor of each of said CMC cells.

6. The integrated circuit of claim 5, further comprising a storage-control capacitor electrically coupled to the gate terminal of a computation transistor of each of said CMC cells.

7. The integrated circuit of claim 6, further comprising a storage-control capacitor electrically coupled to the gate terminal of a computation transistor of each of said CMC cells while the other terminal of the storage-control capacitor is electrically coupled to a field-programmable CMC cell gate voltage control signal.

8. The integrated circuit of claim 1, wherein a computation transistor of each of said CMC cells comprises a native transistor.

9. The integrated circuit of claim 1, wherein a computation transistor of each of said CMC cells comprises a programmable-threshold-voltage transistor.

10. The integrated circuit of claim 9, wherein said programmable-threshold-voltage transistor comprises a floating-gate transistor.

11. The integrated circuit of claim 1, further comprising a select transistor having a source or drain terminal that is electrically coupled to gate terminals of computation transistors of a plurality of CMC cells.

12. The integrated circuit of claim 1, wherein each of said CMC cells is field-programmable to operate in multiple modes.

13. The integrated circuit of claim 12, wherein each of said CMC cells is field-programmable to operate in a multiplier mode.

14. The integrated circuit of claim 12, wherein each of said CMC cells is field-programmable to operate in a ReLU mode.

15. The integrated circuit of claim 12, wherein each of said CMC cells is field-programmable to operate in a rectifier mode.

16. The integrated circuit of claim 1, wherein the integrated circuit comprises multiple semiconductor dice that are connected by inter-dice connections.

17. The integrated circuit of claim 1, wherein the integrated circuit is field-programmable to disable parts of the circuits.

18. The integrated circuit of claim 1, wherein:

each of said layer-one current summation circuits is field-programmable; and the integrated circuit can perform transistor tensor operations by programming one or more of said layer-one current summation circuits to combine branch output currents received by those layer-one current summation circuits.

19. The integrated circuit of claim 1, wherein:

each of said layer-two current summation circuits is field-programmable; and the integrated circuit can perform transistor tensor operations by programming one or more of said layer-two current summation circuits to combine layer-two summation line output currents received by those layer-two current summation circuits.

* * * * *